(12) United States Patent
Warren et al.

(10) Patent No.: US 9,268,344 B2
(45) Date of Patent: Feb. 23, 2016

(54) INSTALLATION OF THERMOSTAT POWERED BY RECHARGEABLE BATTERY

(71) Applicant: Google Inc., Mountain View, CA (US)

(72) Inventors: Daniel Adam Warren, San Francisco, CA (US); Hugo Fiennes, Palo Alto, CA (US); Jonathan Alan Dutra, Saratoga, CA (US); David Bell, Los Altos Hills, CA (US); Anthony Michael Fadell, Portola Valley, CA (US); Matthew Lee Rogers, Los Gatos, CA (US); Ian C. Smith, Palo Alto, CA (US); Edwin H. Satterthwaite, Jr., Palo Alto, CA (US); Joseph E. Palmer, San Jose, CA (US); Grant M. Erickson, Sunnyvale, CA (US); Andrea Mucignat, San Francisco, CA (US); David Sloo, Menlo Park, CA (US)

(73) Assignee: GOOGLE INC., Mountain View, CA (US)

(*) Notice: Subject to any disclaimer, the term of this patent is extended or adjusted under 35 U.S.C. 154(b) by 400 days.

(21) Appl. No.: 13/831,177

(22) Filed: Mar. 14, 2013

(65) Prior Publication Data

US 2013/0218351 A1 Aug. 22, 2013

Related U.S. Application Data

(63) Continuation-in-part of application No. 13/467,025, filed on May 8, 2012, now Pat. No. 8,788,103, and a (Continued)

(51) Int. Cl.
*G05B 13/00* (2006.01)
*G05B 15/00* (2006.01)

(Continued)

(52) U.S. Cl.
CPC ........ *G05D 23/1917* (2013.01); *F24F 11/0012* (2013.01); *G05D 23/1902* (2013.01); *F24F 2011/0036* (2013.01); *F24F 2011/0068* (2013.01); *F24F 2011/0073* (2013.01)

(58) Field of Classification Search
CPC ............... G06F 8/61; G06F 8/65; G06F 9/44; G05B 15/02; G05B 2219/23306; G05B 2219/2614; F24F 2011/0071; F24F 2011/0072
USPC .................. 700/276–278, 299, 300; 717/168, 717/171–174, 176–178
See application file for complete search history.

(56) References Cited

U.S. PATENT DOCUMENTS

| | | |
|---|---|---|
| 3,640,455 A | 2/1972 | Romanelli |
| 3,948,441 A | 4/1976 | Perkins et al. |

(Continued)

FOREIGN PATENT DOCUMENTS

| | | |
|---|---|---|
| CA | 2202008 | 2/2000 |
| EP | 207295 | 1/1987 |

(Continued)

OTHER PUBLICATIONS

Detroitborg, Nest Learning Thermostat: Unboxing and Review [online], uploaded on Feb. 2012, retrieved from the Internet: <URL: http://www.youtube.com/watch?v=KrgcOL4oLzc> [retrieved on Aug. 22, 2013], 4 pages.

(Continued)

*Primary Examiner* — Crystal J Barnes-Bullock
(74) *Attorney, Agent, or Firm* — Kilpatrick Townsend & Stockton LLP

(57) ABSTRACT

A thermostat is described that includes a rechargeable battery, a graphical user interface and a wireless network communication capabilities. During installation, in cases where the rechargeable battery is below a first threshold, the installation procedure is limited so as to avoid energy intensive installation steps which may not be supported by the low battery level. An example of an installation step that is avoided due to low battery level is set up of wireless communication. According to some embodiments, if the battery level is very low during initial installation, the installation process is halted while the battery is charged. An indication such as a flashing LED may be displayed so as to indicate to the user that the battery is being charged.

18 Claims, 27 Drawing Sheets

Related U.S. Application Data continuation-in-part of application No. 13/267,877, filed on Oct. 6, 2011, now Pat. No. 9,026,254, and a continuation-in-part of application No. 13/034,674, filed on Feb. 24, 2011, and a continuation-in-part of application No. 13/034,678, filed on Feb. 24, 2011, now Pat. No. 8,752,771.

(60) Provisional application No. 61/627,996, filed on Oct. 21, 2011, provisional application No. 61/415,771, filed on Nov. 19, 2010, provisional application No. 61/429,093, filed on Dec. 31, 2010.

(51) Int. Cl.
*G05D 23/00* (2006.01)
*G06F 9/44* (2006.01)
*G06F 9/445* (2006.01)
*G05D 23/19* (2006.01)
*F24F 11/00* (2006.01)

(56) References Cited

U.S. PATENT DOCUMENTS

| | | |
|---|---|---|
| 3,991,357 A | 11/1976 | Kaminski |
| 4,157,506 A | 6/1979 | Spencer |
| 4,183,290 A | 1/1980 | Kucharczyk |
| 4,223,831 A | 9/1980 | Szarka |
| 4,308,991 A | 1/1982 | Peinetti et al. |
| 4,335,847 A | 6/1982 | Levine |
| 4,408,711 A | 10/1983 | Levine |
| 4,506,827 A | 3/1985 | Jamieson et al. |
| 4,528,459 A | 7/1985 | Wiegel |
| 4,615,380 A | 10/1986 | Beckey |
| 4,646,964 A | 3/1987 | Parker et al. |
| 4,656,835 A | 4/1987 | Kidder et al. |
| 4,657,179 A | 4/1987 | Aggers et al. |
| 4,674,027 A | 6/1987 | Beckey |
| 4,685,614 A | 8/1987 | Levine |
| 4,695,246 A | 9/1987 | Beilfuss et al. |
| 4,741,476 A | 5/1988 | Russo et al. |
| 4,742,475 A | 5/1988 | Kaiser et al. |
| 4,751,961 A | 6/1988 | Levine et al. |
| 4,772,876 A | 9/1988 | Laud |
| 4,842,510 A | 6/1989 | Grunden et al. |
| 4,872,828 A | 10/1989 | Mierzwinski et al. |
| 4,881,686 A | 11/1989 | Mehta |
| 4,897,798 A | 1/1990 | Cler |
| 4,898,229 A | 2/1990 | Brown et al. |
| 4,948,040 A | 8/1990 | Kobayashi et al. |
| 4,948,044 A | 8/1990 | Cacciatore |
| 4,955,806 A | 9/1990 | Grunden et al. |
| 4,971,136 A | 11/1990 | Mathur et al. |
| 5,088,645 A | 2/1992 | Bell |
| 5,107,918 A | 4/1992 | McFarlane et al. |
| 5,127,464 A | 7/1992 | Butler et al. |
| 5,158,477 A | 10/1992 | Testa et al. |
| 5,175,439 A | 12/1992 | Harer et al. |
| 5,211,332 A | 5/1993 | Adams |
| 5,224,648 A | 7/1993 | Simon et al. |
| 5,226,591 A | 7/1993 | Ratz |
| 5,240,178 A | 8/1993 | Dewolf et al. |
| 5,244,146 A | 9/1993 | Jefferson et al. |
| 5,251,813 A | 10/1993 | Kniepkamp |
| 5,255,179 A | 10/1993 | Zekan et al. |
| 5,260,669 A | 11/1993 | Higgins et al. |
| 5,347,982 A | 9/1994 | Binzer et al. |
| 5,348,078 A | 9/1994 | Dushane et al. |
| 5,352,930 A | 10/1994 | Ratz |
| 5,381,950 A | 1/1995 | Aldridge |
| 5,395,042 A | 3/1995 | Riley et al. |
| 5,422,808 A | 6/1995 | Catanese, Jr. et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,476,221 A | 12/1995 | Seymour |
| 5,499,196 A | 3/1996 | Pacheco |
| 5,506,569 A | 4/1996 | Rowlette |
| 5,533,668 A | 7/1996 | Erikson |
| 5,544,036 A | 8/1996 | Brown, Jr. et al. |
| 5,555,927 A | 9/1996 | Shah |
| 5,570,837 A | 11/1996 | Brown et al. |
| 5,595,342 A | 1/1997 | McNair et al. |
| 5,611,484 A | 3/1997 | Uhrich |
| 5,635,896 A | 6/1997 | Tinsley et al. |
| 5,644,173 A | 7/1997 | Elliason et al. |
| 5,646,349 A | 7/1997 | Twigg et al. |
| 5,655,709 A | 8/1997 | Garnett et al. |
| 5,697,552 A | 12/1997 | McHugh et al. |
| 5,736,795 A | 4/1998 | Zuehlke et al. |
| 5,761,083 A | 6/1998 | Brown, Jr. et al. |
| 5,802,467 A | 9/1998 | Salazar et al. |
| 5,808,294 A | 9/1998 | Neumann |
| 5,839,654 A | 11/1998 | Weber |
| 5,902,183 A | 5/1999 | D'Souza |
| 5,903,139 A | 5/1999 | Kompelien |
| 5,909,378 A | 6/1999 | De Milleville |
| 5,918,474 A | 7/1999 | Khanpara et al. |
| 5,926,776 A | 7/1999 | Glorioso et al. |
| 5,977,964 A | 11/1999 | Williams et al. |
| 6,060,719 A | 5/2000 | DiTucci et al. |
| 6,062,482 A | 5/2000 | Gauthier et al. |
| 6,066,843 A | 5/2000 | Scheremeta |
| 6,072,784 A | 6/2000 | Agrawal et al. |
| 6,084,518 A | 7/2000 | Jamieson |
| 6,088,688 A | 7/2000 | Crooks et al. |
| 6,089,310 A | 7/2000 | Toth et al. |
| 6,095,427 A | 8/2000 | Hoium et al. |
| 6,098,893 A | 8/2000 | Berglund et al. |
| 6,116,512 A | 9/2000 | Dushane et al. |
| 6,213,404 B1 | 4/2001 | Dushane et al. |
| 6,216,956 B1 | 4/2001 | Ehlers et al. |
| 6,222,719 B1 | 4/2001 | Kadah |
| 6,275,160 B1 | 8/2001 | Ha |
| 6,315,211 B1 | 11/2001 | Sartain et al. |
| 6,336,593 B1 | 1/2002 | Bhatnagar |
| 6,349,883 B1 | 2/2002 | Simmons et al. |
| 6,356,038 B2 | 3/2002 | Bishel |
| 6,356,204 B1 | 3/2002 | Guindi et al. |
| 6,370,894 B1 | 4/2002 | Thompson et al. |
| 6,385,510 B1 | 5/2002 | Hoog et al. |
| 6,415,205 B1 | 7/2002 | Myron et al. |
| 6,453,687 B2 | 9/2002 | Sharood et al. |
| 6,478,233 B1 | 11/2002 | Shah |
| 6,509,838 B1 | 1/2003 | Payne et al. |
| 6,513,723 B1 | 2/2003 | Mueller et al. |
| 6,519,509 B1 | 2/2003 | Nierlich et al. |
| 6,566,768 B2 | 5/2003 | Zimmerman et al. |
| 6,574,581 B1 | 6/2003 | Bohrer et al. |
| 6,604,023 B1 | 8/2003 | Brown et al. |
| 6,619,055 B1 | 9/2003 | Addy |
| 6,619,555 B2 | 9/2003 | Rosen |
| 6,622,115 B1 | 9/2003 | Brown et al. |
| 6,622,925 B2 | 9/2003 | Carner et al. |
| 6,623,311 B1 | 9/2003 | Dehan |
| 6,631,185 B1 | 10/2003 | Fleming, III |
| 6,645,066 B2 | 11/2003 | Gutta et al. |
| 6,657,418 B2 | 12/2003 | Atherton |
| 6,743,010 B2 | 6/2004 | Bridgeman et al. |
| 6,769,482 B2 | 8/2004 | Wagner et al. |
| 6,789,739 B2 | 9/2004 | Rosen |
| 6,794,771 B2 | 9/2004 | Orloff |
| 6,798,341 B1 | 9/2004 | Eckel et al. |
| 6,851,621 B1 | 2/2005 | Wacker et al. |
| 6,886,754 B2 | 5/2005 | Smith et al. |
| 6,891,838 B1 | 5/2005 | Petite et al. |
| 6,904,385 B1 | 6/2005 | Budike, Jr. |
| 6,909,921 B1 | 6/2005 | Bilger |
| 6,956,463 B2 | 10/2005 | Crenella et al. |
| 6,975,958 B2 | 12/2005 | Bohrer et al. |
| 6,983,889 B2 | 1/2006 | Alles |
| 6,990,821 B2 | 1/2006 | Singh et al. |

(56) References Cited

U.S. PATENT DOCUMENTS

| | | |
|---|---|---|
| 6,997,390 B2 | 2/2006 | Alles |
| 7,024,336 B2 | 4/2006 | Salsbury et al. |
| 7,055,759 B2 | 6/2006 | Wacker et al. |
| 7,130,719 B2 | 10/2006 | Ehlers et al. |
| 7,135,965 B2 | 11/2006 | Chapman, Jr. et al. |
| 7,149,727 B1 | 12/2006 | Nicholls et al. |
| 7,149,729 B2 | 12/2006 | Kaasten et al. |
| 7,156,316 B2 | 1/2007 | Kates |
| 7,168,627 B2 | 1/2007 | Kates |
| 7,174,239 B2 | 2/2007 | Butler et al. |
| 7,188,482 B2 | 3/2007 | Sadegh et al. |
| 7,200,467 B2 | 4/2007 | Schanin et al. |
| 7,289,887 B2 | 10/2007 | Rodgers |
| 7,360,370 B2 | 4/2008 | Shah et al. |
| 7,379,791 B2 | 5/2008 | Tamarkin et al. |
| RE40,437 E | 7/2008 | Rosen |
| 7,434,742 B2 | 10/2008 | Mueller et al. |
| 7,460,690 B2 | 12/2008 | Cohen et al. |
| 7,469,550 B2 | 12/2008 | Chapman, Jr. et al. |
| 7,476,988 B2 | 1/2009 | Mulhouse et al. |
| 7,510,126 B2 | 3/2009 | Rossi et al. |
| 7,537,171 B2 | 5/2009 | Mueller et al. |
| 7,558,648 B2 | 7/2009 | Hoglund et al. |
| 7,571,865 B2 | 8/2009 | Nicodem et al. |
| 7,605,714 B2 | 10/2009 | Thompson et al. |
| 7,644,869 B2 | 1/2010 | Hoglund et al. |
| 7,648,077 B2 | 1/2010 | Rossi et al. |
| 7,673,809 B2 | 3/2010 | Juntunen |
| 7,702,424 B2 | 4/2010 | Cannon et al. |
| 7,703,694 B2 | 4/2010 | Mueller et al. |
| D614,976 S | 5/2010 | Skafdrup et al. |
| 7,720,576 B2 | 5/2010 | Warren et al. |
| 7,735,118 B2 | 6/2010 | Brok et al. |
| 7,746,242 B2 | 6/2010 | Schwendinger et al. |
| 7,748,640 B2 | 7/2010 | Roher et al. |
| 7,755,220 B2 | 7/2010 | Sorg et al. |
| 7,775,452 B2 | 8/2010 | Shah et al. |
| 7,784,704 B2 | 8/2010 | Harter |
| 7,802,618 B2 | 9/2010 | Simon et al. |
| 7,832,465 B2 | 11/2010 | Zou et al. |
| 7,837,128 B2 | 11/2010 | Helt et al. |
| 7,841,542 B1 | 11/2010 | Rosen |
| 7,847,681 B2 | 12/2010 | Singhal et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,933,689 B2 | 4/2011 | Warren et al. |
| 7,975,292 B2 | 7/2011 | Corella |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| D660,732 S | 5/2012 | Bould et al. |
| 8,174,381 B2 | 5/2012 | Imes et al. |
| 8,180,492 B2 | 5/2012 | Steinberg |
| 8,219,249 B2 | 7/2012 | Harrod et al. |
| 8,234,694 B2 | 7/2012 | Youn et al. |
| 8,249,731 B2 | 8/2012 | Tran et al. |
| 8,255,090 B2 | 8/2012 | Frader-Thompson et al. |
| 8,265,798 B2 | 9/2012 | Imes |
| 8,415,829 B2 | 4/2013 | Di Cristofaro |
| 8,442,752 B2 | 5/2013 | Wijaya et al. |
| 8,510,255 B2 | 8/2013 | Fadell et al. |
| 8,727,611 B2 | 5/2014 | Huppi et al. |
| 8,740,101 B2 | 6/2014 | Leen et al. |
| 8,752,771 B2 | 6/2014 | Warren et al. |
| 8,757,507 B2 | 6/2014 | Fadell et al. |
| 8,788,103 B2 | 7/2014 | Warren et al. |
| 8,918,219 B2 | 12/2014 | Sloo et al. |
| 2002/0005707 A1 | 1/2002 | Kerai et al. |
| 2002/0074865 A1 | 6/2002 | Zimmerman et al. |
| 2002/0075145 A1 | 6/2002 | Hardman et al. |
| 2002/0198629 A1 | 12/2002 | Ellis |
| 2003/0037555 A1 | 2/2003 | Street et al. |
| 2003/0064335 A1 | 4/2003 | Canon |
| 2003/0090243 A1 | 5/2003 | Atherton |
| 2003/0151513 A1 | 8/2003 | Hermann et al. |
| 2003/0231001 A1 | 12/2003 | Bruning |
| 2004/0090329 A1 | 5/2004 | Hitt |
| 2004/0117311 A1 | 6/2004 | Agarwal et al. |
| 2004/0120084 A1 | 6/2004 | Readio et al. |
| 2004/0164238 A1 | 8/2004 | Xu et al. |
| 2004/0209209 A1 | 10/2004 | Chodacki et al. |
| 2004/0245349 A1 | 12/2004 | Smith |
| 2004/0249479 A1 | 12/2004 | Shorrock |
| 2004/0256472 A1 | 12/2004 | DeLuca |
| 2005/0043907 A1 | 2/2005 | Eckel et al. |
| 2005/0053063 A1 | 3/2005 | Madhavan |
| 2005/0090915 A1 | 4/2005 | Geiwitz |
| 2005/0128067 A1 | 6/2005 | Zakrewski |
| 2005/0145705 A1 | 7/2005 | Shah et al. |
| 2005/0150968 A1 | 7/2005 | Shearer |
| 2005/0187867 A1 | 8/2005 | Sokolic et al. |
| 2005/0189429 A1 | 9/2005 | Breeden |
| 2005/0192915 A1 | 9/2005 | Ahmed et al. |
| 2005/0194455 A1 | 9/2005 | Alles |
| 2005/0194456 A1 | 9/2005 | Tessier et al. |
| 2005/0270151 A1 | 12/2005 | Winick |
| 2005/0280421 A1 | 12/2005 | Yomoda et al. |
| 2006/0102731 A1 | 5/2006 | Mueller et al. |
| 2006/0105697 A1 | 5/2006 | Aronstam et al. |
| 2006/0124759 A1 | 6/2006 | Rossi et al. |
| 2006/0147003 A1 | 7/2006 | Archacki et al. |
| 2006/0149395 A1 | 7/2006 | Archacki et al. |
| 2006/0164257 A1 | 7/2006 | Giubbini |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2007/0043478 A1 | 2/2007 | Ehlers et al. |
| 2007/0045431 A1 | 3/2007 | Chapman, Jr. et al. |
| 2007/0045432 A1 | 3/2007 | Juntunen |
| 2007/0095082 A1 | 5/2007 | Garrett et al. |
| 2007/0105252 A1 | 5/2007 | Lee et al. |
| 2007/0114295 A1 | 5/2007 | Jenkins |
| 2007/0114848 A1 | 5/2007 | Mulhouse et al. |
| 2007/0115902 A1 | 5/2007 | Shamoon et al. |
| 2007/0131787 A1 | 6/2007 | Rossi et al. |
| 2007/0132503 A1 | 6/2007 | Nordin |
| 2007/0205297 A1 | 9/2007 | Finkam et al. |
| 2007/0228183 A1 | 10/2007 | Kennedy et al. |
| 2007/0241203 A1 | 10/2007 | Wagner et al. |
| 2007/0266575 A1 | 11/2007 | Nash |
| 2007/0296280 A1 | 12/2007 | Sorg et al. |
| 2008/0015740 A1 | 1/2008 | Osann |
| 2008/0015742 A1 | 1/2008 | Kulyk et al. |
| 2008/0054082 A1 | 3/2008 | Evans et al. |
| 2008/0094010 A1 | 4/2008 | Black |
| 2008/0099568 A1 | 5/2008 | Nicodem et al. |
| 2008/0128523 A1 | 6/2008 | Hoglund et al. |
| 2008/0133956 A1 | 6/2008 | Fadell |
| 2008/0147242 A1 | 6/2008 | Roher et al. |
| 2008/0161977 A1 | 7/2008 | Takach et al. |
| 2008/0183335 A1 | 7/2008 | Poth et al. |
| 2008/0185450 A1 | 8/2008 | Kwon et al. |
| 2008/0191045 A1 | 8/2008 | Harter |
| 2008/0221737 A1 | 9/2008 | Josephson et al. |
| 2008/0273754 A1 | 11/2008 | Hick et al. |
| 2008/0317292 A1 | 12/2008 | Baker et al. |
| 2009/0045263 A1 | 2/2009 | Mueller et al. |
| 2009/0057425 A1 | 3/2009 | Sullivan et al. |
| 2009/0057427 A1 | 3/2009 | Geadelmann et al. |
| 2009/0070412 A1 | 3/2009 | D'Angelo et al. |
| 2009/0099697 A1 | 4/2009 | Li et al. |
| 2009/0127932 A1 | 5/2009 | Warren et al. |
| 2009/0140057 A1 | 6/2009 | Leen |
| 2009/0171862 A1 | 7/2009 | Harrod et al. |
| 2009/0192894 A1 | 7/2009 | Dikeman |
| 2009/0194601 A1 | 8/2009 | Flohr |
| 2009/0236433 A1 | 9/2009 | Mueller et al. |

(56) References Cited

U.S. PATENT DOCUMENTS

| | | |
|---|---|---|
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0297901 A1 | 12/2009 | Kilian et al. |
| 2009/0327354 A1 | 12/2009 | Resnick et al. |
| 2010/0000239 A1 | 1/2010 | Lifson et al. |
| 2010/0006660 A1 | 1/2010 | Leen et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0058450 A1 | 3/2010 | Fein et al. |
| 2010/0070084 A1 | 3/2010 | Steinberg et al. |
| 2010/0070086 A1 | 3/2010 | Harrod et al. |
| 2010/0070099 A1 | 3/2010 | Watson et al. |
| 2010/0070234 A1 | 3/2010 | Steinberg et al. |
| 2010/0084482 A1 | 4/2010 | Kennedy et al. |
| 2010/0084918 A1 | 4/2010 | Fells et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0182743 A1 | 7/2010 | Roher |
| 2010/0191387 A1 | 7/2010 | Warren et al. |
| 2010/0193592 A1 | 8/2010 | Simon et al. |
| 2010/0199086 A1 | 8/2010 | Kuang et al. |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0025257 A1 | 2/2011 | Weng |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054699 A1 | 3/2011 | Imes et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0078675 A1 | 3/2011 | Van Camp et al. |
| 2011/0119747 A1 | 5/2011 | Lambiase |
| 2011/0151837 A1 | 6/2011 | Winbush, III |
| 2011/0152024 A1 | 6/2011 | Kuehl |
| 2011/0160913 A1 | 6/2011 | Parker et al. |
| 2011/0185895 A1 | 8/2011 | Freen |
| 2011/0241624 A1 | 10/2011 | Park et al. |
| 2011/0253796 A1 | 10/2011 | Posa et al. |
| 2011/0282937 A1 | 11/2011 | Deshpande et al. |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0066168 A1 | 3/2012 | Fadell et al. |
| 2012/0085831 A1 | 4/2012 | Kopp |
| 2012/0101637 A1 | 4/2012 | Imes et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130679 A1 | 5/2012 | Fadell et al. |
| 2012/0158350 A1 | 6/2012 | Steinberg et al. |
| 2012/0179300 A1 | 7/2012 | Warren et al. |
| 2012/0199660 A1 | 8/2012 | Warren et al. |
| 2012/0203379 A1 | 8/2012 | Sloo et al. |
| 2012/0221151 A1 | 8/2012 | Steinberg |
| 2012/0233478 A1 | 9/2012 | Mucignat et al. |
| 2012/0248210 A1 | 10/2012 | Warren et al. |
| 2012/0248211 A1 | 10/2012 | Warren et al. |
| 2012/0252430 A1 | 10/2012 | Imes et al. |
| 2013/0173064 A1 | 7/2013 | Fadell et al. |
| 2013/0228633 A1 | 9/2013 | Toth, et al. |

FOREIGN PATENT DOCUMENTS

| | | |
|---|---|---|
| EP | 196069 | 12/1991 |
| EP | 510807 | 10/1992 |
| EP | 660287 | 6/1995 |
| EP | 690363 | 1/1996 |
| EP | 1275037 | 2/2006 |
| EP | 2302326 | 3/2011 |
| GB | 2294828 | 5/1996 |
| JP | 59106311 | 6/1984 |
| JP | 01252850 | 10/1989 |
| JP | 09298780 | 11/1997 |
| JP | 10023565 | 1/1998 |
| WO | 2008054938 | 5/2008 |
| WO | 2013058820 | 4/2013 |

OTHER PUBLICATIONS

Bourke, Server Load Balancing, O'Reilly & Associates, Inc., Aug. 2001, 182 pages.

White et al., A Conceptual Model for Simulation Load Balancing, Proceedings of the 1998 Spring Simulation Interoperability Workshop, 1998, pp. 1-7.

Ecobee Smart Thermostat Installation Manual, Jun. 29, 2011, 20 pages.

Ecobee Smart Thermostat User Manual, May 11, 2010, 20 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Electric Heat Lock Out on Heat Pumps, Washington State University Extension Energy Program, Apr. 2010, pp. 1-3.

Hunter Internet Thermostat Installation Guide, Hunter Fan Co., Aug. 14, 2012, 8 pages.

SYSTXCCUIZ01-V Infinity Control Installation Instructions, Carrier Corp, May 31, 2012, 20 pages.

Trane Communicating Thermostats for Fan Coil, Trane, May 2011, 32 pages.

Trane Communicating Thermostats for Heat Pump Control, Trane, May 2011, 32 pages.

VisionPRO Wi-Fi Programmable Thermostat User Guide, Honeywell International, Inc., Aug. 2012, 48 pages.

Arens et al., Demand Response Enabling Technology Development, Phase I Report: Jun. 2003-Nov. 2005, University of California Berkeley, Apr. 4, 2006, pp. 1-108.

Arens et al., New Thermostat Demand Response Enabling Technology, Poster, University of California Berkeley, Jun. 10, 2004.

Aprilaire Electronic Thermostats Model 8355 User's Manual, Research Products Corporation, Dec. 2000, 16 pages.

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Honeywell Installation Guide FocusPRO TH6000 Series, Honeywell International, Inc., Jan. 5, 2012, 24 pages.

Honeywell Operating Manual FocusPRO TH6000 Series, Honeywell International, Inc., Mar. 25, 2011, 80 pages.

Honeywell Prestige THX9321-9421 Operating Manual, Honeywell International, Inc., Jul. 6, 2011, 120 pages.

Honeywell Prestige THX9321 and TXH9421 Product Data, Honeywell International, Inc., 68-0311, Jan. 2012, 126 pages.

Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.

Lennox ComfortSense 5000 Owners Guide, Lennox Industries, Inc., Feb. 2008, 32 pages.

Lennox ComfortSense 7000 Owners Guide, Lennox Industries, Inc., May 2009, 15 pages.

(56) References Cited

OTHER PUBLICATIONS

Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Deleeuw, Ecobee WiFi enabled Smart Thermostat Part 2: The Features Review, retrieved from the Internet: <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Building, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Allen et al., Real-Time Earthquake Detection and Hazard Assessment by ElarmS Across California, Geophysical Research Letters, vol. 36, L00B08, 2009, pp. 1-6.
Chatzigiannakis et al., "Priority Based Adaptive Coordination of Wireless Sensors and Actors", [online] Q2SWinet '06, Oct. 2, 2006 [Retrieved on Mar. 12, 2012]. Retrieved from the Internet: <URL: http://dl.acm.org/citation.cfm?id=1163681>.
Akhlaghinia et al., "Occupancy Monitoring in Intelligent Environment through Integrated Wireless Localizing Agents", IEEE, 2009, 7 pages.
Akhlaghinia et al., "Occupant Behaviour Prediction in Ambient Intelligence Computing Environment", Journal of Uncertain Systems, vol. 2, No. 2, 2008, pp. 85-100.
Ros et al., "Multi-Sensor Human Tracking with the Bayesian Occupancy Filter", IEEE, 2009, 8 pages.
Stigge, Jr., B. J. (2001). Informed Home Energy Behavior: Developing a tool for homeowners to monitor, plan and learn about energy conservation (Master's thesis). Massachusetts Institute of Technology, Cambridge.
Wong et al., "Maximum Likelihood Estimation of ARMA Model with Error Processes for Replicated Observations", National University of Singapore, Department of Economics, Working Paper No. 0217, 2002, 19 pages.

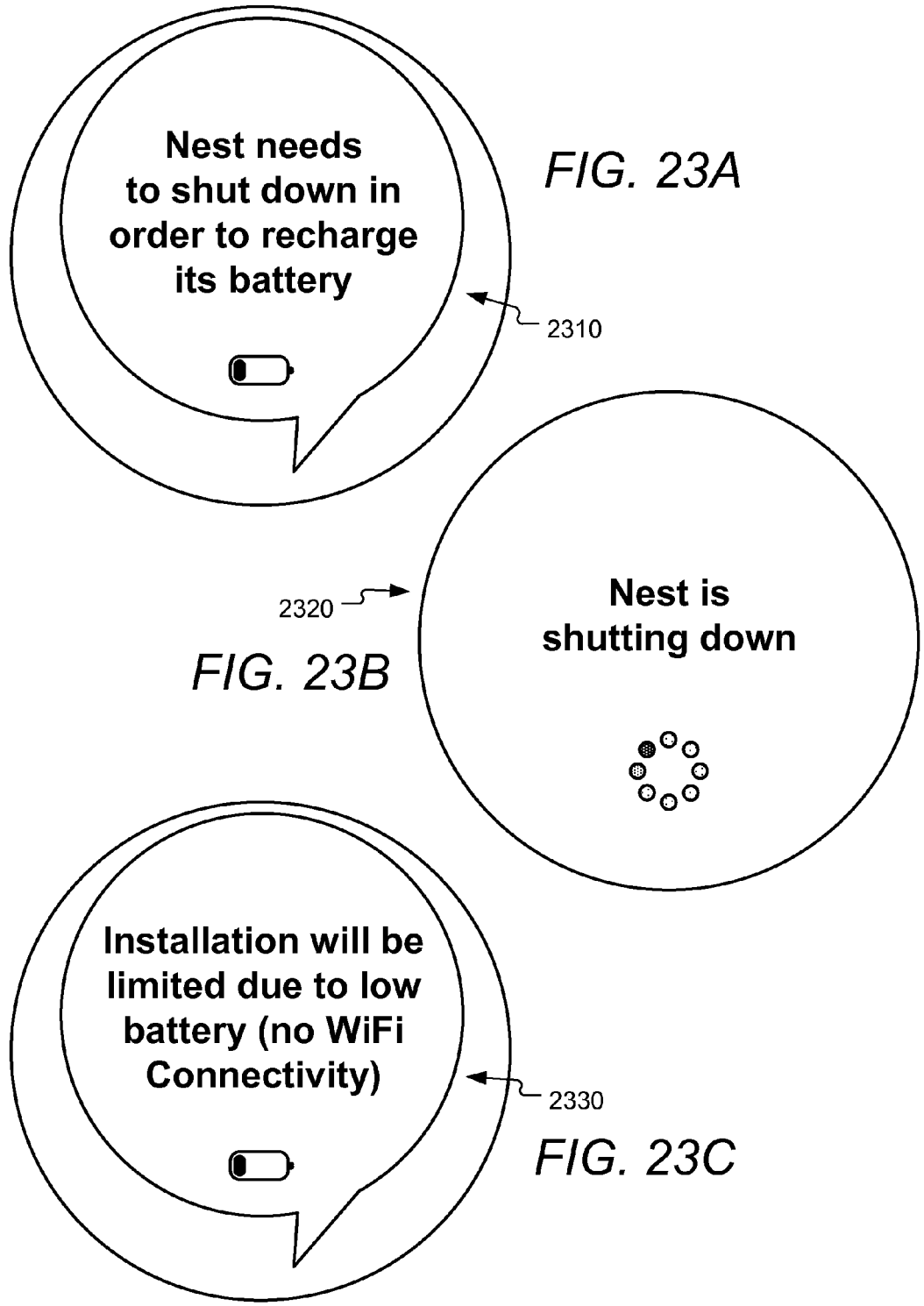

INSTALLATION OF THERMOSTAT POWERED BY RECHARGEABLE BATTERY

CROSS-REFERENCES TO RELATED APPLICATIONS

This application is a continuation-in-part of the following commonly-assigned applications: U.S. Ser. No. 13/467,025, filed May 8, 2012; U.S. Ser. No. 13/267,877, filed Oct. 6, 2011; U.S. Ser. No. 13/034,674 filed Feb. 24, 2011; and U.S. Ser. No. 13/034,678 filed Feb. 24, 2011. U.S. Ser. No. 13/467,025 claims the benefit of U.S. Provisional Application No. 61/627,996 filed Oct. 21, 2011. Each of U.S. Ser. No. 13/267,877, U.S. Ser. No. 13/034,674, and U.S. Ser. No. 13/034,678 claims the benefit of each of U.S. Provisional Application No. 61/415,771, filed Nov. 19, 2010, and U.S. Provisional Application No. 61/429,093, filed Dec. 31, 2010. Each of the above-referenced patent applications is incorporated herein by reference in its entirety for all purposes.

FIELD

This patent specification relates to systems and methods for the monitoring and control of energy-consuming systems or other resource-consuming systems. More particularly, this patent specification relates to the installation of thermostats for the operation of heating, ventilation, and air conditioning (HVAC) systems wherein the thermostats are powered by rechargeable batteries.

BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As is known, for example as discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two external connections required.

When electronics began to be used in thermostats the fact that the thermostat was not directly wired to both sides of the transformer for its power source created a problem. This meant either the thermostat had to have its own independent power source, such as a battery, or be hardwired directly from the system transformer. Direct hardwiring a "common" wire from the transformer to the electronic thermostat may be very difficult and costly. However, there are also disadvantages to using a battery for providing the operating power. One primary disadvantage is the need to continually check and replace the battery. If the battery is not properly replaced and cannot provide adequate power, the electronic thermostat may fail during a period of extreme environmental conditions.

Because many households do not have a direct wire from the system transformer (such as a "common" wire), some thermostats have been designed to derive power from the transformer through the equipment load. The methods for powering an electronic thermostat from the transformer with a single direct wire connection to the transformer are called "power stealing" or "power sharing." The thermostat "steals," "shares" or "harvests" its power during the "OFF" periods of the heating or cooling system by allowing a small amount of current to flow through it into the load coil below its response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing or must use disposable batteries.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Issues arise in relation to providing microprocessor-controlled, network-connected thermostats, one or more such issues being at least partially resolved by one or more of the embodiments described hereinbelow. On the one hand, it is desirable to provide a thermostat having advanced functionalities such as those associated with relatively powerful microprocessors and reliable wireless communications chips, while also providing a thermostat that has an attractive, visually pleasing electronic display that users will find appealing to behold and interact with. On the other hand, it is desirable to provide a thermostat that is compatible and adaptable for installation in a wide variety of homes, including a substantial percentage of homes that are not equipped with the "common" wire discussed above. It is still further desirable to provide such a thermostat that accommodates easy do-it-yourself installation such that the expense and inconvenience of arranging for an HVAC technician to visit the premises to install the thermostat can be avoided for a large number of users. It is still further desirable to provide a thermostat having such processing power, wireless communications capabilities, visually pleasing display qualities, and other advanced functionalities, while also being a thermostat that, in addition to not requiring a "common" wire, likewise does not require to be plugged into household line current or a so-called "power brick," which can be inconvenient for the particular location of the thermostat as well as unsightly. It is still further desirable to provide an enhanced out-of-box user installation process when the thermostat that is powered by a rechargeable battery.

SUMMARY

According to one or more embodiments, in a microprocessor-controlled thermostat, a method is described for facilitating installation thereof. The thermostat is designed to control a heating, ventilation, and air conditioning (HVAC) system is being powered at least in part with a rechargeable battery. The method includes measuring a charge level value for the rechargeable battery using a processing system, the rechargeable battery and processing system being housed within the thermostat. In cases where the measured charge level value is above a first predetermined threshold, an interactive graphical user interface comprising an electronic display disposed within a housing of the thermostat to interact with a user is used so as to carry out a full installation procedure of the thermostat so as to control the HVAC system. The installation procedure includes a first set of installation steps for setting up a plurality of thermostat features. The processing system is configured to be in operative communication with one or more temperature sensors for determining an ambient air temperature, in operative communication with one or more input devices including said user interface, and in further operative communication with the HVAC system to control the HVAC system based at least in part on a comparison of a measured ambient temperature and a setpoint temperature value. In cases where the measured charge level value is below the first predetermined threshold, the electronic display is used to display a graphical representation sufficient to communicate to the user that installation steps of a procedure for installing the thermostat will be a limited due to a low battery level. The interactive graphical user interface is then used to carry out a limited installation procedure including a second set of installation steps for setting up one or more thermostat features, the second set of installation steps being a subset of the first set of installation steps. The processing system is used to modify configuration information of the thermostat based at least in part on the first or second installation procedures, and the modified configuration information of the thermostat is then used when controlling one or more HVAC system components of the HVAC system by the processing system.

According to some embodiments, a thermostat is described that includes: a housing; a rechargeable battery disposed within the housing; battery monitoring circuitry disposed within the housing configured to measure a charge level for the rechargeable battery; an interactive graphical user interface comprising an electronic display, the display disposed within the housing; and a processing system disposed within the housing and coupled to the user interface. The processing system is configured to be powered at least in part by the rechargeable battery, in operative communication with the battery monitoring circuitry, in operative communication with one or more temperature sensors for determining an ambient air temperature, in operative communication with one or more input devices including said user interface for receiving input from a user, and in still further operative communication with a heating, ventilation, and air conditioning (HVAC) system to control the HVAC system based at least in part on a comparison of a measured ambient temperature and a setpoint temperature value. The processing system is further configured to: when the measured charge level value is above a first predetermined threshold use the electronic display to interact with a user so as to carry out a full installation procedure of the thermostat so as to control the HVAC system, the installation procedure including a first set of installation steps for setting up a plurality of thermostat features; when the measured charge level value is below the first predetermined threshold, use the electronic display to display a graphical representation sufficient to communicate to the user that installation steps of a procedure for installing the thermostat will be a limited due to a low battery level, and use the interactive graphical user interface to carry out a limited installation procedure including a second set of installation steps for setting up one or more thermostat features, the second set of installation steps being a subset of the first set of installation steps; modify configuration information of the thermostat based at least in part on the first or second installation procedures; and using the modified configuration information of the thermostat when controlling one or more HVAC system components of the HVAC system by the processing system.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 23A-23C are illustrations showing example notifications displayed to a user, according to some embodiments.

DETAILED DESCRIPTION

Figure 1:
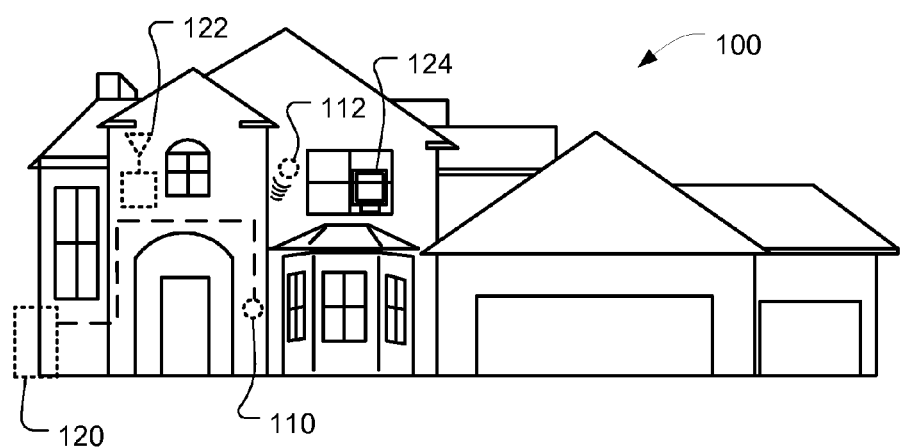
FIG. 1 is a diagram of an enclosure with an HVAC system, according to some embodiments.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Provided according to one or more embodiments are systems, methods, computer program products, and related business methods for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, elegant to behold, and delightfully easy to use. The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any decor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input.

As used herein, a "primary" thermostat refers to a thermostat that is electrically connected to actuate all or part of an HVAC system, such as by virtue of electrical connection to HVAC control wires (e.g. W, G, Y, etc.) leading to the HVAC system.

As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat.

In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN 310. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN 310. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service. Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
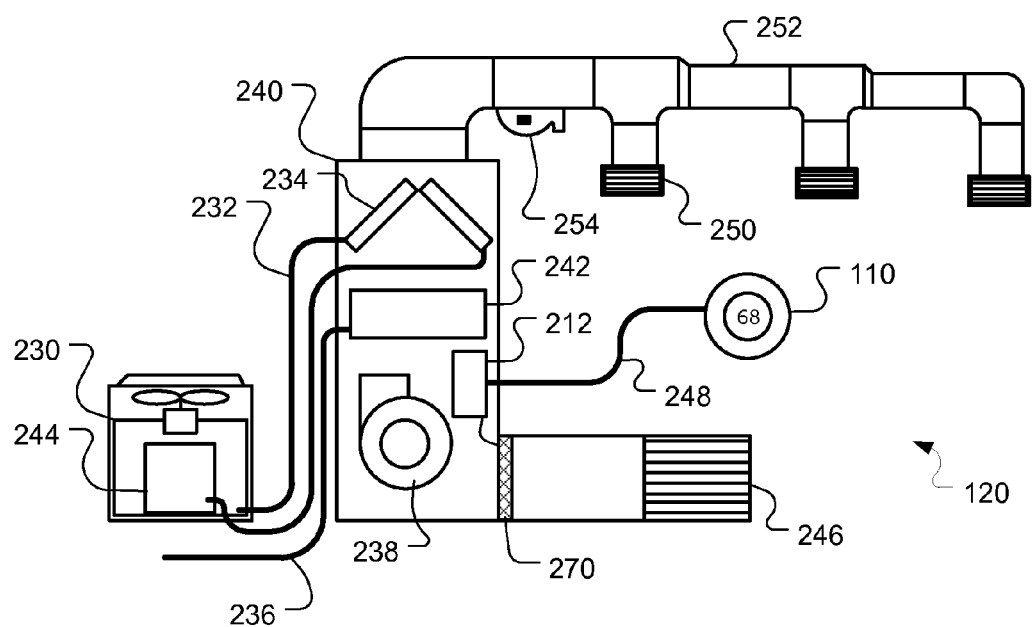
FIG. 2 is a diagram of an HVAC system, according to some embodiments.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
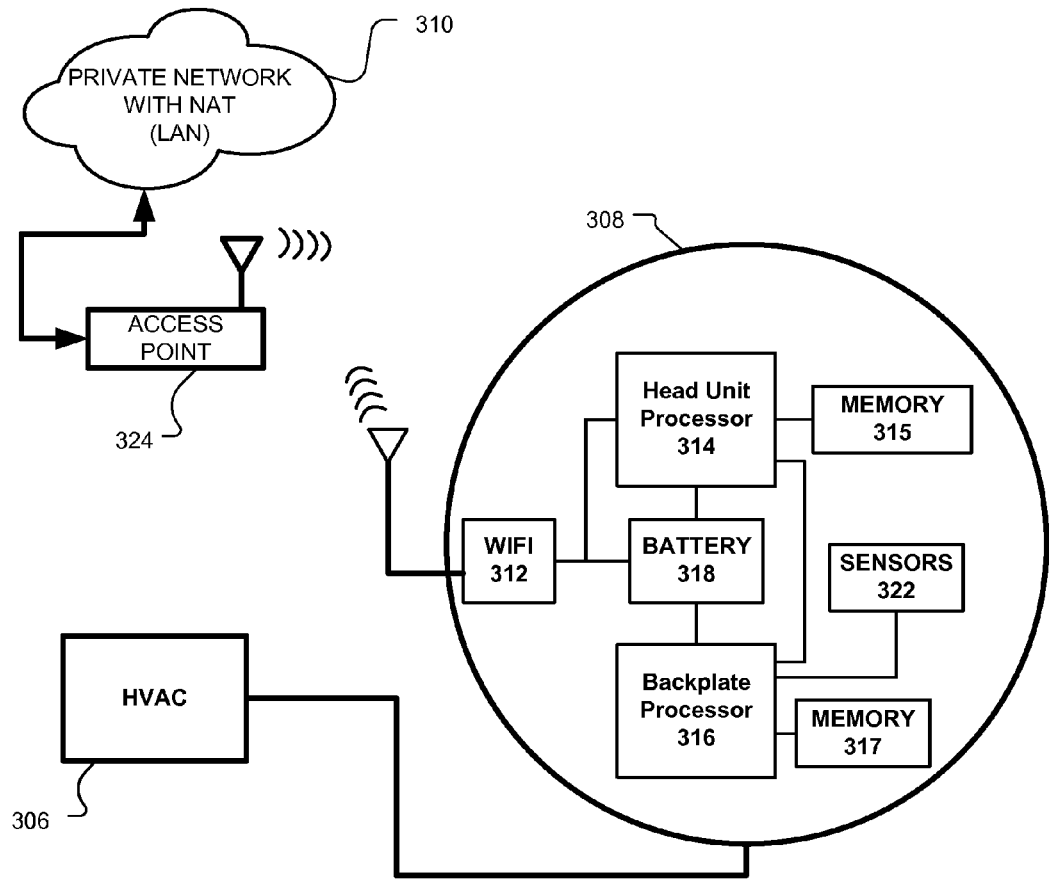
FIG. 3A is a schematic block diagram that provides an overview of some components inside a thermostat in accordance with embodiments of the present invention.

Referring to FIG. 3A, a schematic block diagram provides an overview of some components inside a thermostat in accordance with embodiments of the present invention. Thermostat 308 is similar to thermostat 112 in FIG. 1 except that thermostat 308 also illustrates and highlights selected internal components including a Wi-Fi module 312 and antenna, a head unit processor 314 with associated memory 315, a backplate processor 316 with associated memory, and sensors 322 (e.g., temperature, humidity, motion, ambient light, proximity). In one embodiment, head unit processor 314 can be a Texas Instruments AM3703 Sitara ARM microprocessor while backplate processor 316, which may be more specifically referenced to as a "microcontroller", can be a Texas Instruments MSP430F microcontroller. Further details regarding the physical placement and configuration of the thermostat head unit, backplate, and other physical elements are described in the commonly assigned U.S. Ser. No. 13/199,108, which is incorporated by reference herein.

For some embodiments, the backplate processor 316 is a very low-power device that, while having some computational capabilities, is substantially less powerful than the head unit processor 314. The backplate processor 316 is coupled to, and responsible for polling on a regular basis, most or all of the sensors 322 including the temperature and humidity sensors, motion sensors, ambient light sensors, and proximity sensors. For sensors 322 that may not be located on the backplate hardware itself but rather are located in the head unit, ribbon cables or other electrical connections between the head unit and backplate are provided for this purpose. Notably, there may be other sensors (not shown) for which the head unit processor 314 is responsible, with one example being a ring rotation sensor that senses the user rotation of an outer ring of the thermostat. Each of the head unit processor 314 and backplate processor 316 is capable of entering into a "sleep" state, and then "waking up" to perform various tasks.

The backplate processor 316, which in some embodiments will have a low-power sleep state that corresponds simply to a lower clock speed, generally enters into and out of its sleep mode substantially more often than does the more powerful head unit processor 314. The backplate processor 316 is capable of waking up the head unit processor 314 from its sleep state. For one preferred embodiment directed to optimal battery conservation, the head unit processor 314 is allowed to sleep when its operations are not being called for, while the backplate processor 316 performs polling of the sensors 322 on an ongoing basis, maintaining the sensor results in memory 317. The backplate processor 316 will wake up the head unit processor 314 in the event that (i) the sensor data indicates that an HVAC operation may be called for, such as if the current temperature goes below a currently active heating setpoint, or (ii) the memory 317 gets full and the sensor data needs to be transferred up to the head unit processor 314 for storage in the memory 315. The sensor data can then be pushed up to the cloud server (thermostat management server) during a subsequent active communication session between the cloud server and the head unit processor 314.

In the case of Wi-Fi module 312, one embodiment may be implemented using Murata Wireless Solutions LBWA19XSLZ module, which is based on the Texas Instruments WL1270 chipset supporting the 802.11b/g/n WLAN standard. Embodiments of the present invention configure and program Wi-Fi module 312 to allow thermostat 308 to enter into a low power or "sleep" mode to conserve energy until one or several events occurs. For example, in some embodiments the Wi-Fi module 312 may leave this low power mode when a user physically operates thermostat 308, which in turn may also cause activation of both head-unit processor 314 and backplate processor 316 for controlling functions in head-unit and backplate portions of thermostat 110.

It is also possible for Wi-Fi module 312 to wake from a low power mode at regular intervals in response to a beacon from wireless access point 324. To conserve energy, Wi-Fi module 312 may briefly leave the low power mode to acknowledge the beacon as dictated by the appropriate wireless standard and then return to a low power mode without activating the processors or other components of thermostat 308 in FIG. 3A. In an alternative embodiment, Wi-Fi module 312 may also respond to the beacon by awaking briefly and then activating backplate processor 316, head unit processor 314, or other portions of thermostat 308 to gather data through sensors 322 and store the results in a data log 326 with a time stamp, event type and corresponding data listed for future reference. In accordance with one embodiment, backplate processor 316 may collect data in data log 326 and store in memory 320 for a period of time or until the log reaches a maximum predetermined size. At that point, the backplate processor 316 may wake head unit processor 314 to coordinate an upload of the data log 326 stored in memory 320 over a public network, such as the Internet, to cloud-based management server 516. Uploading data log 326 less frequently saves time and energy associated with more frequent transmission of individual records or log entries.

In yet another embodiment, Wi-Fi module 312 may selectively filter an incoming data packet to determine if the header is merely an acknowledgement packet (i.e., a keep-alive packet) or contains a payload that needs further processing. If the packet contains only a header and no payload, the Wi-Fi module 312 may be configured to either ignore the packet or send a return acknowledgement to the thermostat management system or other source of the packet received.

In further embodiments, Wi-Fi module 312 may be used to establish multiple communication channels between thermostat 112 and a cloud-based management server as will be described and illustrated later in this disclosure. As previously described, thermostat 112 uses multiple communication channels to receive different types of data classified with different levels of priority. In one embodiment, Wi-Fi module 312 may be programmed to use one or more filters and a wake-on-LAN feature to then selectively ignore or discard data arriving over one or more of these communication channels. For example, low-priority data arriving over a port on Wi-Fi module 312 may be discarded by disabling the corresponding wake-on-LAN feature associated with the port. This allows the communication channel to continue to operate yet conserves battery power by discarding or ignoring the low-priority packets.

Operation of the microprocessors 314, 316, Wi-Fi module 312, and other electronics may be powered by a rechargeable battery (318) located within the thermostat 110. In some embodiments, the battery is recharged directly using 24 VAC power off a "C" wire drawn from the HVAC system or an AC-DC transformer coupled directly into the thermostat 110. Alternatively, one or more different types of energy harvesting may also be used to recharge the internal battery if these direct methods are not available as described, for example, in U.S. Ser. No. 13/034,678, supra, and U.S. Ser. No. 13/267,871 filed Oct. 6, 2011, which is incorporated by reference herein. Embodiments of the present invention communicate and operate the thermostat 110 in a manner that promotes efficient use of the battery while also keeping the thermostat operating at a high level of performance and responsiveness controlling the HVAC system. Some embodiments may use the battery-level charge and the priority or relative importance of a communication to determine when a thermostat management system located on a public network such as the Internet may communicate with the thermostat 110. Further details on the communication methods and system used in accordance with these embodiments are described in detail later herein.

Figure 3B:
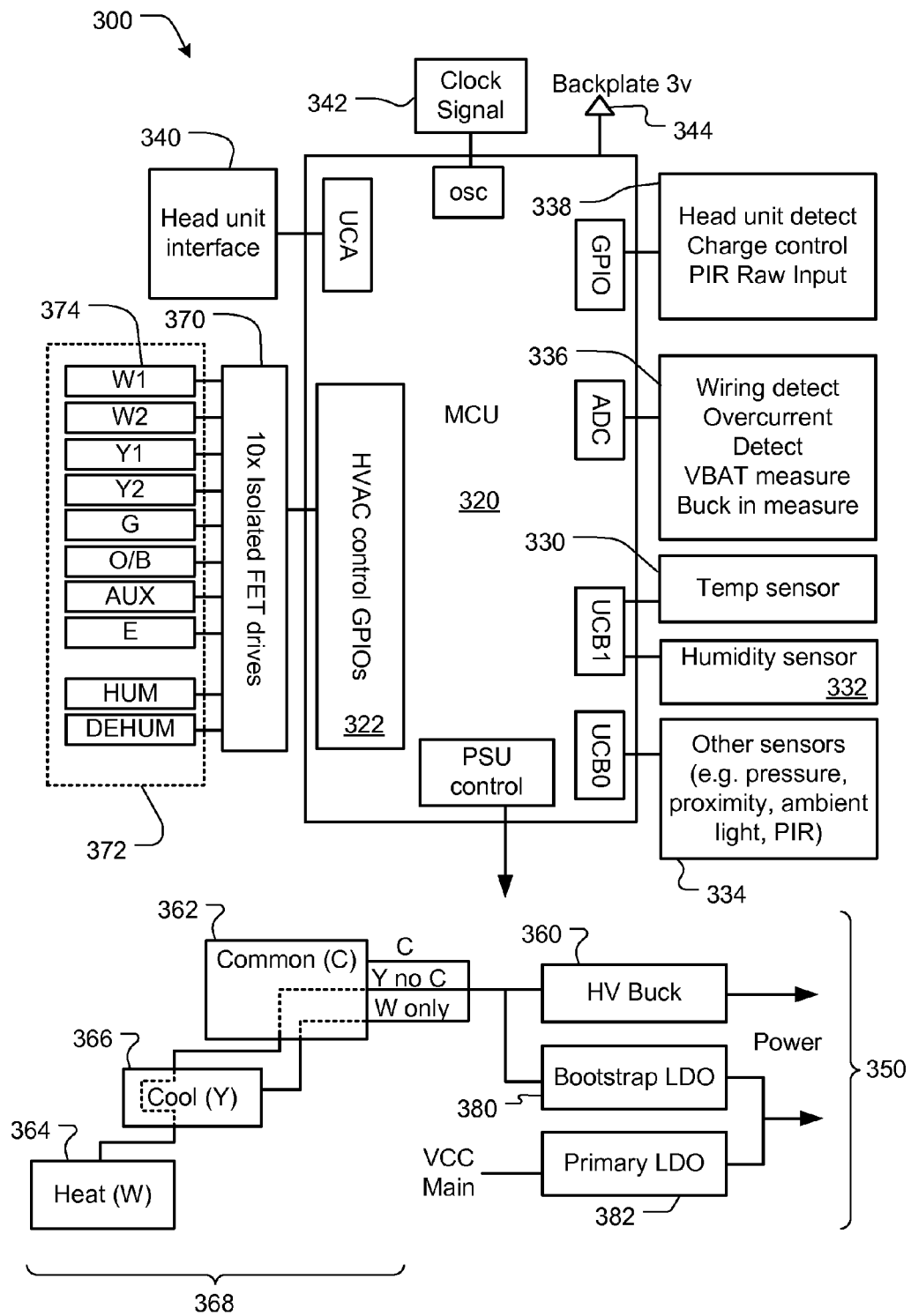
FIG. 3B is a block diagram of some circuitry of a thermostat, according to some embodiments.

Turning now to power harvesting methods and systems, FIG. 3B is a block diagram of some circuitry of a thermostat, according to some embodiments. Circuitry 300, according to some embodiments, is a backplate of a thermostat. A number of HVAC wires can be attached using HVAC terminals 372. One example of which is the W1 terminal 374. Each terminal is used to control an HVAC function. According to some embodiments, each of the wires from the terminals W1, W2, Y1, Y2, G, O/B, AUX and E is connected to separate isolated FET drives 370. The common HVAC functions for each of the terminals are: W1 and W2 heating; Y1 and Y2 for cooling; G for fan; O/B for heatpumps; and E for emergency heat. Note that although the circuitry 300 is able control 8 functions using the isolated FET drives 370, according to some embodiments, other functions, or fewer functions can be controlled. For example circuitry for a more simply equipped HVAC system may only have a single heating (W), and single cooling (Y) and a fan (G), in which case there would only be three isolated FET drives 370. According to a preferred embodiment, 5 FET drives 370 are provided, namely heating (W), cooling (Y), fan (G), auxiliary (AUX) and compressor direction (O/B). Not shown are the circuit returns such as RH (return for heat) and RC (return for cooling). According to some embodiments the thermostat can control a humidifier and/or de-humidifier. Further details relating to isolated FET drives 370 are described in co-pending U.S. patent application Ser. No. 13/034,674, supra.

The HVAC functions are controlled by the HVAC control general purpose input/outputs (GPIOs) 322 within microcontroller (MCU) 320. MCU 320 is a general purpose microcontroller such as the MSP430 16-bit ultra-low power MCU available from Texas Instruments. MCU 320 communicates with the head unit via Head Unit Interface 340. The head unit together with the backplate make up the thermostat. The head unit has user interface capability such that it can display information to a user via an LCD display and receive input from a user via buttons and/or touch screen input devices. According to some embodiments, the head unit has network capabilities for communication to other devices either locally or over the internet. Through such network capability, for example, the thermostat can send information and receive commands and setting from a computer located elsewhere inside or outside of the enclosure. The MCU detects whether the head unit is attached to the backplate via head unit detect 338.

Clock 342 provides a low frequency clock signal to MCU 320, for example 32.768 kHz. According to some embodiments there are two crystal oscillators, one for high frequency such as 16 MHz and one for the lower frequency. Power for MCU 320 is supplied at power input 344 at 3.0 V. Circuitry 336 provides wiring detection, battery measurement, and buck input measurement. A temperature sensor 330 is provided, and according to some embodiments and a humidity sensor 332 are provided. According to some embodiments, one or more other sensors 334 are provided such as: pressure, proximity (e.g. using infrared), ambient light, and pyroelectric infrared (PIR).

Power circuitry 350 is provided to supply power. According to some embodiments, when the thermostat is first turned on with insufficient battery power, a bootstrap power system is provided. A high voltage low dropout voltage regulator (LDO) 380 provides 3.0 volts of power for the bootstrap of the MCU 320. The bootstrap function can be disabled under MCU control but according to some embodiments the bootstrap function is left enabled to provide a "safety net" if the head unit supply vanishes for any reason. For example, if the head-unit includes the re-chargeable battery 384 and is removed unexpectedly, the power would be lost and the bootstrap function would operate. The input to this Bootstrap LDO 380 is provided by connectors and circuitry 368 that automatically selects power from common 362 (highest priority), cool 366 (lower priority); or heat (lowest priority) 364.

In normal operation, a 3.0 volt primary LDO 382 powers the backplate circuitry and itself is powered by VCC Main. According to some embodiments, high voltage buck 360 is provided as a second supply in the backplate. The input to this supply is the circuitry 368. According to some embodiments, the high voltage buck 380 can supply a maximum of 100 mA at 4.5 v. According to some embodiments, the VCC main and the Primary LDO 382 can be powered by a rechargeable battery (shown in FIG. 7) in cases where there is no alternative power source (such as the high voltage buck or USB power, for example).

Figure 4C:
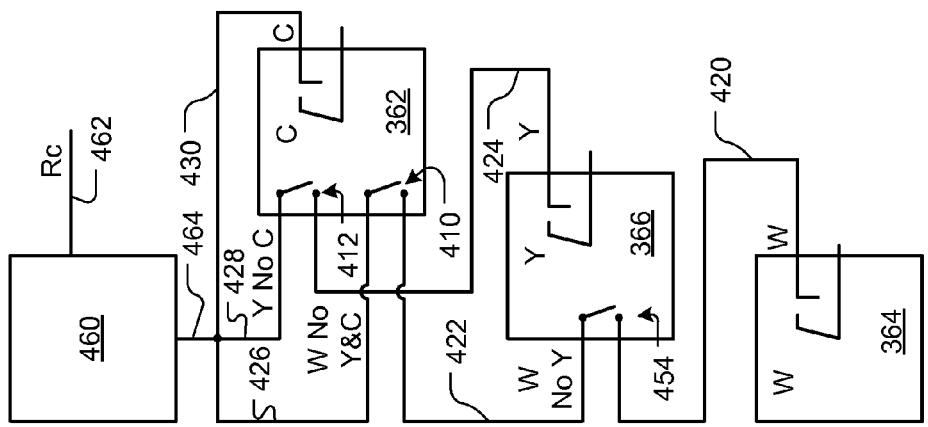
FIGS. 4A-4C schematically illustrate the use of auto-switching connectors being used to automatically select a source for power harvesting, according to some embodiments.
Figure 4B:
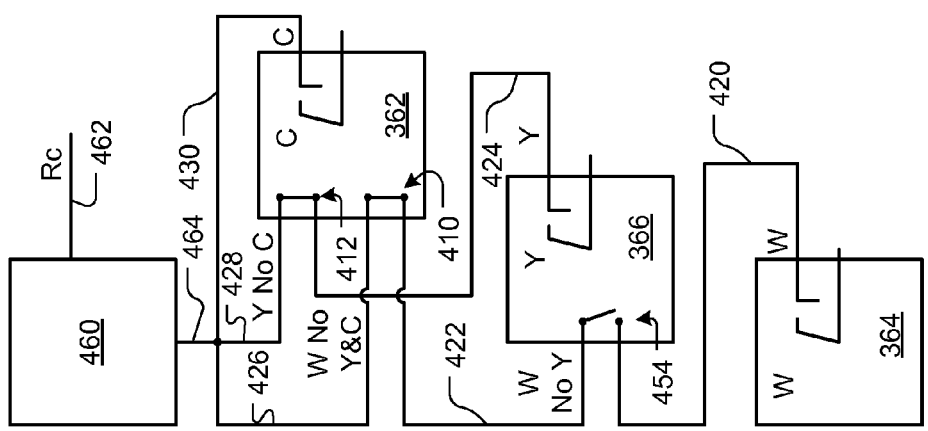
Figure 4A:
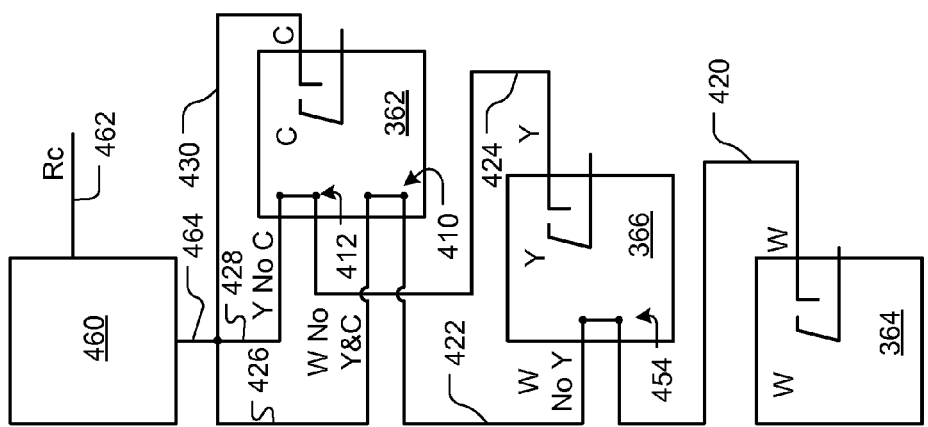

FIGS. 4A-C schematically illustrate the use of auto-switching connectors being used to automatically select a source for power harvesting, according to some embodiments. The connectors 362, 364, and 366 are connectors as shown in FIG. 3B. For further details regarding preferred automatically switching connectors, see co-pending U.S. patent application Ser. No. 13/034,666, entitled "Thermostat Wiring Connector" which is incorporated herein by reference. The connector 362 is used for connection to an HVAC "C" (common) wire and includes two switched pairs of normally closed secondary conductors 410 and 412. The connector 366 is used for connection to an HVAC "Y" (cooling) wire and includes one switched pair of normally closed secondary conductors 454. The connector 364 is used for connection to an HVAC "W" (heating) wire. Note that although not shown in FIGS. 4A-C, one or more additional pairs of switched secondary conductors can be provided with any of the connectors 362, 366 and 365, such as could be used for the purpose of electronically detecting the presence of an HVAC system wire to the connector. Power harvesting circuitry 460 is used to supply power to the thermostat and is also connected to the Rc wire 462 (or according to other embodiment the Rh wire). For example, the power harvesting circuitry 460 can include the HV buck 360 and Bootstrap LDO 380 as shown in and described with respect to FIGS. 3 and 6A-B.

FIG. 4A shows the case of the switches 454, 410 and 412 when no C wire and no Y wire is attached. In this case all of the switches 454, 410 and 412 are closed and the power harvesting circuitry 460 is connected at input 464 with the W wire via circuit paths 420, 422 and 426. FIG. 4B shows the case of the switches 454, 410 and 412 when no C wire is attached but there is a Y wire attached. In this case switches 410 and 412 are closed but switch 454 is opened due to the presence of the Y wire. In this case the power harvesting circuitry 460 is connected at input 464 with the Y wire via circuit paths 424 and 428. FIG. 4C shows the case of the switches 454, 410, and 412, when both C and Y wires are attached. In this case all the switches 454, 410 and 412 are open and the power harvesting circuitry 460 is connected at input 464 with the C wire via circuit path 430. Note that the case of a connection of C and W wires and no Y wire is not shown but that in this case the W wire would not be connected to circuitry 420 since switch 410 would be open. Thus, through the use of circuitry and the connectors shown, the power harvesting circuitry is automatically switched so as to use connections to C, Y and W wires in decreasing order of priority. Preferably, the C wire is the highest priority as this ordinarily provides the best power source, if available. Note that according to some embodiments, the Y and W priorities are reversed to make W higher priority than Y.

Figure 5:
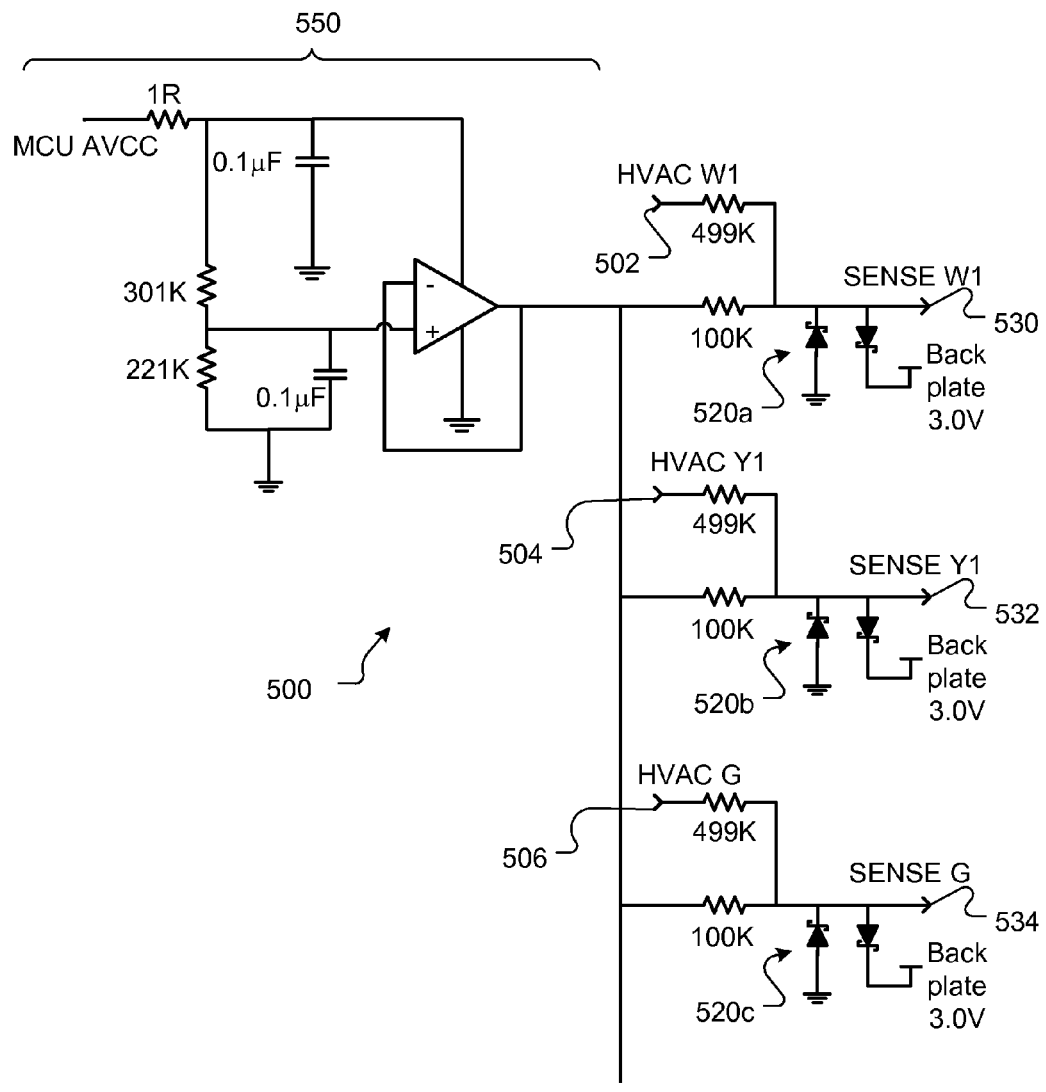
FIG. 5 is a schematic of a half-bridge sense circuit, according to some embodiments.

FIG. 5 is a schematic of a half-bridge sense circuit, according to some embodiments. Circuit 500 provides voltage sensing, clipped to 3.0 volts, for presence detection and current sensing. At inputs 502, 504 and 506 are the 24VAC waveforms from three of the HVAC circuits. In the case shown in FIG. 5, inputs 502, 504 and 506 are for HVAC W1, HVAC Y1 and HVAC G, respectively. The sense input bias buffer 550 is provided as shown. Note that a voltage divider is used in each case that takes the voltage from 24 volts to approximately 4 volts. Clamp diodes 520a, 520b and 520c ensure that the voltage goes no higher or lower than the range of the microcontroller 320 (shown in FIG. 3B). The Sense outputs 530, 532 and 534 are connected to the microcontroller 320 so that the microcontroller 320 can sense the presence of a signal on the HVAC lines. The circuits are repeated for the other HVAC lines so that the microcontroller can detect signals on any of the HVAC lines.

Figure 6A:
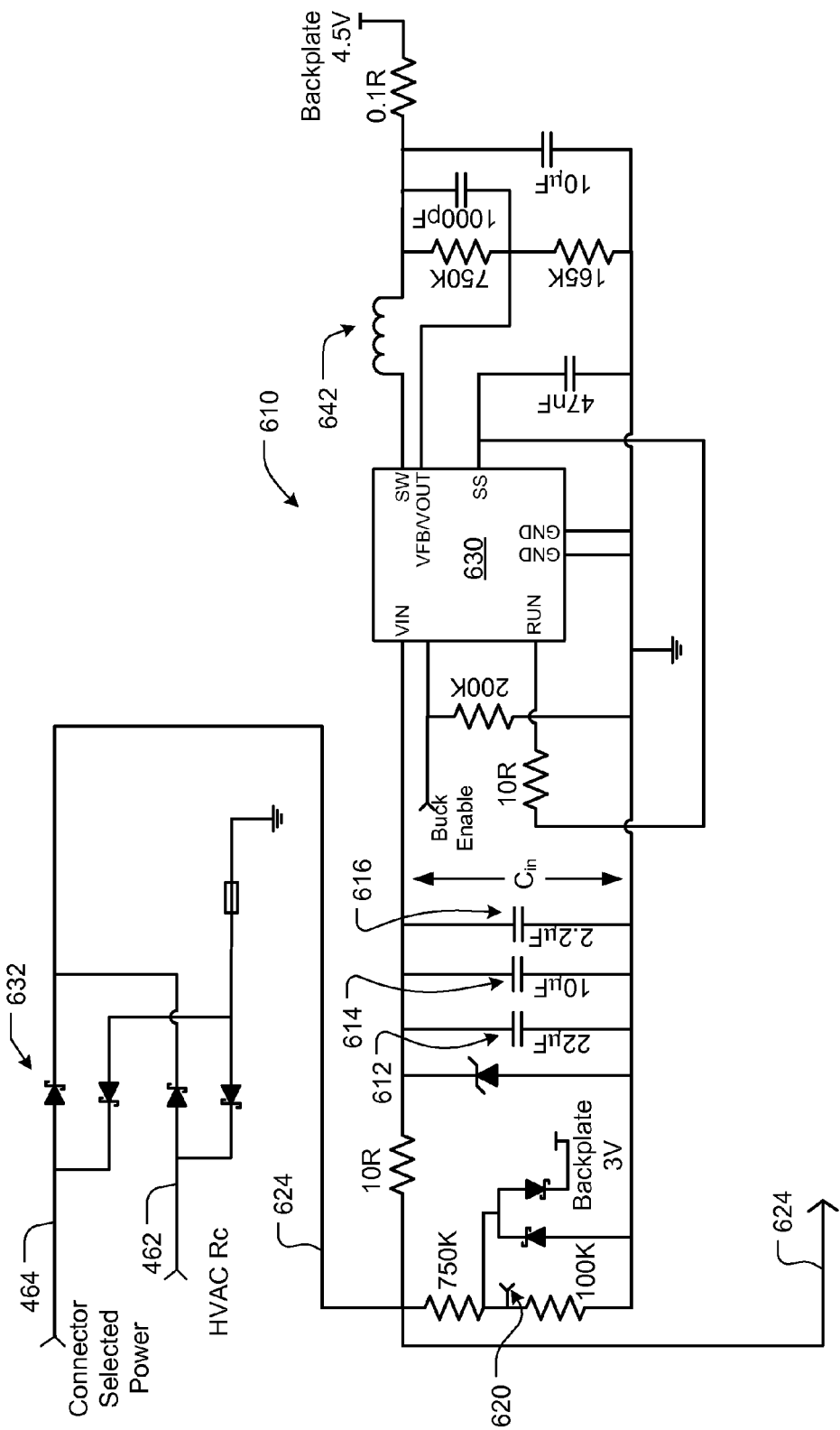
FIGS. 6A-6B are schematics showing the high voltage buck, bootstrap LDO and battery LDO power circuitry, according to some embodiments.
Figure 6B:
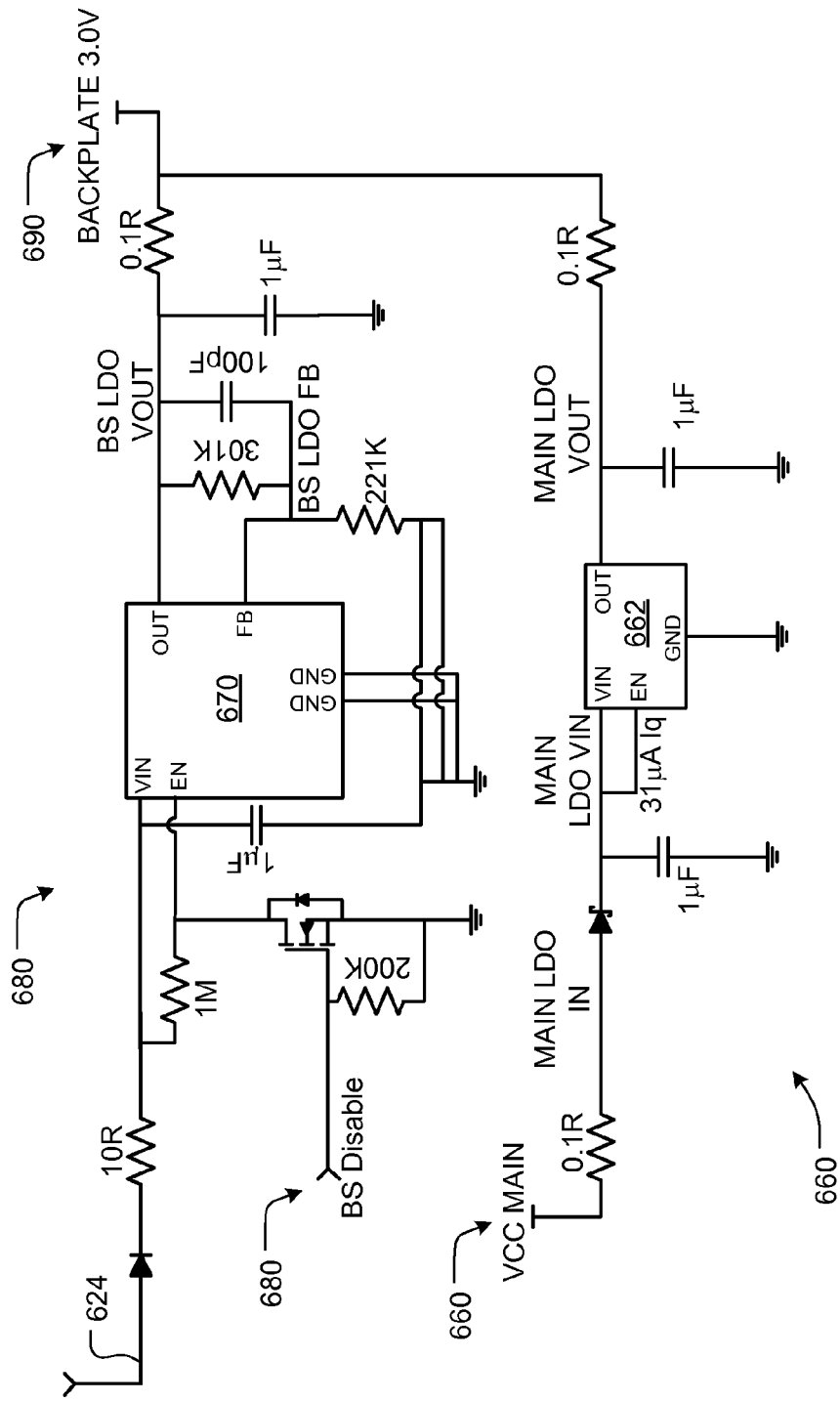

FIGS. 6A-B are schematics showing the high voltage buck, bootstrap LDO and battery LDO power circuitry, according to some embodiments. FIG. 6A shows the input 464 from the connector selected power, which corresponds to input 464 to power circuitry 460 in FIG. 4. The diodes 632 are used to rectify the AC power signal from the HVAC power transformer wire that is selected by the connector circuitry shown in FIG. 4. When the thermostat is installed in a building having two HVAC power transformers, such as may be the case when an existing HVAC heating-only system is upgraded to add an HVAC cooling system. In such cases, there are two power wires from the HVAC system, often called "Rh" the power wire directly from the heating system transformer, and "Rc" the power wire directly from the cooling transformer. Input 462 is from a terminal connected to the Rc wire. According to some embodiments, the Rc and Rh terminals are switched using automatic switching or other jumperless design, as shown and described in co-pending U.S. patent application Ser. No. 13/034,674, supra.

Rectified input 624 is input to the high voltage buck circuit 610, according to some embodiments. In buck circuit 610, which corresponds to high voltage buck 360 in FIG. 3B, the voltage on the input capacitors 612, 614 and 616 of high voltage buck 610 can be measured by the MCU 320 (of FIG. 3B) at node 620, allowing the MCU to momentarily open the W1 or Y1 contacts during an "enabled" or "on" phase in order to recharge the buck input capacitors 612, 614 and 616 and continue power harvesting. According to some embodiments, the same HVAC circuit (e.g. heating or cooling) is used for power harvesting, whether or not there is more than one HVAC function in the system. According to some other embodiments, when the thermostat is used with an HVAC system having two circuits (e.g. heating and cooling), the system will harvest power from the non-activated circuit. In cases where a common wire is available from the HVAC power transformer, the system preferably does not power harvest at all from the heating and cooling circuits. According to some embodiments, the step down converter 630 is a high efficiency, high voltage 100 mA synchronous step-down converter such as the LTC3631 from Linear Technology. According to some embodiments, inductor 642 is a 100 uH power inductor such as the MOS6020 from Coilcraft. According to some embodiments, one or more other types of elements in addition to or instead of input capacitors 612, 614 and 616 are used to store electrical energy during power harvesting when the HVAC function is active (or "on"). For example, magnetic elements such as inductors and/or transformers can be used.

In order to control the HVAC functions, the HVAC function wire is shorted to the return or power wire. For example, in the case of heating, the W wire is shorted to the Rh (or R or Rc depending on the configuration). In the case of cooling the Y wire is shorted to the Rc (or R or Rh depending on the configuration). By shorting these two wires, the 24 VAC transformer is placed in series with a relay that controls the HVAC function. However, for power harvesting, a problem is that when these wires are shorted, there is no voltage across them, and when open, there is no current flow. Since power equals voltage multiplied by current, if either quantity is zero the power that can be extracted is zero. According to some embodiments, the power harvesting circuitry allows power to be taken from the two wires in both the states of HVAC—the HVAC "on" and the HVAC "off".

In the HVAC "off" state, some energy can be harvested from these two wires by taking less energy than would cause the of the relay to turn on, which would cause the HVAC function to erroneously turn on. Based on testing, it has been found that HVAC functions generally do not turn on when (0.040 A*4.5V)=0.180 watts is extracted at the output. So after the input diodes, capacitors, and switching regulator, this allows us to take 40 mA at 4.5 volts from these wires without turning on the HVAC system.

In the HVAC "on" state, the two wires must be connected together to allow current to flow, which turns on the HVAC relay. This, however, shorts out the input supply, so our system does not get any power when the HVAC "on" switch is closed. To get around this problem, the voltage is monitored on the capacitors 612, 614 and 616 at the input switching power supply node 620. When the voltage on these capacitors "$C_{in}$" drops close to the point at which the switching power supply would "Drop out" and lose output regulation, for example at about +8 Volts, the HVAC "on" switch is turned off and $C_{in}$ is charged. During the time that $C_{in}$ is charging, current is still flowing in the HVAC relay, so the HVAC relay stays on. When the $C_{in}$ capacitor voltages increases some amount, for example about +16 Volts, the HVAC "on" switch is closed again, $C_{in}$ begins to discharge while it feeds the switching regulator, and current continues to flow in the HVAC relay. Note that $C_{in}$ is not allowed to discharge back to the HVAC "on" switch due to input diodes 632. When the voltage on $C_{in}$ drops to about +8 Volts the HVAC "on" switch is turned off and the process repeats. This continues until the system tells the HVAC "on" switch to go off because HVAC is no longer needed. According to some embodiments, the ability of the HVAC "on" switch to turn on and off relatively quickly is provided by circuitry 450 as shown in and described with respect to FIG. 4 of co-pending U.S. patent application Ser. No. 13/034,674, supra.

According to some embodiments, one or more alternative power harvesting techniques are used. For example, rather than having the HVAC "on" switch turn on when the voltage on $C_{in}$ reaches a certain point, it the system might turn off the "HVAC "on" switch for a predetermined period of time instead. According to some embodiments, power harvesting is enhanced by synchronizing the power harvesting with the AC current waveform.

FIG. 6B is a schematic of high voltage low dropout voltage regulators used to provide bootstrap power and battery, according to some embodiments. The bootstrap LDO circuitry 680, and battery LDO circuitry correspond to the bootstrap LDO 380 and battery LDO 382 in FIG. 3 respectively. Rectified input 624 is input to bootstrap circuit 680. According to some embodiments, regulator 670 is low-dropout linear regulator such as the TPS79801 from Texas Instruments. The output power 690 is provided to the backplate at 3.0V. The bootstrap disable signal 680 can be used to disable the bootstrap power unit, as shown. The input 660 comes from VCC main, which can be, for example, from the rechargeable battery. According to some embodiments, the low dropout regulator 662 is a low quiescent current device designed for power-sensitive applications such as the TLV70030 from Texas Instruments.

Figure 6C:
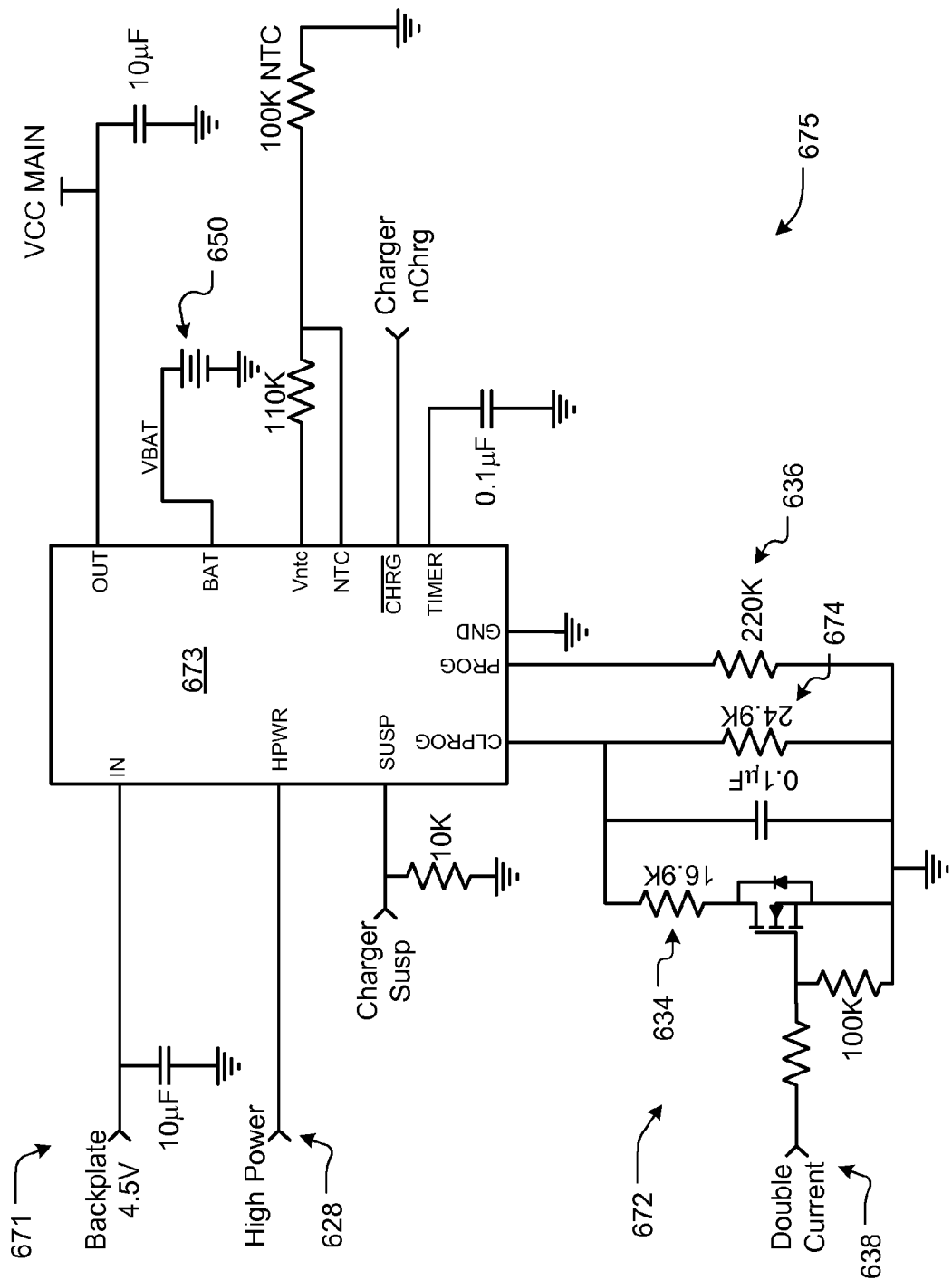
FIG. 6C shows a battery charging circuit and rechargeable battery, according to some embodiments.

FIG. 6C shows a battery charging circuit 675 and a rechargeable battery 650, according to some embodiments. The charger 673 is used to charge the lithium-ion battery 650. In general, li-ion battery capacity depends on what voltage the battery is charged to, and the cycle life depends on the charged voltage, how fast the battery is charged and the temperature during which the battery is charged. Ordinarily, Li-ion batteries are charged at about 4.2V. In some cases the charging voltage is even higher in an attempt to gain greater capacity, but at the expense of decreased cycle life. However, in the case of the rechargeable battery 650 for use with a wall-mounted thermostat, a greater cycle life is preferred over capacity. High capacity is generally not needed since charging power is available via the power harvesting circuitry, and greater cycle life is preferred since user replacement may be difficult or unavailable. Thus, according to some embodiments, a low charging speed, low final float voltage and reduced charging temperature range is preferred. According to some embodiments, a final float voltage of between 3.9V and 4.1V is used. According to some embodiments a final float voltage of less than 4.0V is used, such as 3.95V. According to some embodiments, the ratio of charge current to total capacity "C" is also controlled, such as charging the battery to 0.2C (0.2 times the rated capacity) to provide better cycle life than a higher ratio. According to some embodiments, using a lower charging current aids in avoiding unintended tripping of the HVAC relay.

According to some embodiments, charger 673 is a USB power manager and li-ion battery charger such as the LTC4085-3 from Linear Technology. Backplate voltage 671 is input to charger 673. The circuitry 672 is used to select the charging current. In particular the value of resistor 674 (24.9 k) in parallel with resistor 634 (16.9 k) in combination with the inputs Double Current 638 and High Power 628 are used to select the charging current. If High Power 628 and Double Current 638 are both set to 0, then the charging current is 8.0 mA; if the High Power 628 is set to 0 and Double Current 638 is set to 1, then the charging current is 19.9 mA; if the High Power 628 is set to 1 and Double Current 638 is set to 0, then the charging current is 40.1 mA; and if the High Power 628 and Double Current 638 are both set to 1, then the charging current is 99.3 mA. Resistor 636 is used to set the default charge current. In the case shown, a 220 k resistor set the default charge current to 227 mA. According to some embodiments, a charge temperature range of 0-44 degrees C. is set via the Thermistor Monitoring Circuits.

According to some embodiments, the thermostat is capable of being powered by a USB power supply. This could be supplied by a user, for example, by attaching the thermostat via a USB cable to a computer or another USB power supply. In cases where USB power supply is available, it is selected as the preferred power source for the thermostat and can be used to recharge the rechargeable battery. According to some embodiments, a charge current of about 227 mA is used when a USB supply source is available; a charge current of about 100 mA is used when an HVAC common wire is present; and a charge current of between about 20-40 mA is used when power is harvested from an HVAC heating and/or cooling circuit.

Figure 7:
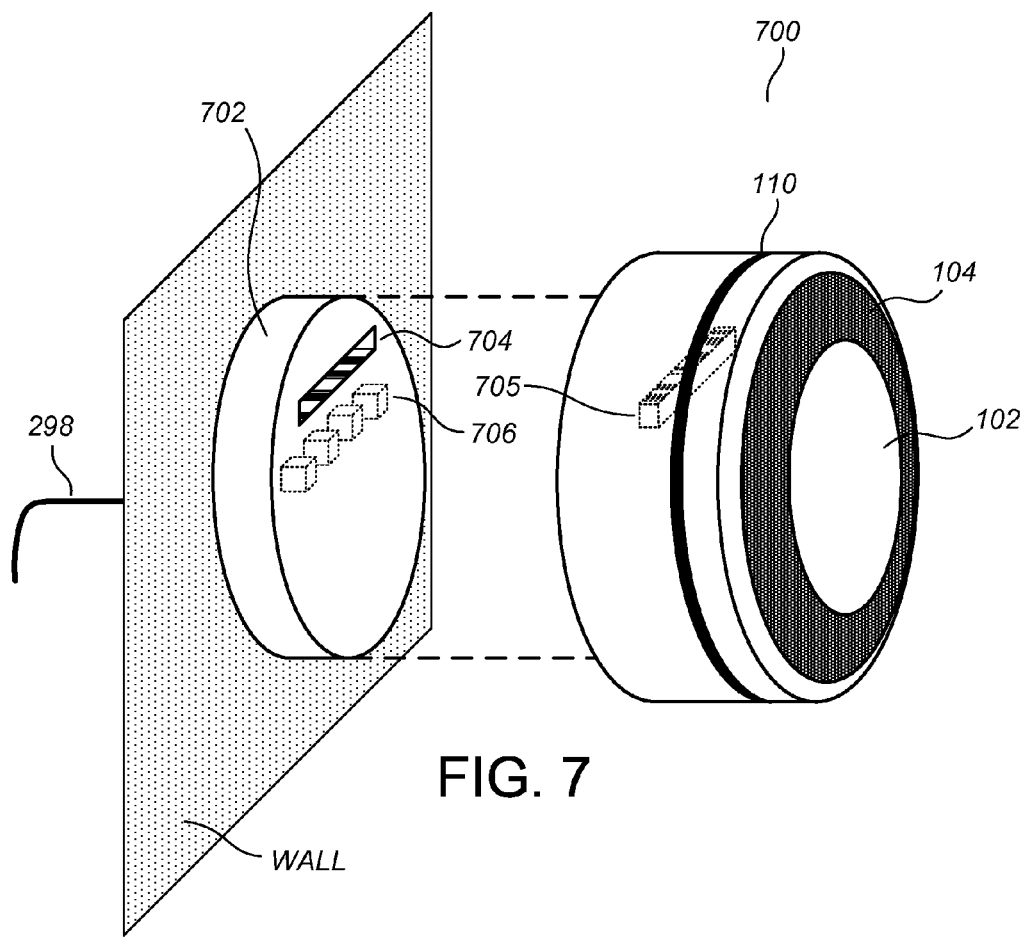
FIG. 7 illustrates an exploded perspective view of a versatile sensing and control unit (VSCU unit) and an HVAC-coupling wall dock according to an embodiment.

FIG. 7 illustrates an exploded perspective view of a thermostat or VSCU (versatile sensing and control unit) 700 and an HVAC-coupling wall dock 702 according to an embodiment. For first-time customers who are going to be replacing their old thermostat, the VSCU unit 700 is provided in combination with HVAC-coupling wall dock 702. The HVAC-coupling wall dock 702 comprises mechanical hardware for attaching to the wall and electrical terminals for connecting to the HVAC wiring 298 that will be extending out of the wall in a disconnected state when the old thermostat is removed. The HVAC-coupling wall dock 702 is configured with an electrical connector 704 that mates to a counterpart electrical connector 705 in the VSCU 700.

For the initial installation process, the customer (or their handyman, or an HVAC professional, etc.) first installs the HVAC-coupling wall dock 702, including all of the necessary mechanical connections to the wall and HVAC wiring connections to the HVAC wiring 298. Once the HVAC-coupling wall dock 702 is installed, which represents the "hard work" of the installation process, the next task is relatively easy, which is simply to slide the VSCU unit 700 thereover to mate the electrical connectors 704/705. Preferably, the components are configured such that the HVAC-connecting wall dock 702 is entirely hidden underneath and inside the VSCU unit 700, such that only the visually appealing VSCU unit 700 is visible.

For one embodiment, the HVAC-connecting wall dock 702 is a relatively "bare bones" device having the sole essential function of facilitating electrical connectivity between the HVAC wiring 298 and the VSCU unit 700. For another embodiment, the HVAC-coupling wall dock 702 is equipped to perform and/or facilitate, in either a duplicative sense and/or a primary sense without limitation, one or more of the functionalities attributed to the VSCU unit 700 in the instant disclosure, using a set of electrical, mechanical, and/or electromechanical components 706. One particularly useful functionality is for the components 706 to include power-extraction circuitry for judiciously extracting usable power from the HVAC wiring 298, at least one of which will be carrying a 24-volt AC signals in accordance with common HVAC wiring practice. The power-extraction circuitry converts the 24-volt AC signal into DC power (such as at 5 VDC, 3.3 VDC, etc.) that is usable by the processing circuitry and display components of the main unit 701.

The division and/or duplication of functionality between the VSCU unit 700 and the HVAC-coupling wall dock 702 can be provided in many different ways without departing from the scope of the present teachings. For another embodiment, the components 706 of the HVAC-coupling wall dock 702 can include one or more sensing devices, such as an acoustic sensor, for complementing the sensors provided on the sensor ring 104 of the VSCU unit 700. For another embodiment, the components 706 can include wireless communication circuitry compatible with one or more wireless communication protocols, such as the Wi-Fi and/or ZigBee protocols. For another embodiment, the components 706 can include external AC or DC power connectors. For another embodiment, the components 706 can include wired data communications jacks, such as an RJ45 Ethernet jack, an RJ11 telephone jack, or a USB connector.

The docking capability of the VSCU unit 700 according to the embodiment of FIG. 7 provides many advantages and opportunities in both a technology sense and a business sense. Because the VSCU unit 700 can be easily removed and replaced by even the most non-technically-savvy customer, many upgrading and upselling opportunities are provided. For example, many different versions of the VSCU unit 700 can be separately sold, the different versions having different colors, styles, themes, and so forth. Upgrading to a new VSCU unit 700 having more advanced capabilities becomes a very easy task, and so the customer will be readily able to take advantage of the newest display technology, sensor technology, more memory, and so forth as the technology improves over time.

Provided in accordance with one or more embodiments related to the docking capability shown in FIG. 7 are further devices and features that advantageously promote expandability of the number of sensing and control nodes that can be provided throughout the home. For one embodiment, a tabletop docking station (not shown) is provided that is capable of docking to a second instance of the VSCU unit 700, which is termed herein an auxiliary VSCU unit (not shown). The tabletop docking station and the auxiliary VSCU unit can be separately purchased by the user, either at the same time they purchase their original VSCU unit 700, or at a later time. The tabletop docking station is similar in functionality to the HVAC-coupling wall dock 702, except that it does not require connection to the HVAC wiring 298 and is conveniently powered by a standard wall outlet. For another embodiment, instead of being identical to the original VSCU unit 700, the auxiliary VSCU unit can be a differently labeled and/or differently abled version thereof.

As used herein, the term "primary VSCU unit" refers to one that is electrically connected to actuate an HVAC system in whole or in part, which would necessarily include the first VSCU unit purchased for any home, while the term "auxiliary VSCU unit" refers to one or more additional VSCU units not electrically connected to actuate an HVAC system in whole or in part. An auxiliary VSCU unit, when docked, will automatically detect the primary VSCU unit and will automatically be detected by the primary VSCU unit, such as by Wi-Fi or ZigBee wireless communication. Although the primary VSCU unit will remain the sole provider of electrical actuation signals to the HVAC system, the two VSCU units will otherwise cooperate in unison for improved control heating and cooling control functionality, such improvement being enabled by virtue of the added multi-sensing functionality provided by the auxiliary VSCU unit, as well as by virtue of the additional processing power provided to accommodate more powerful and precise control algorithms. Because the auxiliary VSCU unit can accept user control inputs just like the primary VSCU unit, user convenience is also enhanced. Thus, for example, where the tabletop docking station and the auxiliary VSCU unit are placed on a nightstand next to the user's bed, the user is not required to get up and walk to the location of the primary VSCU unit if they wish to manipulate the temperature set point, view their energy usage, or otherwise interact with the system.

A variety of different VSCU-compatible docking stations are within the scope of the present teachings. For example, in another embodiment there is provided an auxiliary wall dock (not shown) that allows an auxiliary VSCU unit to be mounted on a wall. The auxiliary wall dock is similar in functionality to the tabletop docking station in that it does not provide HVAC wiring connections, but does serve as a physical mounting point and provides electrical power derived from a standard wall outlet.

For one embodiment, all VSCU units sold by the manufacturer are identical in their core functionality, each being able to serve as either a primary VSCU unit or auxiliary VSCU unit as the case requires, although the different VSCU units may have different colors, ornamental designs, memory capacities, and so forth. For this embodiment, the user is advantageously able, if they desire, to interchange the positions of their VSCU units by simple removal of each one from its existing docking station and placement into a different docking station. Among other advantages, there is an environmentally, technically, and commercially appealing ability for the customer to upgrade to the newest, latest VSCU designs and technologies without the need to throw away the existing VSCU unit. For example, a customer with a single VSCU unit (which is necessarily serving as a primary VSCU unit) may be getting tired of its color or its TFT display, and may be attracted to a newly released VSCU unit with a different color and a sleek new OLED display. For this case, in addition to buying the newly released VSCU, the customer can buy a tabletop docking station to put on their nightstand. The customer can then insert their new VSCU unit into the existing HVAC-coupling wall dock, and then take their old VSCU unit and insert it into the tabletop docking station. Advantageously, in addition to avoiding the wastefulness of discarding the old VSCU unit, there is now a new auxiliary VSCU unit at the bedside that not only provides increased comfort and convenience, but that also promotes increased energy efficiency by virtue of the additional multi-sensor information and processing power provided.

For other embodiments, different VSCU units sold by the manufacturer can have different functionalities in terms of their ability to serve as primary versus auxiliary VSCU units. This may be advantageous from a pricing perspective, since the hardware cost of an auxiliary-only VSCU unit may be substantially less than that of a dual-capability primary/auxiliary VSCU unit. In other embodiments there is provided distinct docking station capability for primary versus auxiliary VSCU units, with primary VSCU units using one kind of docking connection system and auxiliary VSCU units using a different kind of docking connection system. In still other embodiments there is provided the docking station capability of FIG. 7 for primary VSCU units, but no docking station capability for auxiliary VSCU units, wherein auxiliary VSCU units are simply provided in monolithic form as dedicated auxiliary tabletop VSCU units, dedicated auxiliary wall-mounted VSCU units, and so forth. One advantage of providing an auxiliary VSCU unit, such as a tabletop VSCU unit, without a docking functionality would be its simplicity and non-intimidating nature for users, since the user would simply be required to place it on a table (their nightstand, for example) and just plug it in, just as easily as they would a clock radio.

In still other embodiments, all VSCU units are provided as non-docking types, but are interchangeable in their abilities as primary and auxiliary VSCU units. In still other embodiments, all VSCU units are provided as non-docking types and are non-interchangeable in their primary versus auxiliary abilities, that is, there is a first set of VSCU units that can only serve as primary VSCU units and a second set of VSCU units that can only serve as auxiliary VSCU units. For embodiments in which primary VSCU units are provided as non-docking types, their physical architecture may still be separable into two components for the purpose of streamlining the installation process, with one component being similar to the HVAC-coupling wall dock 702 of FIG. 7 and the second component being the main unit as shown in FIG. 7, except that the assembly is not intended for docking-style user separability after installation is complete. For convenience of description hereinbelow and so as not to unnecessarily limit the scope of the present teachings, the classification of one or more described VSCU units as being of (i) a non-docking type versus a docking type, and/or (ii) a primary type versus an auxiliary type, may not be specified, in which case VSCU units of any of these classifications may be used with such embodiments, or in which case such classification will readily inferable by the skilled artisan from the context of the description.

Figure 8A:
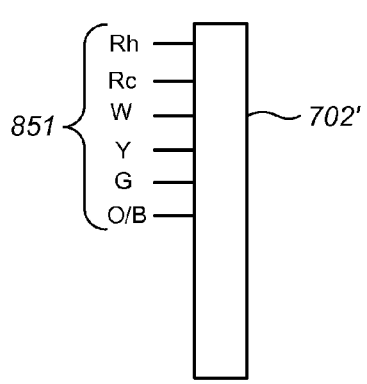
FIGS. 8A-8B illustrates conceptual diagrams of HVAC-coupling wall docks, according to some embodiments.

FIG. 8A illustrates a conceptual diagram of an HVAC-coupling wall dock 702' with particular reference to a set of input wiring ports 851 thereof, and which represents a first version of the HVAC-coupling wall dock 702 of FIG. 7 that is manufactured and sold in a "simple" or "DIY (do-it-yourself)" product package in conjunction with the VSCU unit 700. The input wiring ports 851 of the HVAC-coupling wall dock 702' are judiciously limited in number and selection to represent a business and technical compromise between (i) providing enough control signal inputs to meet the needs of a reasonably large number of HVAC systems in a reasonably large number of households, while also (ii) not intimidating or overwhelming the do-it-yourself customer with an overly complex array of connection points. For one embodiment, the judicious selection of input wiring ports 851 consists of the following set: Rh (24 VAC heating call switch power); Rc (24VAC cooling call switch power); W (heating call); Y (cooling call); G (fan); and O/B (heat pump).

The HVAC-coupling wall dock 702' is configured and designed in conjunction with the VSCU unit 700, including both hardware aspects and programming aspects, to provide a DW installation process that is simple, non-intimidating, and perhaps even fun for many DW installers, and that further provides an appreciable degree of foolproofing capability for protecting the HVAC system from damage and for ensuring that the correct signals are going to the correct equipment. For one embodiment, the HVAC-coupling wall dock 702' is equipped with a small mechanical detection switch (not shown) for each distinct input port, such that the insertion of a wire (and, of course, the non-insertion of a wire) is automatically detected and a corresponding indication signal is provided to the VSCU 100 upon initial docking. In this way, the VSCU 100 has knowledge for each individual input port whether a wire has, or has not been, inserted into that port. Preferably, the VSCU unit 700 is also provided with electrical sensors (e.g., voltmeter, ammeter, and ohmmeter) corresponding to each of the input wiring ports 851. The VSCU 100 is thereby enabled, by suitable programming, to perform some fundamental "sanity checks" at initial installation. By way of example, if there is no input wire at either the Rc or Rh terminal, or if there is no AC voltage sensed at either of these terminals, further initialization activity can be immediately halted, and the user notified on the circular display monitor 102, because there is either no power at all or the user has inserted the Rc and/or Rh wires into the wrong terminal By way of further example, if there is a live voltage on the order of 24 VAC detected at any of the W, Y, and G terminals, then it can be concluded that the user has placed the Rc and/or Rh wire in the wrong place, and appropriate installation halting and user notification can be made.

One particularly advantageous feature from a safety and equipment preservation perspective provided according to one embodiment relates to automated opening versus automated shunting of the Rc and Rh terminals by the VSCU unit 700. In many common home installations, instead of there being separate wires provided for Rc (24 VAC heating call switch power) and Rh (24 VAC cooling call switch power), there is only a single 24VAC call switch power lead provided. This single 24VAC lead, which might be labeled R, V, Rh, or Rc depending on the unique history and geographical location of the home, provides the call switch power for both heating and cooling. For such cases, it is electrically necessary for any thermostat to have its Rc and Rh input ports shunted together so that the power from that single lead can be respectively accessed by the heating and cooling call switches. However, in many other common home installations, there are separate 24 VAC wires provided for Rc and Rh running from separate transformers and, when so provided, it is important not to shunt them together to avoid equipment damage. These situations are resolved historically by (i) the professional installer examining the HVAC system and ensuring that a shunting lead (or equivalent DIP switch setting) is properly installed or not installed as appropriate, and/or (ii) the historical presence on most thermostats of a discrete user-toggled mechanical or electromechanical switch (e.g., HEAT-OFF-COOL) to ensure that heating and cooling are never simultaneously activated. Notably, it is desired to omit any discrete mechanical HEAT-OFF-COOL in most embodiments and to eliminate the need for a professional installer for the instant DIY product version environment. Advantageously, according to an embodiment, the VSCU 100 is advantageously equipped and programmed to (i) automatically test the inserted wiring to classify the user's HVAC system into one of the above two types (i.e., single call power lead versus dual call power leads), (ii) to automatically ensure that the Rc and Rh input ports remain electrically segregated if the if the user's HVAC system is determined to be of the dual call power lead type, and (iii) to automatically shunt the Rc and Rh input ports together if the user's HVAC system is determined to be of the single call power lead type. The automatic testing can comprise, without limitation, electrical sensing such as that provided by voltmeter, ammeters, ohmmeters, and reactance-sensing circuitry, as well as functional detection as described further below.

Also provided at installation time according to an embodiment, which is particularly useful and advantageous in the DW scenario, is automated functional testing of the HVAC system by the VSCU unit 700 based on the wiring insertions made by the installer as detected by the small mechanical detection switches at each distinct input port. Thus, for example, where an insertion into the W (heating call) input port is mechanically sensed at initial startup, the VSCU unit 700 actuates the furnace (by coupling W to Rh) and then automatically monitors the temperature over a predetermined period, such as ten minutes. If the temperature is found to be rising over that predetermined period, then it is determined that the W (heating call) lead has been properly connected to the W (heating call) input port. However, if the temperature is found to be falling over that predetermined period, then it is determined that Y (cooling call) lead has likely been erroneously connected to the W (heating call) input port. For one embodiment, when such error is detected, the system is shut down and the user is notified and advised of the error on the circular display monitor 102. For another embodiment, when such error is detected, the VSCU unit 700 automatically reassigns the W (heating call) input port as a Y (cooling call) input port to automatically correct the error. Similarly, according to an embodiment, where the Y (cooling call) lead is mechanically sensed at initial startup, the VSCU unit 700 actuates the air conditioner (by coupling Y to Rc) and then automatically monitors the temperature, validating the Y connection if the temperature is sensed to be falling and invalidating the Y connection (and, optionally, automatically correcting the error by reassigning the Y input port as a W input port) if the temperature is sensed to be rising. In view of the present disclosure, the determination and incorporation of other automated functional tests into the above-described method for other HVAC functionality would be achievable by the skilled artisan and are within the scope of the present teachings. By way of example, for one embodiment there can be a statistical study done on the electrical noise patterns associated with the different control wires and a unique or partially unique "noise fingerprint" associated with the different wires, and then the VSCU unit 700 can automatically sense the noise on each of the existing control wires to assist in the automated testing and verification process.

Also provided at installation time according to an embodiment, which is likewise particularly advantageous in the DIY scenario, is automated determination of the homeowner's pre-existing heat pump wiring convention when an insertion onto the O/B (heat pump) input port is mechanically sensed at initial startup. Depending on a combination of several factors such as the history of the home, the geographical region of the home, and the particular manufacturer and installation year of the home's heat pump, there may be a different heat pump signal convention used with respect to the direction of operation (heating or cooling) of the heat pump. According to an embodiment, the VSCU unit 700 automatically and systematically applies, for each of a plurality of preselected candidate heat pump actuation signal conventions, a cooling actuation command and a heating actuation command, each actuation command being followed by a predetermined time period over which the temperature change is sensed. If the cooling command according to the presently selected candidate convention is followed by a sensed period of falling temperature, and the heating command according to the presently selected candidate convention is followed by a sensed period of rising temperature, then the presently selected candidate convention is determined to be the actual heat pump signal convention for that home. If, on the other hand, the cooling command was not followed by a sensed period of cooling and/or the heating command was not followed by a sensed period of heating, then the presently selected candidate convention is discarded and the VSCU unit 700 repeats the process for the next candidate heat pump actuation signal convention. For one example, a first candidate heat pump actuation signal convention is (a) for cooling, leave O/B open and connect Y to Rc, and (b) for heating, connect O/B to Rh, while a second candidate heat pump actuation signal convention is (a) for cooling, connect O/B to Rc, and (b) for heating, leave O/B open and connect W to Rh. In view of the present disclosure, the determination and incorporation of other candidate heat pump actuation signal conventions into the above-described method would be achievable by the skilled artisan and are within the scope of the present teachings.

Figure 8B:
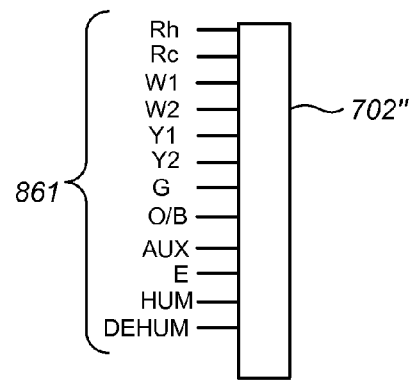

FIG. 8B illustrates a conceptual diagram of an HVAC-coupling wall dock 702" with particular reference to a set of input wiring ports 861 thereof, and which represents a second version of the HVAC-coupling wall dock 702 of FIG. 7 that is manufactured and sold in a "professional" product package in conjunction with the VSCU unit 700. The professional product package is preferably manufactured and marketed with professional installation in mind, such as by direct marketing to HVAC service companies, general contractors involved in the construction of new homes, or to homeowners having more complex HVAC systems with a recommendation for professional installation. The input wiring ports 861 of the HVAC-coupling wall dock 702" are selected to be sufficient to accommodate both simple and complex HVAC systems alike. For one embodiment, the input wiring ports 861 include the following set: Rh (24 VAC heating call switch power); Rc (24VAC cooling call switch power); W1 (first stage heating call); W2 (second stage heating call); Y1 (first stage cooling call); Y2 (second stage cooling call); G (fan); O/B (heat pump); AUX (auxiliary device call); E (emergency heating call); HUM (humidifier call); and DEHUM (dehumidifier call). For one embodiment, even though professional installation is contemplated, the HVAC-coupling wall dock 702" is nevertheless provided with small mechanical detection switches (not shown) at the respective input wiring ports for wire insertion sensing, and the VSCU unit 700 is provided with one or more of the various automated testing and automated configuration capabilities associated with the DIY package described above, which may be useful for some professional installers and/or more technically savvy do-it-yourselfers confident enough to perform the professional-model installation for their more advanced HVAC systems.

Figure 9A:
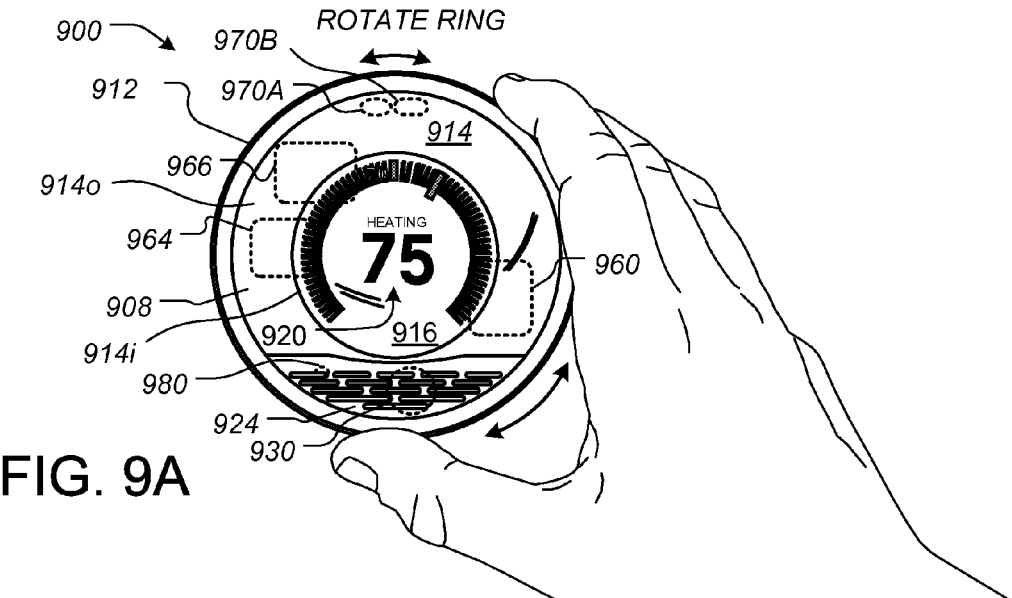
FIGS. 9A-9B illustrate a thermostat having a user-friendly interface, according to some embodiments.
Figure 9B:
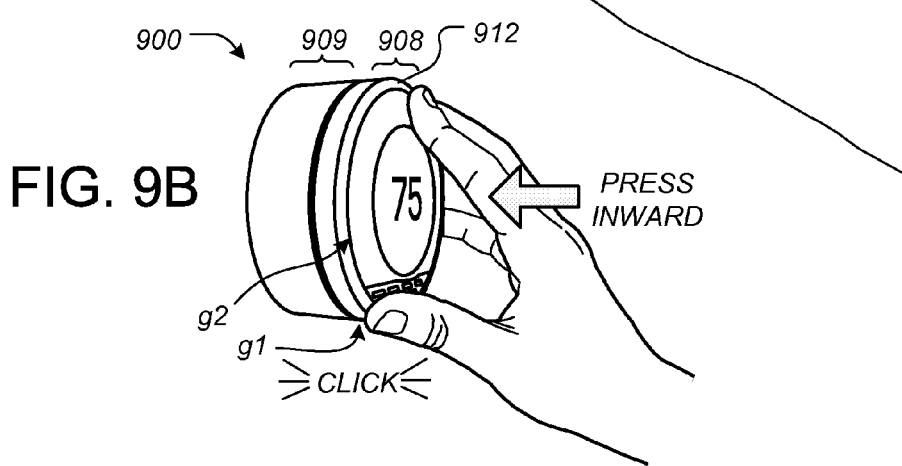

FIGS. 9A-9B illustrate a thermostat 900 having a user-friendly interface, according to some embodiments. The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy. Unlike many prior art thermostats, thermostat 900 preferably has a sleek, simple, uncluttered and elegant design that does not detract from home decoration, and indeed can serve as a visually pleasing centerpiece for the immediate location in which it is installed. Moreover, user interaction with thermostat 900 is facilitated and greatly enhanced over known conventional thermostats by the design of thermostat 900. The thermostat 900 includes control circuitry and is electrically connected to an HVAC system, such as is shown with thermostat 110 in FIGS. 1 and 2. Thermostat 900 is wall mounted, is circular in shape, and has an outer rotatable ring 912 for receiving user input. Thermostat 900 is circular in shape in that it appears as a generally disk-like circular object when mounted on the wall. Thermostat 900 has a large front face lying inside the outer ring 912. According to some embodiments, thermostat 900 is approximately 80 mm in diameter. The outer rotatable ring 912 allows the user to make adjustments, such as selecting a new target temperature. For example, by rotating the outer ring 912 clockwise, the target temperature can be increased, and by rotating the outer ring 912 counter-clockwise, the target temperature can be decreased. The front face of the thermostat 900 comprises a clear cover 914 that according to some embodiments is polycarbonate, and a metallic portion 924 preferably having a number of slots formed therein as shown. According to some embodiments, the surface of cover 914 and metallic portion 924 form a common outward arc or spherical shape gently arcing outward, and this gentle arcing shape is continued by the outer ring 912.

Although being formed from a single lens-like piece of material such as polycarbonate, the cover 914 has two different regions or portions including an outer portion 914o and a central portion 914i. According to some embodiments, the cover 914 is painted or smoked around the outer portion 914o, but leaves the central portion 914i visibly clear so as to facilitate viewing of an electronic display 916 disposed thereunderneath. According to some embodiments, the curved cover 914 acts as a lens that tends to magnify the information being displayed in electronic display 916 to users. According to some embodiments the central electronic display 916 is a dot-matrix layout (individually addressable) such that arbitrary shapes can be generated, rather than being a segmented layout. According to some embodiments, a combination of dot-matrix layout and segmented layout is employed. According to some embodiments, central display 916 is a backlit color liquid crystal display (LCD). An example of information displayed on the electronic display 916 is illustrated in FIG. 9A, and includes central numerals 920 that are representative of a current setpoint temperature. According to some embodiments, metallic portion 924 has number of slot-like openings so as to facilitate the use of a passive infrared motion sensor 930 mounted therebeneath. The metallic portion 924 can alternatively be termed a metallic front grille portion. Further description of the metallic portion/front grille portion is provided in the commonly assigned U.S. Ser. No. 13/199,108, supra. The thermostat 900 is preferably constructed such that the electronic display 916 is at a fixed orientation and does not rotate with the outer ring 912, so that the electronic display 916 remains easily read by the user. For some embodiments, the cover 914 and metallic portion 924 also remain at a fixed orientation and do not rotate with the outer ring 912. According to one embodiment in which the diameter of the thermostat 900 is about 80 mm, the diameter of the electronic display 916 is about 45 mm. According to some embodiments an LED indicator 980 is positioned beneath portion 924 to act as a low-power-consuming indicator of certain status conditions. For, example the LED indicator 980 can be used to display blinking red when a rechargeable battery of the thermostat (see FIG. 4A, supra) is very low and is being recharged. More generally, the LED indicator 980 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, which is incorporated by reference herein. According to some embodiments, occupancy information is used in generating an effective and efficient scheduled program. Preferably, an active proximity sensor 970A is provided to detect an approaching user by infrared light reflection, and an ambient light sensor 970B is provided to sense visible light. The proximity sensor 970A can be used to detect proximity in the range of about one meter so that the thermostat 900 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 970B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 900 is controlled by only two types of user input, the first being a rotation of the outer ring 912 as shown in FIG. 99A (referenced hereafter as a "rotate ring" or "ring rotation" input), and the second being an inward push on an outer cap 908 (see FIG. 9B) until an audible and/or tactile "click" occurs (referenced hereafter as an "inward click" or simply "click" input). For the embodiment of FIGS. 9A-9B, the outer cap 908 is an assembly that includes all of the outer ring 912, cover 914, electronic display 916, and metallic portion 924. When pressed inwardly by the user, the outer cap 908 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 9A-9B, an inward click can be achieved by direct pressing on the outer ring 912 itself, or by indirect pressing of the outer ring by virtue of providing inward pressure on the cover 914, metallic portion 914, or by various combinations thereof. For other embodiments, the thermostat 900 can be mechanically configured such that only the outer ring 912 travels inwardly for the inward click input, while the cover 914 and metallic portion 924 remain motionless. It is to be appreciated that a variety of different selections and combinations of the particular mechanical elements that will travel inwardly to achieve the "inward click" input are within the scope of the present teachings, whether it be the outer ring 912 itself, some part of the cover 914, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 912 has been found particularly advantageous, since the user's fingers do not need to be lifted out of contact with the device, or slid along its surface, in order to go between ring rotations and inward clicks. Moreover, by virtue of the strategic placement of the electronic display 916 centrally inside the rotatable ring 912, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, infra, U.S. Ser. No. 29/386,021, which is incorporated by reference herein, and U.S. Ser. No. 13/199,108, supra.

Figure 9C:
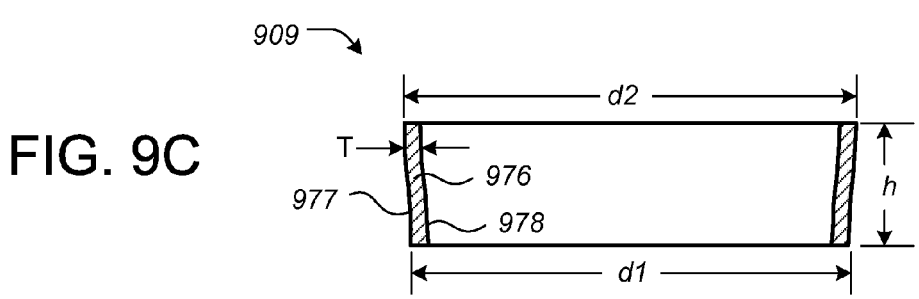
FIG. 9C illustrates a cross-sectional view of a shell portion of a frame of the thermostat of FIGS. 9A-9B.

FIG. 9C illustrates a cross-sectional view of a shell portion 909 of a frame of the thermostat of FIGS. 9A-B, which has been found to provide a particularly pleasing and adaptable visual appearance of the overall thermostat 900 when viewed against a variety of different wall colors and wall textures in a variety of different home environments and home settings. While the thermostat itself will functionally adapt to the user's schedule as described herein and in one or more of the commonly assigned incorporated applications, infra, the outer shell portion 909 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 909 has the shape of a frustum that is gently curved when viewed in cross-section, and comprises a sidewall 976 that is made of a clear solid material, such as polycarbonate plastic. The sidewall 976 is backpainted with a substantially flat silver- or nickel-colored paint, the paint being applied to an inside surface 978 of the sidewall 976 but not to an outside surface 977 thereof. The outside surface 977 is smooth and glossy but is not painted. The sidewall 976 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 9C. The outer ring 912 of outer cap 908 is preferably constructed to match the diameter d2 where disposed near the second end of the shell portion 909 across a modestly sized gap g1 therefrom, and then to gently arc back inwardly to meet the cover 914 across a small gap g2. It is to be appreciated, of course, that FIG. 9C only illustrates the outer shell portion 909 of the thermostat 900, and that there are many electronic components internal thereto that are omitted from FIG. 9C for clarity of presentation, such electronic components being described further hereinbelow and/or in other ones of the commonly assigned incorporated applications, such as U.S. Ser. No. 13/199,108, supra.

According to some embodiments, the thermostat 900 includes a processing system 960, display driver 964 and a wireless communications system 966. The processing system 960 is adapted to cause the display driver 964 and display area 916 to display information to the user, and to receiver user input via the rotatable ring 912. The processing system 960, according to some embodiments, is capable of carrying out the governance of the operation of thermostat 900 including the user interface features described herein. The processing system 960 is further programmed and configured to carry out other operations as described further hereinbelow and/or in other ones of the commonly assigned incorporated applications. For example, processing system 960 is further programmed and configured to maintain and update a thermodynamic model for the enclosure in which the HVAC system is installed, such as described in U.S. Ser. No. 12/881,463, which is incorporated by reference herein. According to some embodiments, the wireless communications system 966 is used to communicate with devices such as personal computers and/or other thermostats or HVAC system components, which can be peer-to-peer communications, communications through one or more servers located on a private network, or and/or communications through a cloud-based service.

Figure 10A:
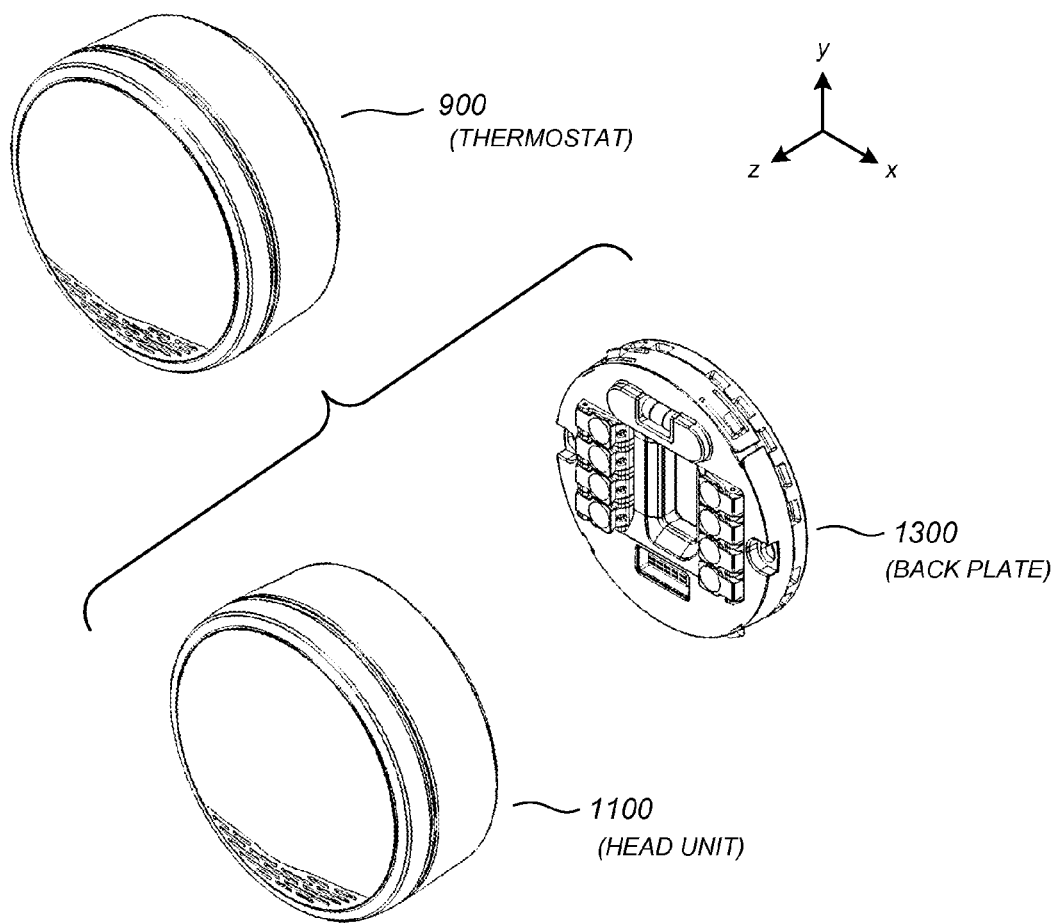
FIGS. 10A-10B illustrate exploded front and rear perspective views, respectively, of a thermostat with respect to its two main components, which are the head unit and the back plate.
Figure 10B:
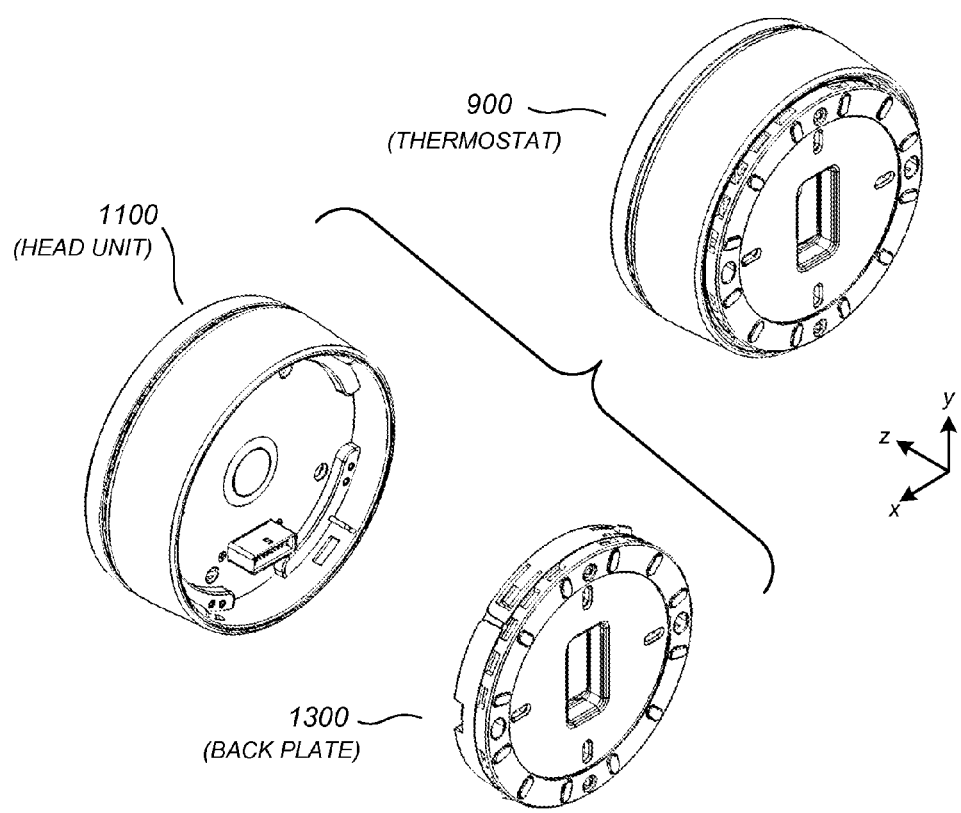

FIGS. 10A-10B illustrate exploded front and rear perspective views, respectively, of the thermostat 900 with respect to its two main components, which are the head unit 1100 and the back plate 1300. Further technical and/or functional descriptions of various ones of the electrical and mechanical components illustrated herein below can be found in one or more of the commonly assigned incorporated applications, such as U.S. Ser. No. 13/199,108, supra. In the drawings shown, the "z" direction is outward from the wall, the "y" direction is the head-to-toe direction relative to a walk-up user, and the "x" direction is the user's left-to-right direction.

Figure 11A:
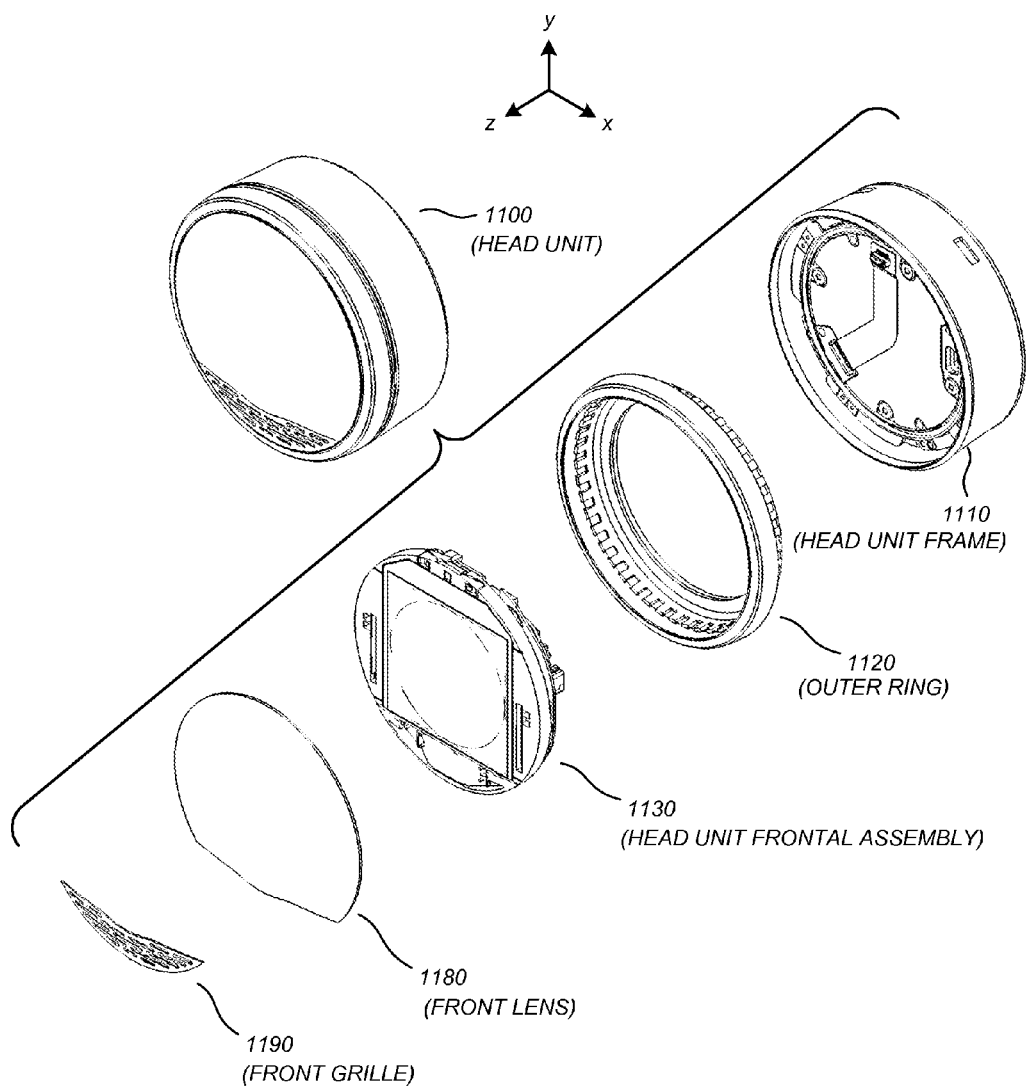
FIGS. 11A-11B illustrate exploded front and rear perspective views, respectively, of the head unit with respect to its primary components.
Figure 11B:
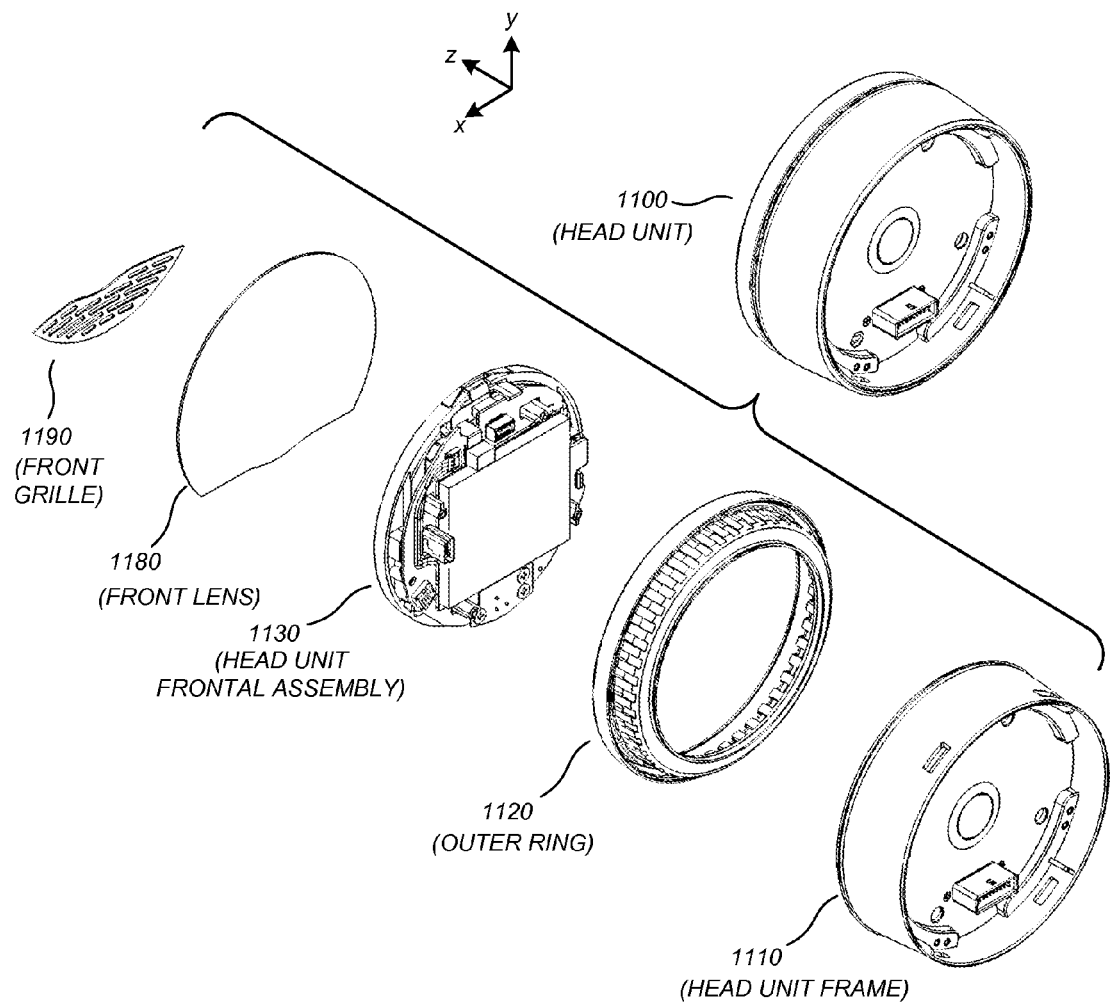

FIGS. 11A-11B illustrate exploded front and rear perspective views, respectively, of the head unit 1100 with respect to its primary components. Head unit 1100 includes a head unit frame 1110, the outer ring 1120 (which is manipulated for ring rotations), a head unit frontal assembly 1130, a front lens 1180, and a front grille 1190. Electrical components on the head unit frontal assembly 1130 can connect to electrical components on the backplate 1300 by virtue of ribbon cables and/or other plug type electrical connectors.

Figure 12A:
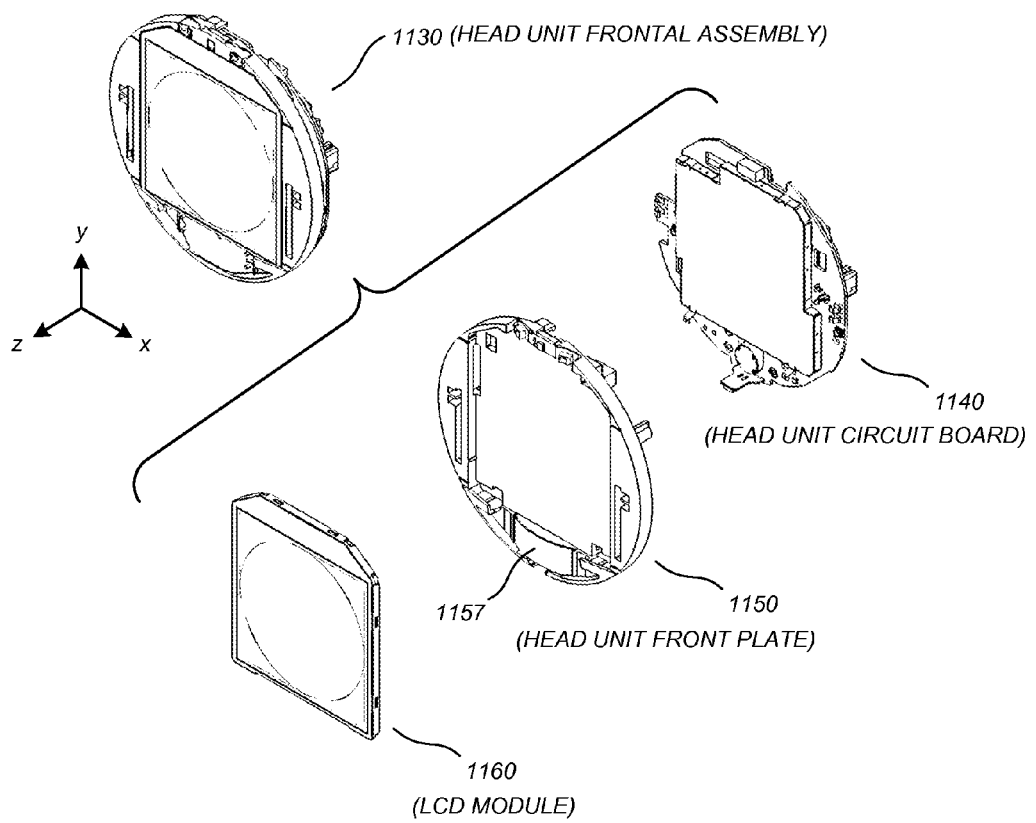
FIGS. 12A-12B illustrate exploded front and rear perspective views, respectively, of the head unit frontal assembly with respect to its primary components.
Figure 12B:
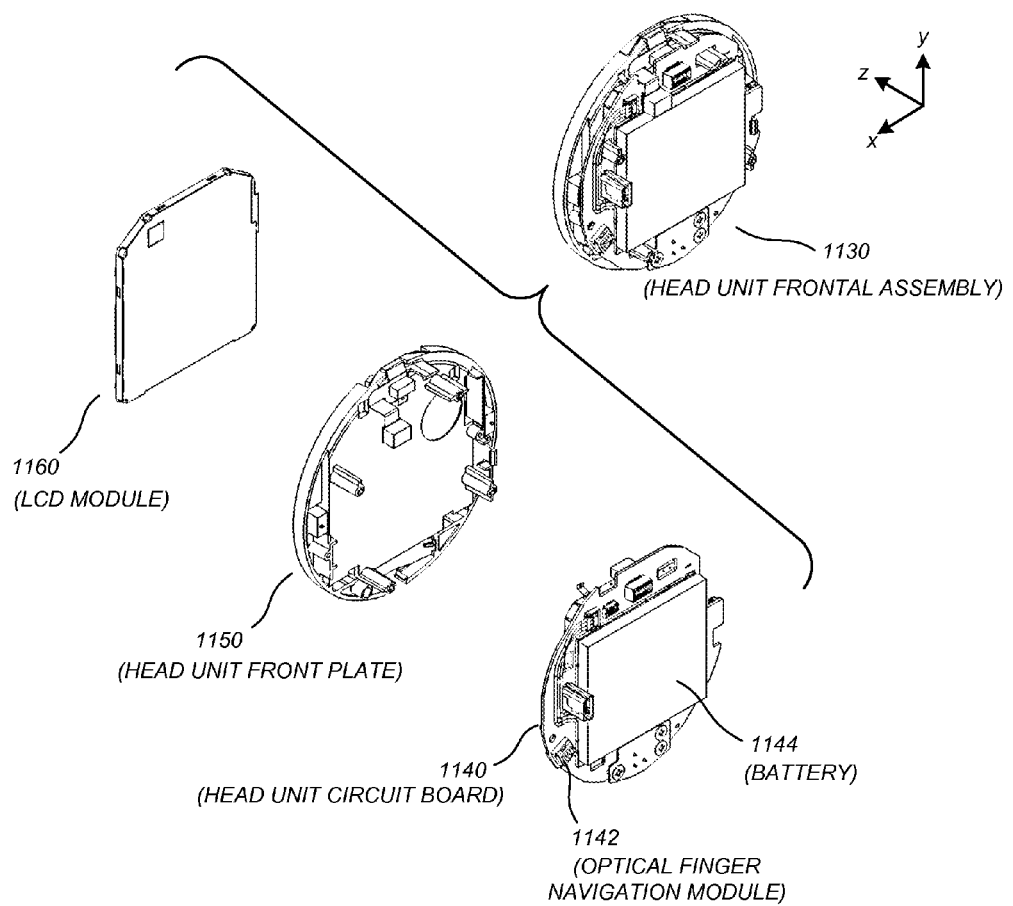

FIGS. 12A-12B illustrate exploded front and rear perspective views, respectively, of the head unit frontal assembly 1130 with respect to its primary components. Head unit frontal assembly 1130 comprises a head unit circuit board 1140, a head unit front plate 1150, and an LCD module 1160. The components of the front side of head unit circuit board 1140 are hidden behind an RF shield in FIG. 12A but are discussed in more detail below with respect to FIG. 15. On the back of the head unit circuit board 1140 is a rechargeable Lithium-Ion battery 1144, which for one preferred embodiment has a nominal voltage of 3.7 volts and a nominal capacity of 560 mAh. To extend battery life, however, the battery 1144 is normally not charged beyond 450 mAh by the thermostat battery charging circuitry. Moreover, although the battery 1144 is rated to be capable of being charged to 4.2 volts, the thermostat battery charging circuitry normally does not charge it beyond 3.95 volts. Also visible in FIG. 12B is an optical finger navigation module 1142 that is configured and positioned to sense rotation of the outer ring 1120. The module 1142 uses methods analogous to the operation of optical computer mice to sense the movement of a texturable surface on a facing periphery of the outer ring 1120. Notably, the module 1142 is one of the very few sensors that is controlled by the relatively power-intensive head unit microprocessor rather than the relatively low-power backplate microprocessor. This is achievable without excessive power drain implications because the head unit microprocessor will invariably be awake already when the user is manually turning the dial, so there is no excessive wake-up power drain anyway. Advantageously, very fast response can also be provided by the head unit microprocessor. Also visible in FIG. 12A is a Fresnel lens 1157 that operates in conjunction with a PIR motion sensor disposes thereunderneath.

Figure 13A:
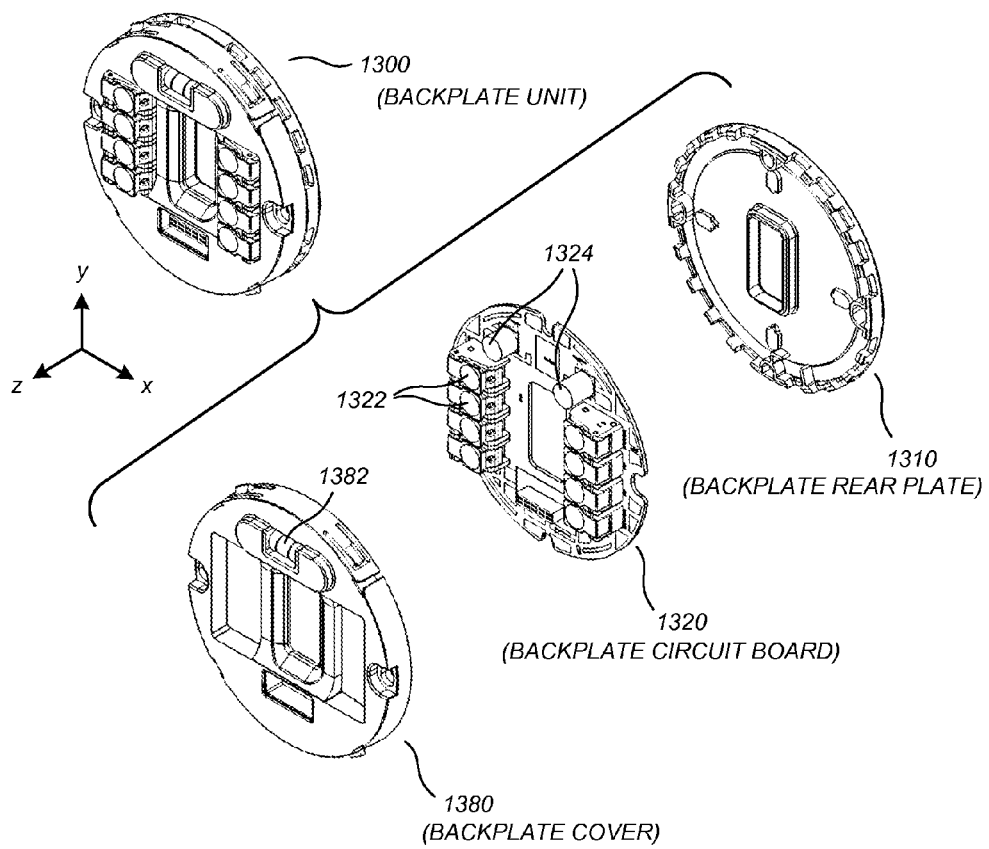
FIGS. 13A-13B illustrate exploded front and rear perspective views, respectively, of the backplate unit with respect to its primary components.
Figure 13B:
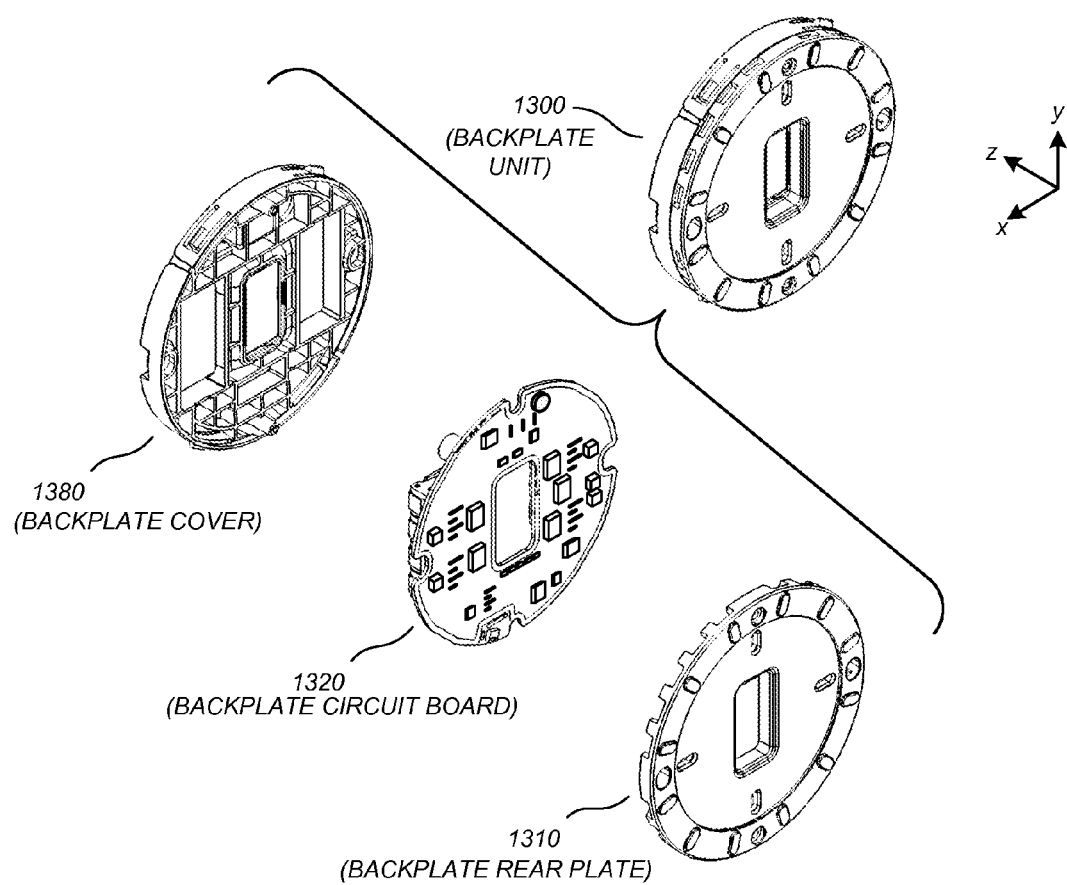

FIGS. 13A-13B illustrate exploded front and rear perspective views, respectively, of the backplate unit 1300 with respect to its primary components. Backplate unit 1300 comprises a backplate rear plate 1310, a backplate circuit board 1320, and a backplate cover 1380, which may have an incorporated level 1382. Visible in FIG. 22A are the HVAC wire connectors 1322 that include integrated wire insertion sensing circuitry, and two relatively large capacitors 1324 that are used by part of the power stealing circuitry that is mounted on the back side of the backplate circuit board 1320 and discussed further below with respect to FIG. 25.

Figure 14:
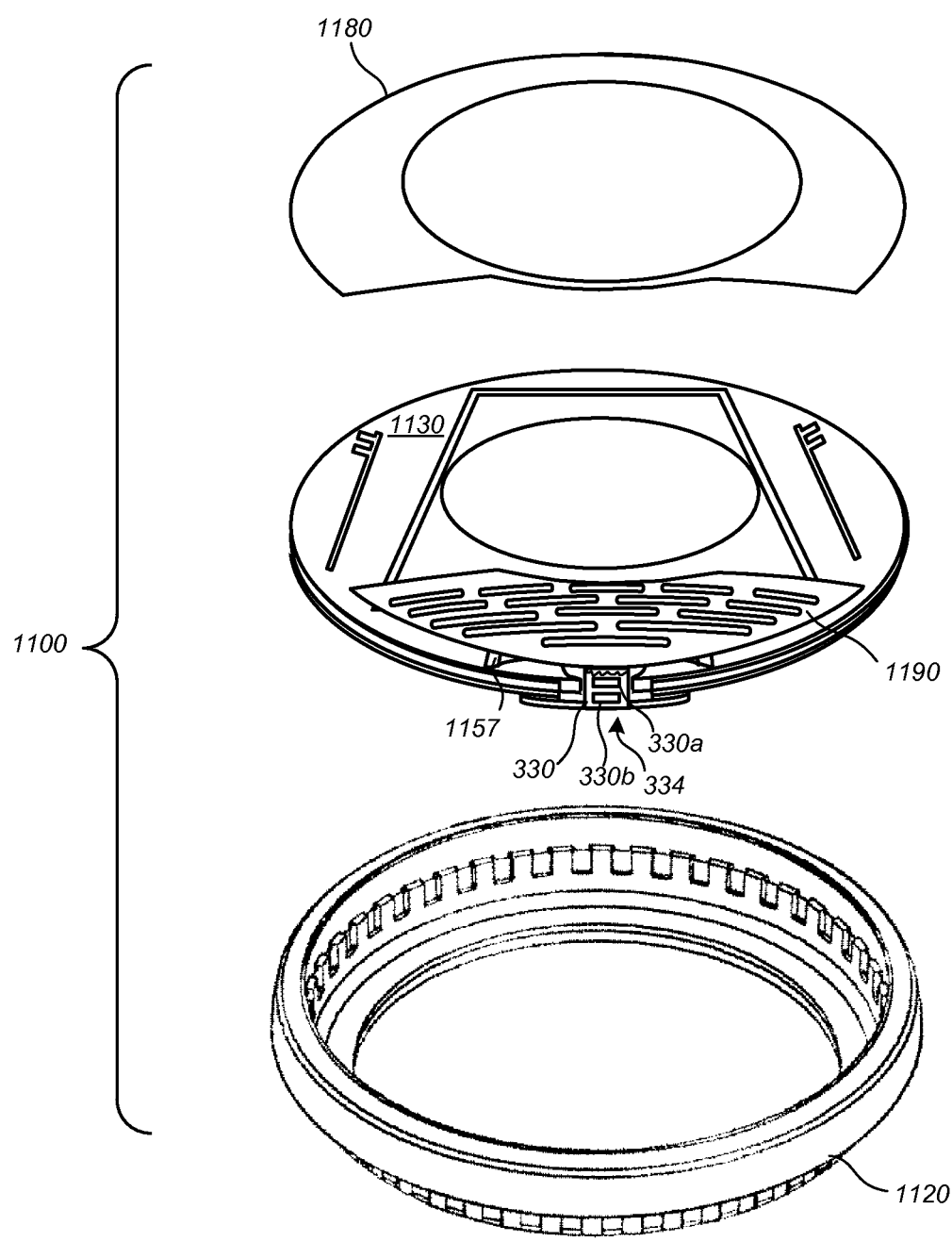
FIG. 14 illustrates a perspective view of a partially assembled head unit front, according to some embodiments.

FIG. 14 illustrates a perspective view of a partially assembled head unit front 1100 showing the positioning of grille member 1190 designed in accordance with aspects of the present invention with respect to several sensors used by the thermostat. In some implementations, as described further in U.S. Ser. No. 13/199,108, supra, placement of grille member 1190 over the Fresnel lens 1157 and an associated PIR motion sensor 334 conceals and protects these PIR sensing elements, while horizontal slots in the grille member 1190 allow the PIR motion sensing hardware, despite being concealed, to detect the lateral motion of occupants in a room or area. A temperature sensor 330 uses a pair of thermal sensors to more accurately measure ambient temperature. A first or upper thermal sensor 330a associated with temperature sensor 330 tends to gather temperature data closer to the area outside or on the exterior of the thermostat while a second or lower thermal sensor 330b tends to collect temperature data more closely associated with the interior of the housing. In one implementation, each of the temperature sensors 330a and 330b comprises a Texas Instruments TMP112 digital temperature sensor chip, while the PIR motion sensor 334 comprises PerkinElmer DigiPyro PYD 1198 dual element pyrodetector.

To more accurately determine the ambient temperature, the temperature taken from the lower thermal sensor 330b is taken into consideration in view of the temperatures measured by the upper thermal sensor 330a and when determining the effective ambient temperature. This configuration can advantageously be used to compensate for the effects of internal heat produced in the thermostat by the microprocessor(s) and/or other electronic components therein, thereby obviating or minimizing temperature measurement errors that might otherwise be suffered. In some implementations, the accuracy of the ambient temperature measurement may be further enhanced by thermally coupling upper thermal sensor 330a of temperature sensor 330 to grille member 1190 as the upper thermal sensor 330a better reflects the ambient temperature than lower thermal sensor 330b. Details on using a pair of thermal sensors to determine an effective ambient temperature is disclosed in U.S. Pat. No. 4,741,476, which is incorporated by reference herein.

Figure 15:
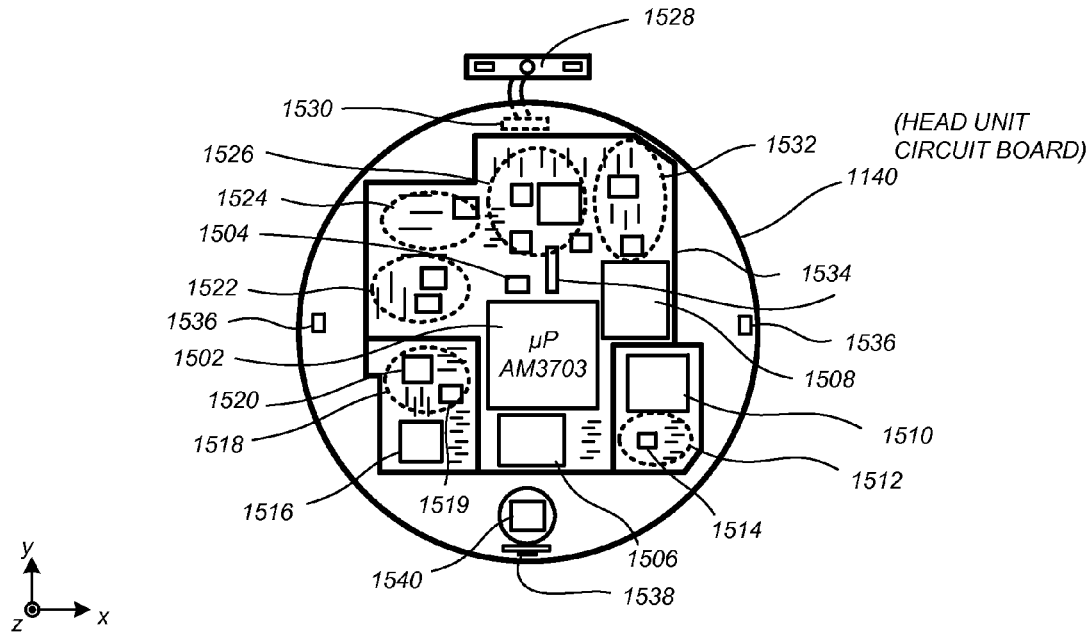
FIG. 15 illustrates a head-on view of the head unit circuit board, according to one embodiment.

FIG. 15 illustrates a head-on view of the head unit circuit board 1140, which comprises a head unit microprocessor 1502 (such as a Texas Instruments AM3703 chip) and an associated oscillator 1504, along with DDR SDRAM memory 1506, and mass NAND storage 1508. For Wi-Fi capability, there is provided in a separate compartment of RF shielding 1534 a Wi-Fi module 1510, such as a Murata Wireless Solutions LBWA19XSLZ module, which is based on a Texas Instruments WL1270 chipset supporting the 802.11b/g/n WLAN standard. For the Wi-Fi module 1510 there is provided supporting circuitry 1512 including an oscillator 1514. For ZigBee capability, there is provided also in a separately shielded RF compartment a ZigBee module 1516, which can be, for example, a C2530F256 module from Texas Instruments. For the ZigBee module 1516 there is provided supporting circuitry 1518 including an oscillator 1519 and a low-noise amplifier 1520. Also provided is display backlight voltage conversion circuitry 1522, piezoelectric driving circuitry 1524, and power management circuitry 1526 (local power rails, etc.). Provided on a flex circuit 1528 that attaches to the back of the head unit circuit board by a flex circuit connector 1530 is a proximity and ambient light sensor (PROX/ALS), more particularly a Silicon Labs SI1142 Proximity/Ambient Light Sensor with an I2C Interface. Also provided are battery charging-supervision-disconnect circuitry 1532, and spring/RF antennas 1536. Also provided is a temperature sensor 1538 (rising perpendicular to the circuit board in the +z direction containing two separate temperature sensing elements at different distances from the circuit board), and a PIR motion sensor 1540. Notably, even though the PROX/ALS and temperature sensors 1538 and PIR motion sensor 1540 are physically located on the head unit circuit board 1140, all these sensors are polled and controlled by the low-power backplate microcontroller on the backplate circuit board, to which they are electrically connected.

Figure 16:
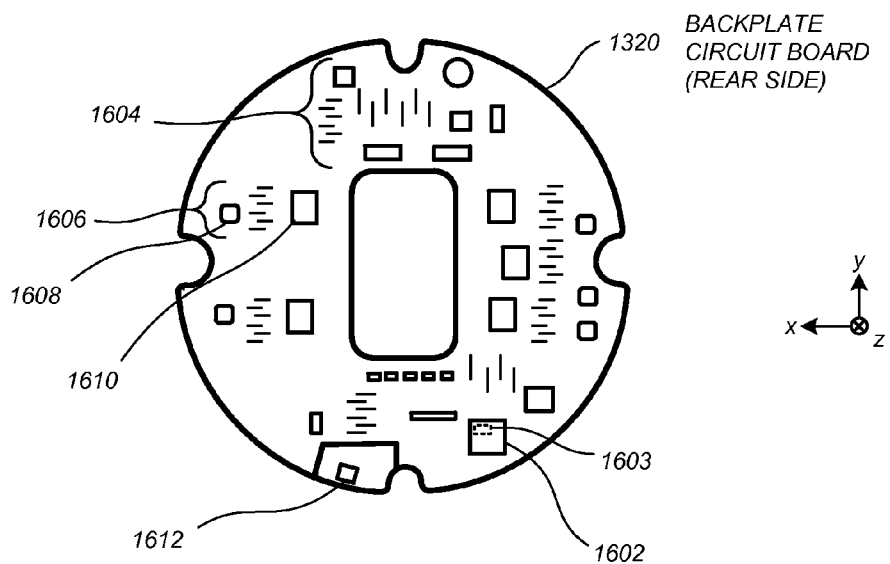
FIG. 16 illustrates a rear view of the backplate circuit board, according to one embodiment.

FIG. 16 illustrates a rear view of the backplate circuit board 1320, comprising a backplate processor/microcontroller 1602, such as a Texas Instruments MSP430F System-on-Chip Microcontroller that includes an on-board memory 1603. The backplate circuit board 1320 further comprises power supply circuitry 1604, which includes power-stealing circuitry, and switch circuitry 1606 for each HVAC respective HVAC function. For each such function the switch circuitry 1606 includes an isolation transformer 1608 and a back-to-back NFET package 1610. The use of FETs in the switching circuitry allows for "active power stealing", i.e., taking power during the HVAC "ON" cycle, by briefly diverting power from the HVAC relay circuit to the reservoir capacitors for a very small interval, such as 100 micro-seconds. This time is small enough not to trip the HVAC relay into the "off" state but is sufficient to charge up the reservoir capacitors. The use of FETs allows for this fast switching time (100 micro-seconds), which would be difficult to achieve using relays (which stay on for tens of milliseconds). Also, such relays would readily degrade doing this kind of fast switching, and they would also make audible noise too. In contrast, the FETS operate with essentially no audible noise. Also provided is a combined temperature/humidity sensor module 1612, such as a Sensirion SHT21 module. The backplate microcontroller 1602 performs polling of the various sensors, sensing for mechanical wire insertion at installation, alerting the head unit regarding current vs. setpoint temperature conditions and actuating the switches accordingly, and other functions such as looking for appropriate signal on the inserted wire at installation.

In accordance with the teachings of the commonly assigned U.S. Ser. No. 13/269,501, infra, the commonly assigned U.S. Ser. No. 13/275,307, which is incorporated by reference herein, and others of the commonly assigned incorporated applications, the thermostat 900 represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. By way of example, the head unit microprocessor 1502 can draw on the order of 250 mW when awake and processing, the LCD module 1160 can draw on the order of 250 mW when active. Moreover, the Wi-Fi module 1510 can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The thermostat 900 resolves such issues at least by virtue of the use of the rechargeable battery 1144 (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 900 is provided with both (i) a relatively powerful and relatively power-intensive first processor (such as a Texas Instruments AM3703 microprocessor) that is capable of quickly performing more complex functions such as driving a visually pleasing user interface display and performing various mathematical learning computations, and (ii) a relatively less powerful and less power-intensive second processor (such as a Texas Instruments MSP430 microcontroller) for performing less intensive tasks, including driving and controlling the occupancy sensors. To conserve valuable power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, which can be termed "wake-on" facilities. These wake-on facilities can be turned on and turned off as part of different functional and/or power-saving goals to be achieved. For example, a "wake-on-PROX" facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), will "wake up" the first processor so that it can provide a visual display to the approaching user and be ready to respond more rapidly when their hand touches the dial. As another example, a "wake-on-PIR" facility can be provided by which the second processor will wake up the first processor when detecting motion somewhere in the general vicinity of the thermostat by virtue of a passive infrared motion sensor (PIR, such as provided by a PerkinElmer DigiPyro PYD 1198 dual element pyrodetector). Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

Figures 17A, 17B, 17C:
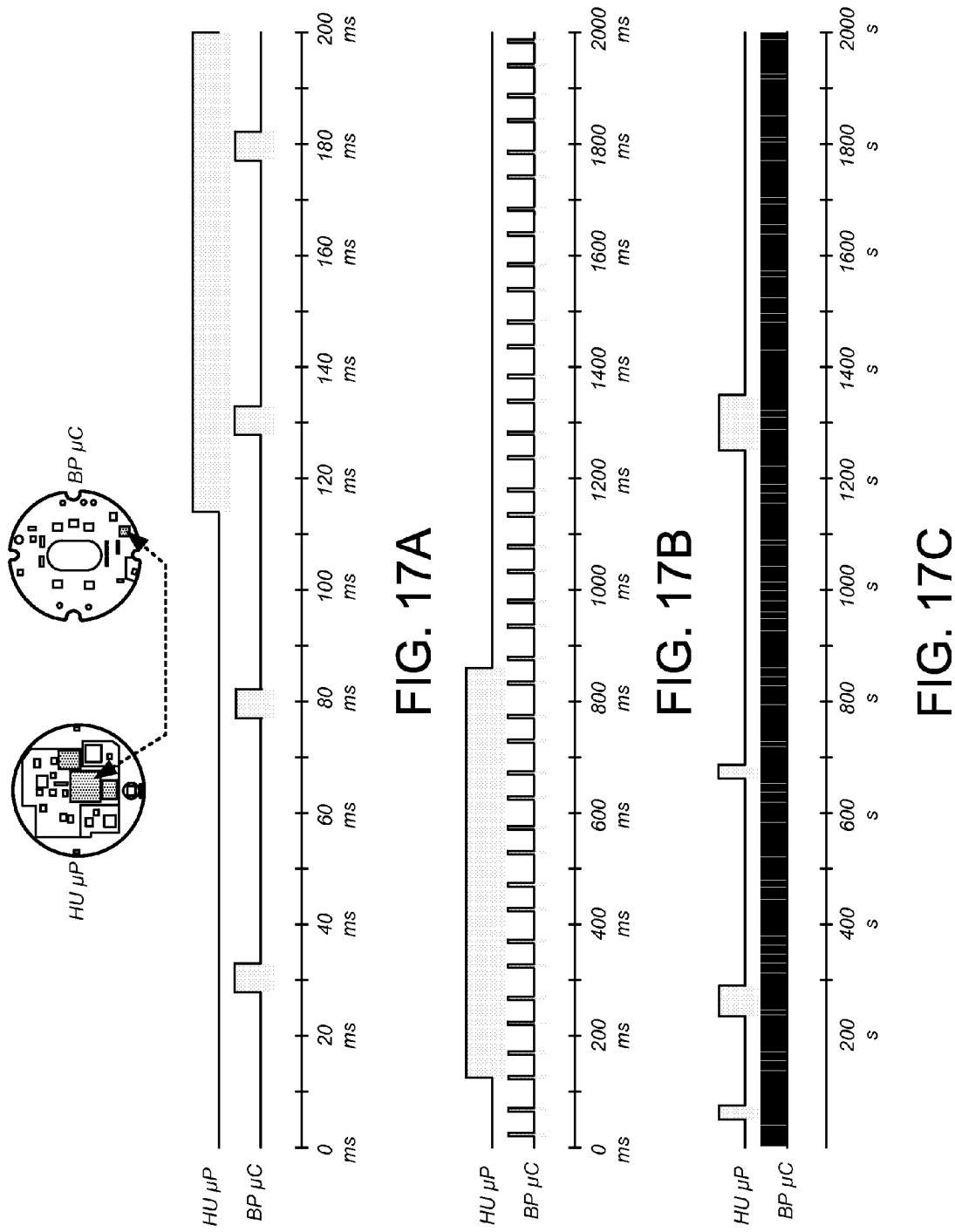
FIGS. 17A-17C illustrate conceptual examples of the sleep-wake timing dynamic, at progressively larger time scales; according to one embodiment.

FIGS. 17A-17C illustrate conceptual examples of the sleep-wake timing dynamic, at progressively larger time scales, that can be achieved between the head unit (HU) microprocessor and the backplate (BP) microcontroller that advantageously provides a good balance between performance, responsiveness, intelligence, and power usage. The higher plot value for each represents a "wake" state (or an equivalent higher power state) and the lower plot value for each represents a "sleep" state (or an equivalent lower power state). As illustrated, the backplate microcontroller is active much more often for polling the sensors and similar relatively low-power tasks, whereas the head unit microprocessor stays asleep much more often, being woken up for "important" occasions such as user interfacing, network communication, and learning algorithm computation, and so forth. A variety of different strategies for optimizing sleep versus wake scenarios can be achieved by the disclosed architecture and is within the scope of the present teachings. For example, the commonly assigned U.S. Ser. No. 13/275,307, supra, describes a strategy for conserving head unit microprocessor "wake" time while still maintaining effective and timely communications with a cloud-based thermostat management server via the thermostat's Wi-Fi facility.

Figure 18:
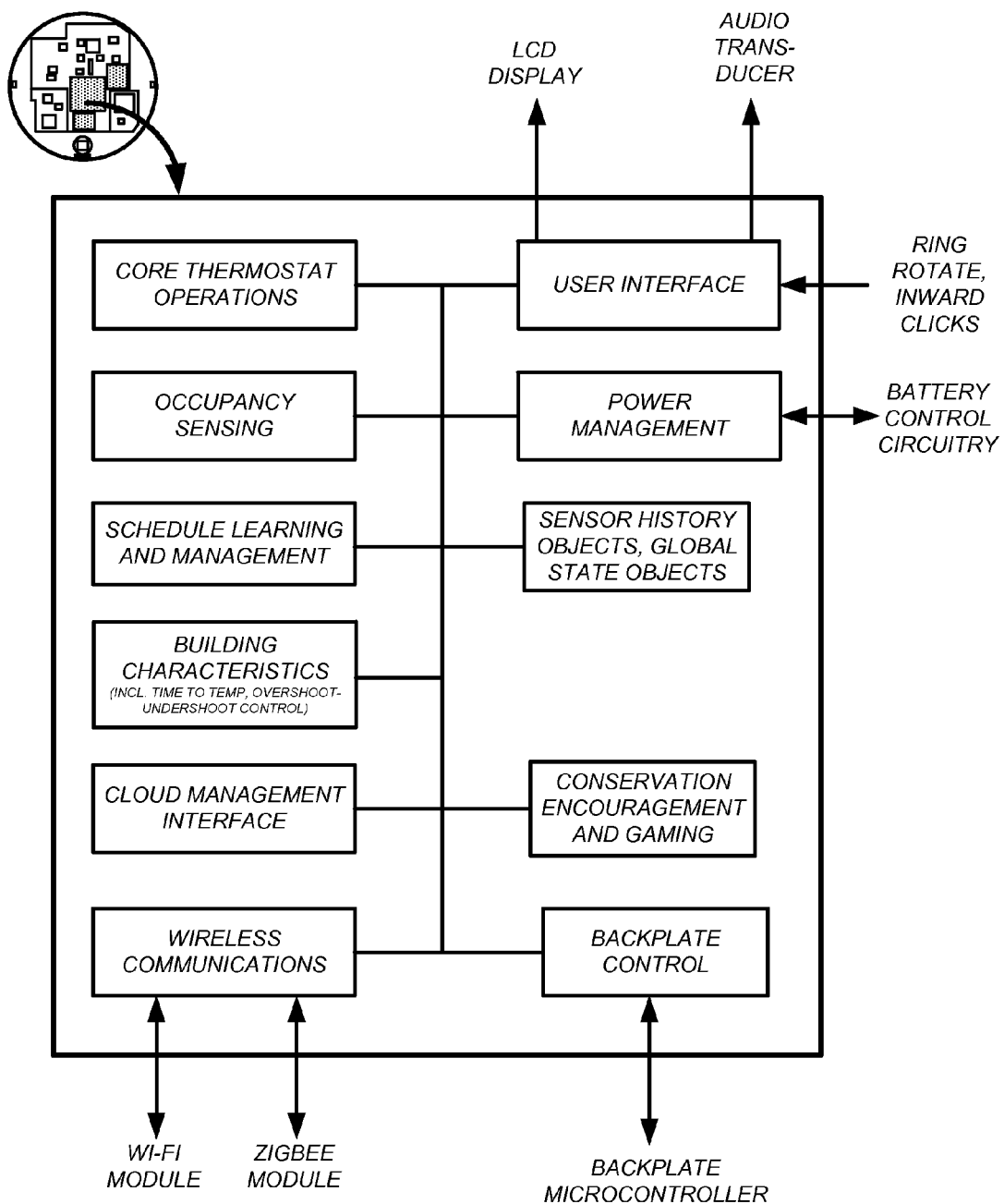
FIG. 18 illustrates a self-descriptive overview of the functional software, firmware, and/or programming architecture of the head unit microprocessor, according to one embodiment.
Figure 19:
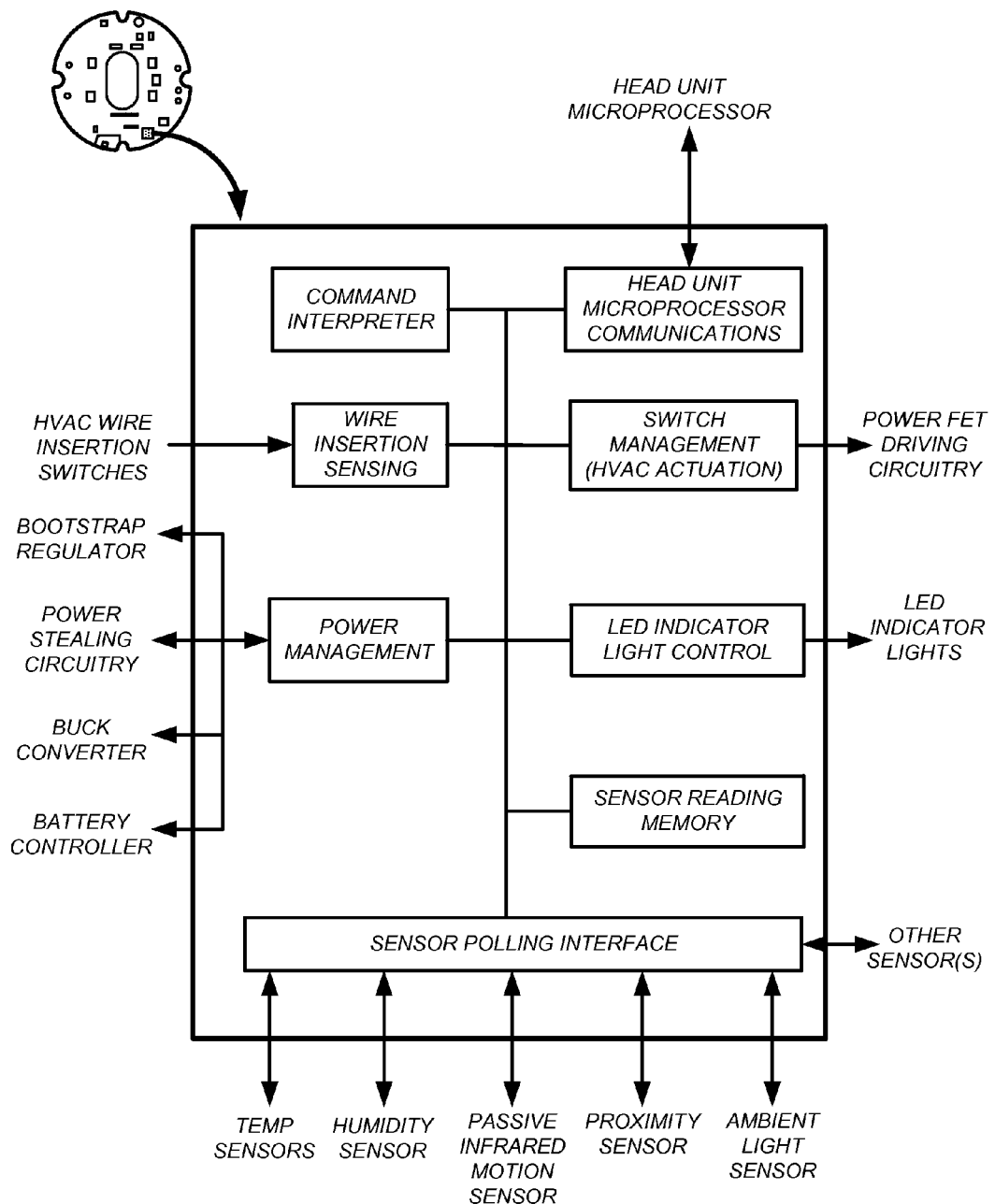
FIG. 19 illustrates a self-descriptive overview of the functional software, firmware, and/or programming architecture of the backplate microcontroller, according to one embodiment.

FIG. 18 illustrates a self-descriptive overview of the functional software, firmware, and/or programming architecture of the head unit microprocessor for achieving its described functionalities. FIG. 19 illustrates a self-descriptive overview of the functional software, firmware, and/or programming architecture of the backplate microcontroller for achieving its described functionalities.

Figure 20:
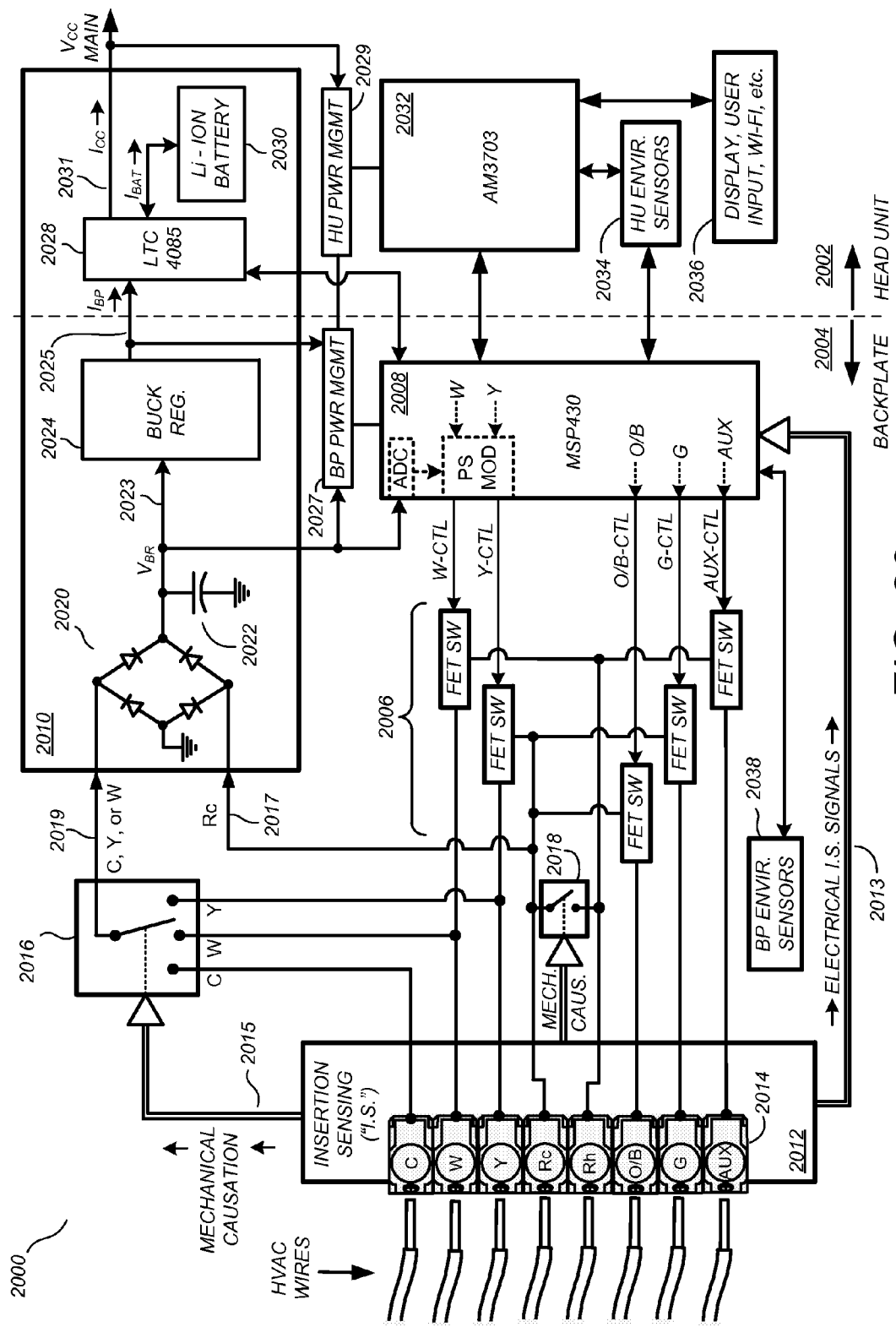
FIG. 20 illustrates a thermostat 2000 according to a preferred embodiment.

FIG. 20 illustrates a thermostat 2000 according to a preferred embodiment, the thermostat 2000 comprising selected feature combinations that have been found to be particularly advantageous for the facilitation of do-it-yourself thermostat installation, the accommodation of a variety of different practical installation scenarios (including scenarios where a "C" power wire is not available), the provisioning of relatively power-intensive advanced interfaces and functionalities (e.g., a large visually pleasing electronic display, a relatively powerful general purpose microprocessor, and a reliable Wi-Fi communications chip) even where a "C" power wire is not available, the facilitation of operational robustness and durability, compact device size, quietness of operation, and other advantageous characteristics described in the instant disclosure and/or the commonly assigned incorporated applications. In the discussion that follows, the following HVAC wiring shorthand notations are used: W (heat call relay wire); Y (cooling call relay wire); Rh (heat call relay power); Rc (cooling call relay power); G (fan call relay wire); O/B (heat pump call relay wire); AUX (auxiliary call relay wire); and C (common wire).

The Rh wire, which leads to one side of the HVAC power transformer (or simply "HVAC transformer") that is associated with a heating call relay, can go by different names in the art, which can include heating call switch power wire, heat call power return wire, heat return wire, return wire for heating, or return for heating. The Rc wire, which leads to one side of the HVAC transformer that is associated with a cooling call relay, can likewise go by different names including cooling call switch power wire, cooling call power return wire, cooling return wire, return wire for cooling, or return for cooling. In the case of single-HVAC-transformer systems having both heating and cooling functions, it is one and the same HVAC power transformer that is associated with both the heating call relay and cooling call relay, and in such cases there is just a single wire, usually labeled "R", leading back to one side of that HVAC transformer, which likewise can go by different names in the art including call switch power wire, call relay power wire, call power return wire, power return wire, or simply return wire.

As illustrated generally in FIG. 20, the thermostat 2000 comprises a head unit 2002 and a backplate 2004. The backplate 2004 comprises a plurality of FET switches 2006 used for carrying out the essential thermostat operations of connecting or "shorting" one or more selected pairs of HVAC wires together according to the desired HVAC operation. The details of FET switches 2006, each of which comprises a dual back-to-back FET configuration, can be found elsewhere in the instant disclosure and/or in the commonly assigned U.S. Ser. No. 13/034,674, supra. The operation of each of the FET switches 2006 is controlled by a backplate microcontroller 2008 which can comprise, for example, an MSP430 16-bit ultra-low power RISC mixed-signal microprocessor available from Texas Instruments.

Thermostat 2000 further comprises powering circuitry 2010 that comprises components contained on both the backplate 2004 and head unit 2002. Generally speaking, it is the purpose of powering circuitry 2010 to extract electrical operating power from the HVAC wires and convert that power into a usable form for the many electrically-driven components of the thermostat 2000. Thermostat 2000 further comprises insertion sensing components 2012 configured to provide automated mechanical and electrical sensing regarding the HVAC wires that are inserted into the thermostat 2000. Thermostat 2000 further comprises a relatively high-power head unit microprocessor 2032, such as an AM3703 Sitara ARM microprocessor available from Texas Instruments, that provides the main general governance of the operation of the thermostat 2000. Thermostat 2000 further comprises head unit/backplate environmental sensors 2034/2038 (e.g., temperature sensors, humidity sensors, active IR motion sensors, passive IR motion sensors, ambient visible light sensors, accelerometers, ambient sound sensors, ultrasonic/infrasonic sound sensors, etc.), as well as other components 2036 (e.g., electronic display devices and circuitry, user interface devices and circuitry, wired communications circuitry, wireless communications circuitry such as Wi-Fi and/or ZigBee chips) that are operatively coupled to the head unit microprocessor 2032 and/or backplate microprocessor 2008 and collectively configured to provide the functionalities described in the instant disclosure and/or the commonly assigned incorporated applications.

The insertion sensing components 2012 include a plurality of HVAC wiring connectors 2014, each containing an internal springable mechanical assembly that, responsive to the mechanical insertion of a physical wire thereinto, will mechanically cause an opening or closing of one or more dedicated electrical switches associated therewith. Exemplary configurations for each of the HVAC wiring connectors 2014 can be found in the commonly assigned U.S. Ser. No. 13/034,666, supra. With respect to the HVAC wiring connectors 2014 that are dedicated to the C, W, Y, Rc, and Rh terminals, those dedicated electrical switches are, in turn, networked together in a manner that yields the results that are illustrated in FIG. 20 by the blocks 2016 and 2018. For clarity of presentation in FIG. 20, the block 2016 is shown as being coupled to the internal sensing components 2012 by virtue of double lines termed "mechanical causation," for the purpose of denoting that the output of block 2016 is dictated solely by virtue of the particular combination of HVAC wiring connectors 2014 into which wires have been mechanically inserted. More specifically, the output of block 2016, which is provided at a node 2019, is dictated solely by virtue of the particular combination of C, W, and Y connectors into which wires have been mechanically inserted. Still more specifically, the output of block 2016 at node 2019 is provided in accordance with the following rules: if a wire is inserted into the C connector, then the node 2019 becomes the C node regardless of whether there are any wires inserted into the Y or W connectors; if no wire is inserted into the C connector and a wire is inserted into the Y connector, then the node 2019 becomes the Y node regardless of whether there is a wire inserted into the W connector; and if no wire is inserted into either of the C or Y connectors, then the node 2019 becomes the W node. Exemplary configurations for achieving the functionality of block 2016 (as combined with components 2012 and wiring connectors 2014) can be found elsewhere in the instant disclosure and/or in the commonly assigned U.S. Ser. No. 13/034,678, supra. It is to be appreciated that, although mechanical causation for achieving the functionality of block 2016 (as combined with components 2012 and wiring connectors 2014) has been found to be particularly advantageous for simplicity and do-it-yourself ("DIY") foolproofing, in other embodiments there can be similar functionalities carried out electrically, magnetically, optically, electro-optically, electro-mechanically, etc. without departing from the scope of the present teachings. Thus, for example, similar results could be obtained by using optically, electrically, and/or magnetically triggered wire insertion sensing components that are coupled to relays or electronic switches that carry out the functionality of block 2016 (as combined with components 2012 and wiring connectors 2014) without departing from the scope of the present teachings.

Likewise, for clarity of presentation in FIG. 20, the block 2018 is also shown as being coupled to the internal sensing components 2012 by virtue of double lines termed "mechanical causation," for the purpose of denoting that its operation, which is either to short the Rc and Rh nodes together or not to short the Rc and Rh nodes together, is dictated solely by virtue of the particular combination of HVAC wiring connectors 2014 into which wires have been mechanically inserted. More specifically, whether the block 2018 will short, or not short, the Rc and Rh nodes together is dictated solely by virtue of the particular combination of Rc and Rh connectors into which wires have been mechanically inserted. Still more specifically, the block 2018 will keep the Rc and Rh nodes shorted together, unless wires have been inserted into both the Rc and Rh connectors, in which case the block 2018 will not short the Rc and Rh nodes together because a two-HVAC-transformer system is present. Exemplary configurations for achieving the functionality of block 2018 (as combined with components 2012 and wiring connectors 2014) can be found elsewhere in the instant disclosure and/or in the commonly assigned U.S. Ser. No. 13/034,674, supra. It is to be appreciated that, although mechanical causation for achieving the functionality of block 2018 (as combined with components 2012 and wiring connectors 2014) has been found to be particularly advantageous for simplicity and do-it-yourself ("DIY") foolproofing, in other embodiments there can be similar functionalities carried out electrically, magnetically, optically, electro-optically, electro-mechanically, etc., in different combinations, without departing from the scope of the present teachings. Thus, for example, similar results could be obtained by using optically, electrically, and/or magnetically triggered wire insertion sensing components that are coupled to relays or electronic switches that carry out the functionality of block 2018 (as combined with components 2012 and wiring connectors 2014) without departing from the scope of the present teachings.

As illustrated in FIG. 20, the insertion sensing circuitry 2012 is also configured to provide electrical insertion sensing signals 2013 to other components of the thermostat 2000, such as the backplate microcontroller 2008. Preferably, for each of the respective HVAC wiring terminal 2014, there is provided at least two signals in electrical form to the microcontroller 2008, the first being a simple "open" or "short" signal that corresponds to the mechanical insertion of a wire, and the second being a voltage or other level signal (in analog form or, optionally, in digitized form) that represents a sensed electrical signal at that terminal (as measured, for example, between that terminal and an internal thermostat ground node). Exemplary configurations for providing the sensed voltage signal can be found elsewhere in the instant disclosure and/or in the commonly assigned U.S. Ser. No. 13/034,674, supra. The first and second electrical signals for each of the respective wiring terminals can advantageously be used as a basis for basic "sanity checking" to help detect and avoid erroneous wiring conditions. For example, if there has been a wire inserted into the "C" connector, then there should be a corresponding voltage level signal sensed at the "C" terminal, and if that corresponding voltage level signal is not present or is too low, then an error condition is indicated because there should always be a voltage coming from one side of the HVAC power transformer (assuming that HVAC system power is on, of course). As another example, if there has been a wire inserted into the "O/B" connector (heat pump call relay wire) but no wire has been inserted into the "Y" connector (cooling call relay wire), then an error condition is indicated because both of these wires are needed for proper heat pump control. Exemplary ways for conveying proper and/or improper wiring status information to the user can be found elsewhere in the instant disclosure and/or in the commonly assigned U.S. Ser. No. 13/269,501, infra.

Basic operation of each of the FET switches 2006 is achieved by virtue of a respective control signal (OFF or ON) provided by the backplate microcontroller 2008 that causes the corresponding FET switch 2006 to "connect" or "short" its respective HVAC lead inputs for an ON control signal, and that causes the corresponding FET switch 2006 to "disconnect" or "leave open" or "open up" its respective HVAC lead inputs for an OFF control signal. For example, the W-Rh FET switch keeps the W and Rh leads disconnected from each other unless there is an active heating call, in which case the W-Rh FET switch shorts the W and Rh leads together. As a further example, the Y-Rc FET switch keeps the Y and Rc leads disconnected from each other unless there is an active cooling call, in which case the Y-Rc FET switch shorts the Y and Rc leads together. (There is one exception to this basic operation for the particular case of "active power stealing" that is discussed in more detail supra, in which case the FET switch corresponding to the HVAC lead from which power is being stolen is opened up for very brief intervals during an active call involving that lead. Thus, if power-stealing is being performed using the Y lead, then during an active cooling call the Y-Rc FET switch is opened up for very brief intervals from time to time, these brief intervals being short enough such that the Y HVAC relay does not un-trip.)

Advantageously, by virtue of the above-described operation of block 2018, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation. The G-Rc FET switch keeps the G and Rc leads disconnected from each other unless there is an active fan call, in which case the G-Rc FET switch shorts the G and Rc leads together (and, advantageously, the proper connection will be achieved regardless of whether the there is a single HVAC transformer or dual HVAC transformers because the Rc and Rh terminals will be automatically shorted or isolated accordingly). The AUX-Rh FET switch keeps the AUX and Rh leads disconnected from each other unless there is an active AUX call, in which case the AUX-Rh FET switch shorts the AUX and Rh leads together (and, advantageously, the proper connection will be achieved regardless of whether the there is a single HVAC transformer or dual HVAC transformers because the Rc and Rh terminals will be automatically shorted or isolated accordingly). For heat pump calls, the O/B-Rc FET switch and Y-Rc FET switch are jointly operated according to the required installation-dependent convention for forward or reverse operation (for cooling or heating, respectively), which convention can advantageously be determined automatically (or semi-automatically using feedback from the user) by the thermostat 2000 as described further in the commonly assigned PCT/US12/30084, which is incorporated by reference herein.

Referring now to the powering circuitry 2010 in FIG. 20, advantageously provided is a configuration that automatically adapts to the powering situation presented to the thermostat 2000 at the time of installation and thereafter in a manner that has been found to provide a good combination of robustness, adaptability, and foolproofness. The powering circuitry 2010 comprises a full-wave bridge rectifier 2020, a storage and waveform-smoothing bridge output capacitor 2022 (which can be, for example, on the order of 30 microfarads), a buck regulator circuit 2024, a power-and-battery (PAB) regulation circuit 9528, and a rechargeable lithium-ion battery 2030. In conjunction with other control circuitry including backplate power management circuitry 2027, head unit power management circuitry 2029, and the microcontroller 2008, the powering circuitry 2010 is configured and adapted to have the characteristics and functionality described hereinbelow. Description of further details of the powering circuitry 2010 and associated components can be found elsewhere in the instant disclosure and/or in the commonly assigned U.S. Ser. No. 13/034,678, supra, and U.S. Ser. No. 13/267,871, supra.

By virtue of the configuration illustrated in FIG. 20, when there is a "C" wire presented upon installation, the powering circuitry 2010 operates as a relatively high-powered, rechargeable-battery-assisted AC-to-DC converting power supply. When there is not a "C" wire presented, the powering circuitry 2010 operates as a power-stealing, rechargeable-battery-assisted AC-to-DC converting power supply. As illustrated in FIG. 20, the powering circuitry 2010 generally serves to provide the voltage Vcc MAIN that is used by the various electrical components of the thermostat 2000, and that in one embodiment will usually be about 4.0 volts. As used herein, "thermostat electrical power load" refers to the power that is being consumed by the various electrical components of the thermostat 2000. Thus, the general purpose of powering circuitry 2010 is to judiciously convert the 24VAC presented between the input leads 2019 and 2017 to a steady 4.0 VDC output at the Vcc MAIN node to supply the thermostat electrical power load. Details relating to bootstrap circuitry (not shown), whose purpose is to provide a kind of cruder, less well-regulated, lower-level electrical power that assists in device start-up and that can act as a kind of short term safety net, are omitted from the present discussion for purposes of clarity of description, although further information on such circuitry can be found in U.S. U.S. Ser. No. 13/034,678, supra.

Operation of the powering circuitry 2010 for the case in which the "C" wire is present is now described. Although the powering circuitry 2010 may be referenced as a "power-stealing" circuit in the general sense of the term, the mode of operation for the case in which the "C" wire is present does not constitute "power stealing" per se, because there is no power being "stolen" from a wire that leads to an HVAC call relay coil (or to the electronic equivalent of an HVAC call relay coil for some newer HVAC systems). For the case in which the "C" wire is present, there is no need to worry about accidentally tripping (for inactive power stealing) or untripping (for active power stealing) an HVAC call relay, and therefore relatively large amounts of power can be assumed to be available from the input at nodes 2019/2017. When the 24VAC input voltage between nodes 2019 and 2017 is rectified by the full-wave bridge rectifier 2020, a DC voltage at node 2023 is present across the bridge output capacitor 2022, and this DC voltage is converted by the buck regulator 2024 to a relatively steady voltage, such as 4.45 volts, at node 2025, which provides an input current $I_{BP}$ to the power-and-battery (PAB) regulation circuit 2028.

The microcontroller 2008 controls the operation of the powering circuitry 2010 at least by virtue of control leads leading between the microcontroller 2008 and the PAB regulation circuit 2028, which for one embodiment can include an LTC4085-3 chip available from Linear Technologies Corporation. The LTC4085-3 is a USB power manager and Li-Ion/Polymer battery charger originally designed for portable battery-powered applications. The PAB regulation circuit 2028 provides the ability for the microcontroller 2008 to specify a maximum value $I_{BP}(max)$ for the input current $I_{BP}$. The PAB regulation circuit 2028 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 2030 as needed when excess power is available, and while also tending to the proper discharging of the rechargeable battery 2030 as needed when additional power (beyond what can be provided at the maximum input current $I_{BP}(max)$) is needed to satisfy the thermostat electrical power load. If it is assumed for the sake of clarity of explanation that the voltages at the respective input, output, and battery nodes of the PAB regulation circuit 2028 are roughly equal, the functional operation of the PAB regulation circuit 2028 can be summarized by relationship $I_{BP}=Icc+I_{BAT}$, where it is the function of the PAB regulation circuit 2028 to ensure that $I_{BP}$ remains below $I_{BP}(max)$ at all times, while providing the necessary load current Icc at the required output voltage Vcc even for cases in which Icc is greater than $I_{BP}(max)$. The PAB regulation circuit 2028 is configured to achieve this goal by regulating the value of $I_{BAT}$ to charge the rechargeable battery 2030 ($I_{BAT}>0$) when such charge is needed and when Icc is less than $I_{BP}(max)$, and by regulating the value of $I_{BAT}$ to discharge the rechargeable battery 2030 ($I_{BAT}<0$) when Icc is greater than $I_{BP}(max)$.

For one embodiment, for the case in which the "C" wire is present, the value of $I_{BP}(max)$ for the PAB regulation circuit 2028 is set to a relatively high current value, such as 100 mA, by the microcontroller 2008. Assuming a voltage of about 4.45 volts at node 2025, this corresponds to a maximum output power from the buck regulator 2024 of about 445 mW. Advantageously, by virtue of the rechargeable battery-assisted operation described above, the powering circuitry 2010 can provide instantaneous thermostat electrical power load levels higher than 445 mW on an as-needed basis by discharging the rechargeable battery, and then can recharge the rechargeable battery once the instantaneous thermostat electrical power load goes back down. Generally speaking, depending especially on the instantaneous power usage of the large visually pleasing electronic display (when activated by the user coming close or manipulating the user interface), the high-powered microprocessor 2032 (when not in sleep mode), and the Wi-Fi chip (when transmitting), the instantaneous thermostat electrical power load can indeed rise above 445 mW by up to several hundred additional milliwatts. For preferred embodiments in which the rechargeable battery 2030 has a capacity in the several hundreds of milliamp-hours (mAh) at or near the nominal Vcc voltage levels (e.g., 560 mAh at 3.7 volts), supplying this amount of power is generally not problematic, even for extended time periods (even perhaps up to an hour or more), provided only that there are sufficient periods of lower-power usage below 445 mW in which the rechargeable battery 2030 can be recharged. The thermostat 2000 is configured such that this is easily the case, and indeed is designed such that the average power consumption is below a much lower threshold power than this, as discussed further below in the context of "active power stealing."

Operation of the powering circuitry 2010 for the case in which the "C" wire is not present is now described. For such case, in accordance with the above-described operation of insertion sensing components/switches 2012/2016, it will be the Y-lead that is connected to the node 2019 if a "Y" wire has been inserted, and it will otherwise be the W-lead that is connected to the node 2019 if no "Y" wire has been inserted. Stated differently, it will be the Y-lead from which "power is stolen" if a "Y" wire has been inserted, and it will otherwise be the W-lead from which "power is stolen" if no "Y" wire has been inserted. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place.

Operation of the powering circuitry 2010 for "inactive power stealing" is now described. In the description that follows it will be assumed that the "Y" wire has been inserted and therefore that power is to be stolen from the Y-lead, with it being understood that similar counterpart operation based on the "W" lead applies if no "Y" wire has been inserted and power is to be stolen from the W-lead. During inactive power stealing, power is stolen from between the "Y" wire that appears at node 2019 and the Rc lead that appears at node 2017. As discussed previously, the Rc lead will be automatically shorted to the Rh lead (to form a single "R" lead) for a single-HVAC transformer system, while the Rc lead will be automatically segregated from the Rh lead for a dual-HVAC transformer system. In either case, there will be a 24VAC HVAC transformer voltage present across nodes 2019/2017 when no cooling call is in place (i.e., when the Y-Rc FET switch is open). For one embodiment, the maximum current $I_{BP}(max)$ is set to a relatively modest value, such as 20 mA, for the case of inactive power stealing. Assuming a voltage of about 4.45 volts at node 2025, this corresponds to a maximum output power from the buck regulator 2024 of about 90 mW. The power level of 90 mW has been found to be a generally "safe" power stealing level for inactive power stealing, where the term "safe" is used to indicate that, at such power level, all or virtually all HVAC cooling call relays that are installed in most residential and commercial HVAC systems will not accidentally trip into an "on" state due to the current following through the cooling call relay coil. During this time period, the PAB regulator 2028 operates to discharge the battery 2030 during any periods of operation in which the instantaneous thermostat electrical power load rises above 90 mW, and to recharge the battery (if needed) when the instantaneous thermostat electrical power load drops below 90 mW. Provided that the rechargeable battery 2030 is selected to have sufficient capacity (such as 560 mAh at 3.7 volts as discussed above), supplying power at above 90 mW (even several hundred milliwatts more) is generally not problematic even for extended time periods (even perhaps up to an hour or more), provided only that there are sufficient periods of lower-power usage below 90 mW in which the rechargeable battery 2030 can be recharged. The thermostat 2000 is configured such that the average power consumption is well below 90 mW, and indeed for some embodiments is even below 10 mW on a long term time average.

According to one embodiment, the powering circuitry 2010 is further monitored and controlled during inactive power stealing by the microcontroller 2008 by virtue of monitoring the voltage $V_{BR}$ across the bridge output capacitor 2022 at node 2023 that leads into the buck regulator 2024. For the embodiment of FIG. 20, the voltage VBR is monitored directly by virtue of an analog to digital converter ("ADC") that is built into the microcontroller 2008. According to an embodiment, the voltage $V_{BR}$ across the bridge output capacitor 2022 can be monitored, either on a one-time basis, a periodic basis, or a continuous basis to assess a general "strength" of the HVAC system with respect to the power that can be safely provided during inactive power stealing. This assessment can then be used to adjust a determination for the maximum "safe" amount of power that can be provided at the output of buck regulator 2024 during inactive power stealing, which can in turn be implemented by the microcontroller 2008 by setting the maximum input current $I_{BP}(max)$ of the PAB regulator 2028 for inactive power stealing. In one particularly advantageous embodiment, at the outset of an inactive power stealing period (either on a one-time basis after thermostat installation or on ongoing basis as desired), the microcontroller 2008 initially sets the maximum current $I_{BP}$(max) to zero and measures the resultant voltage $V_{BR}$. This "open-circuit" value of $V_{BR}$ will typically be, for example, somewhere around 30 volts. The microcontroller 2008 then sets the maximum current $I_{BP}(max)$ to 20 mA and measures the resultant voltage $V_{BR}$. If the value of $V_{BR}$ when $I_{BP}(max)=20$ mA remains roughly the same as its open-circuit value (less than a predetermined threshold difference, for example), then it is determined that the HVAC system is "strong enough" at the Y-lead to accommodate a higher value for the maximum current $I_{BP}(max)$, and the microcontroller 2008 increases the maximum current $I_{BP}(max)$ to 40 mA (corresponding to a maximum "safe" power stealing level of about 180 mW assuming 4.45 volts). On the other hand, if the value of $V_{BR}$ when $I_{BP}(max)=20$ mA tends to sag relative to its open-circuit value (greater than the predetermined threshold difference, for example), then it is determined that the HVAC system is not "strong enough" at the Y-lead to accommodate an increased maximum current $I_{BP}(max)$, and its value will remain fixed at 20 mA. Optionally, this process can be repeated to further increase the maximum current $I_{BP}$(max) to successively higher levels, although care should be taken to ensure by empirical testing with a target population of HVAC systems that the cooling call relay will not be tripped at such higher levels during inactive power stealing. For one embodiment, the process stops when $I_{BP}(max)=40$ mA, to avoid accidental cooling call relay tripping across a very large population of HVAC systems.

Operation of the powering circuitry 2010 for "active power stealing" is now described. In the description that follows it will be assumed that the "Y" wire has been inserted and therefore that power is to be stolen from the Y-lead, with it being understood that similar counterpart operation based on the "W" lead applies if no "Y" wire has been inserted. During an active cooling call, it is necessary for current to be flowing through the HVAC cooling call relay coil sufficient to maintain the HVAC cooling call relay in a "tripped" or ON state at all times during the active cooling call. In the absence of power stealing, this would of course be achieved by keeping the Y-Rc FET switch 2006 in ON state at all times to short the Y and Rc leads together. To achieve active power stealing, the microcontroller 2008 is configured by virtue of circuitry denoted "PS MOD" to turn the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 2020 to keep the bridge output capacitor 2022 to a reasonably acceptable operating level. For one embodiment, this is achieved in a closed-loop fashion in which the microcontroller 2008 monitors the voltage $V_{BR}$ at node 2023 and actuates the signal Y-CTL as necessary to keep the bridge output capacitor 2022 charged. By way of example, during active power stealing operation, the microcontroller 2008 will maintain the Y-Rc FET switch in an ON state while monitoring the voltage $V_{BR}$ until it drops below a certain lower threshold, such as 8 volts. At this point in time, the microcontroller 2008 will switch the Y-Rc FET switch into an OFF state and maintain that OFF state while monitoring the voltage $V_{BR}$, which will rise as an inrush of rectified current charges the bridge capacitor 2022. Then once the voltage $V_{BR}$ rises above a certain upper threshold, such as 10 volts, the microcontroller 2008 will turn the Y-Rc FET switch back into in an ON state, and the process continues throughout the active power stealing cycling. Although the scope of the present teachings is not so limited, the microcontroller 2008 is preferably programmed to keep the maximum current $I_{BP}(max)$ to a relatively modest level, such as 20 mA (corresponding to a maximum "safe" power stealing level of about 90 mW assuming 4.45 volts) throughout the active power stealing cycle. The circuit elements are designed and configured such that the ON-OFF cycling of the Y-Rc FET switch occurs at a rate that is much higher than 60 Hz and generally has no phase relationship with the HVAC power transformer, whereby the specter of problems that might otherwise occur due to zero crossings of the 24VAC voltage signal are avoided. By way of example and not by way of limitation, for some embodiments the time interval required for charging the bridge output capacitor 2022 from the lower threshold of 8 volts to the upper threshold of 10 volts will be on the order 10 to 100 microseconds, while the time that it takes the bridge output capacitor 2022 to drain back down to the lower threshold of 8 volts will be on the order of 1 to 10 milliseconds. It has been found that, advantageously, at these kinds of rates and durations for the intermittent "OFF" state of the Y-Rc FET switch 2006, there are very few issues brought about by accidental "un-tripping" of the HVAC cooling call relay during active power stealing across a wide population of residential and commercial HVAC installations.

According to one embodiment, it has been found advantageous to introduce a delay period, such as 60-90 seconds, following the instantiation of an active cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 2000. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided. Preferably, the microcontroller 2008 implements the above-described instantiation delays for both active and inactive power stealing by setting the maximum current $I_{BP}(max)$ to zero for the required delay period. In some embodiments, the operation of the buck regulator circuit 2024 is also shut down for approximately the first 10 seconds of the delay period to help ensure that the amount of current being drawn by the powering circuitry 2010 is very small. Advantageously, the rechargeable-battery-assisted architecture of the powering circuitry 2010 readily accommodates the above-described instantiation delays in that all of the required thermostat electrical power load can be supplied by the rechargeable battery 2030 during each of the delay periods.

Figure 21:
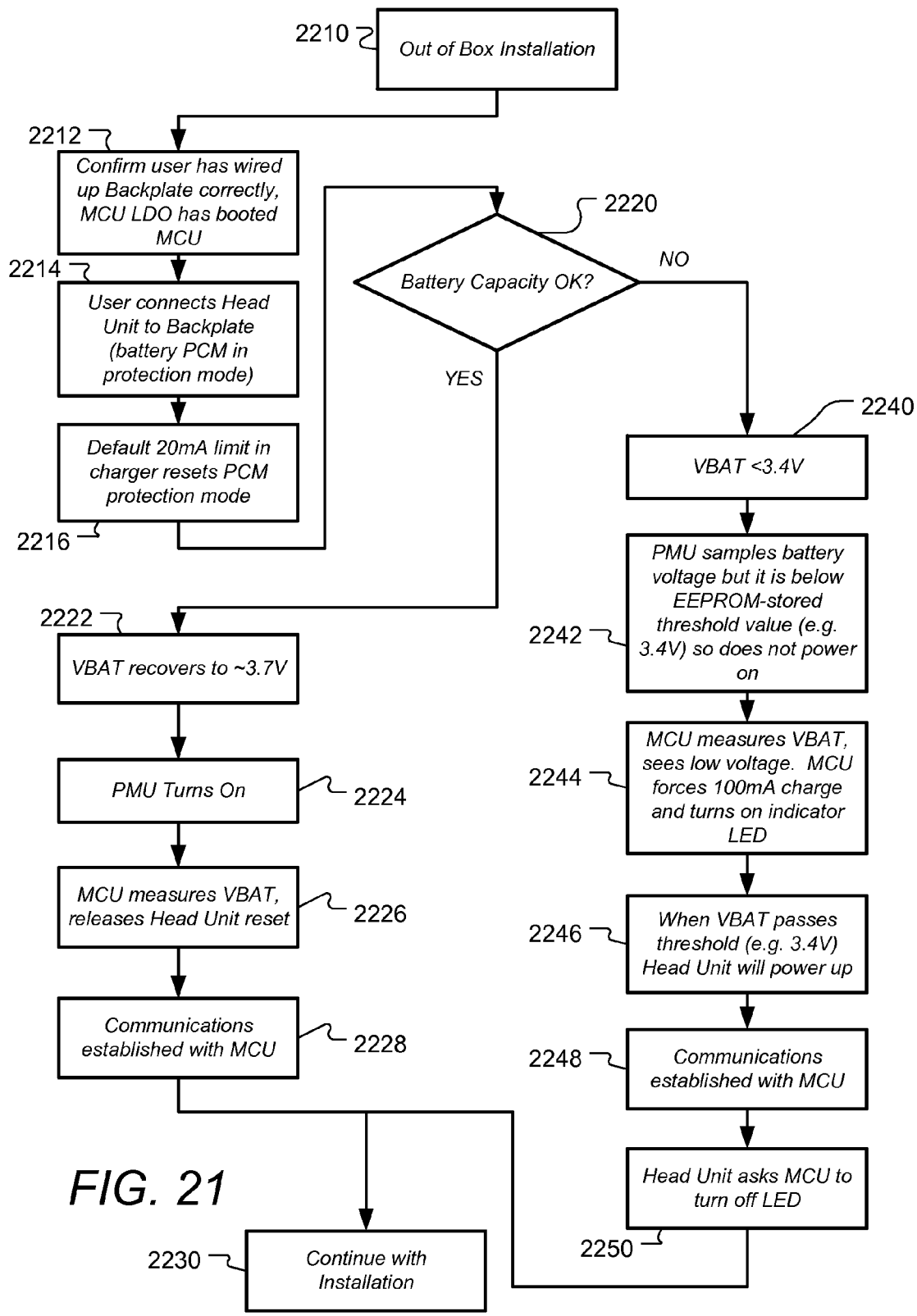
FIG. 21 is a flow chart showing aspects of an out-of-box installation process for a thermostat powered by a rechargeable battery, according to some embodiments.

FIG. 21 is a flow chart showing aspects of an out-of-box installation process for a thermostat powered by a rechargeable battery, according to some embodiments. In Block 2210 the user installs the backplate, for example on the wall, and connects the HVAC control wires to the thermostat. In block 2212, a confirmation is made that the user has correctly wired up the backplate. If no wiring errors are detected at this stage, the MCU (for example MCU 320 shown n FIG. 3B) is booted using the MCU LDO, as shown and described in with respect to FIG. 3B. In block 2214 the user connects the Head Unit to the Backplate. In block 2216, the rechargeable battery has a protection circuit module (PCM) which is reset (e.g. from a setting used to minimize capacity loss of the battery during periods of long-term storage) by the charger circuit supplying a 20 mA current. In decision 2220 a check of the battery capacity is made. If the VBAT is above a predetermined threshold, for example 3.4 Volts, then the installation process continues including battery charging to about 3.7 Volts in block 2222, the Power Management Unit (PMU) is turned on in block 2224 and in block 2226 the MCU measures the battery voltage (VBAT) and releases the Head Unit reset control. The Head Unit boots up and establishes communication with the MCE in block 2228. The installation process is continues in block 2230. In the case where battery capacity is not above the predetermined threshold, for example when VBAT is below 3.4 Volts as in block 2240, the PMU does not power on the Head Unit as in block 2242. In block 2244 the MCU measures the VBAT and sees the low voltage. The MCU then forces a high current charge (e.g. 100 mA) to charge the battery as quickly as possible, and also turns on an indicator LED, such a LED indicator 980 that is shown and described with respect to FIG. 9A. According to some embodiments, the LED indicator 980 flashes red so as to indicate to the user that the battery is low and the installation process is being halted while the battery is being recharged. In block 2246, when VBAT passes the threshold, for example 3.4 Volts, the Head Unit is powered up and in block 2248 communication with the MCU is established. In block 2250, the Head Unit asks the MCU to turn off the LED indictor 980. In block 2230 the installation process can continue as usual.

Thus, according to some embodiments, in the unlikely scenario that the battery is critically low when the user installs their new thermostat, the device remains in deep sleep mode (LED pulsing to indicate charging). According to some embodiments, in some cases when the battery is low during installation, the device briefly displays a warning message such as "x hours changing required" such as using a textual message in a form such as shown in FIG. 23A. After the brief display, the thermostat goes into a deep sleep mode with the LED indicator 980 flashing while the battery is recharged. According to some embodiments, if the battery is recharged to a medium low level, but still requires further charging in order to undertake even a limited installation procedure, the unit is briefly awoken such that a textual message can be briefly displayed in the form of "x hours changing required", or simply displaying a message such as message 2310 in FIG. 23A, followed by a few seconds of displaying message 2320 in FIG. 23B, before returning to the deep sleep with the LED indicator flashing.

Figure 22:
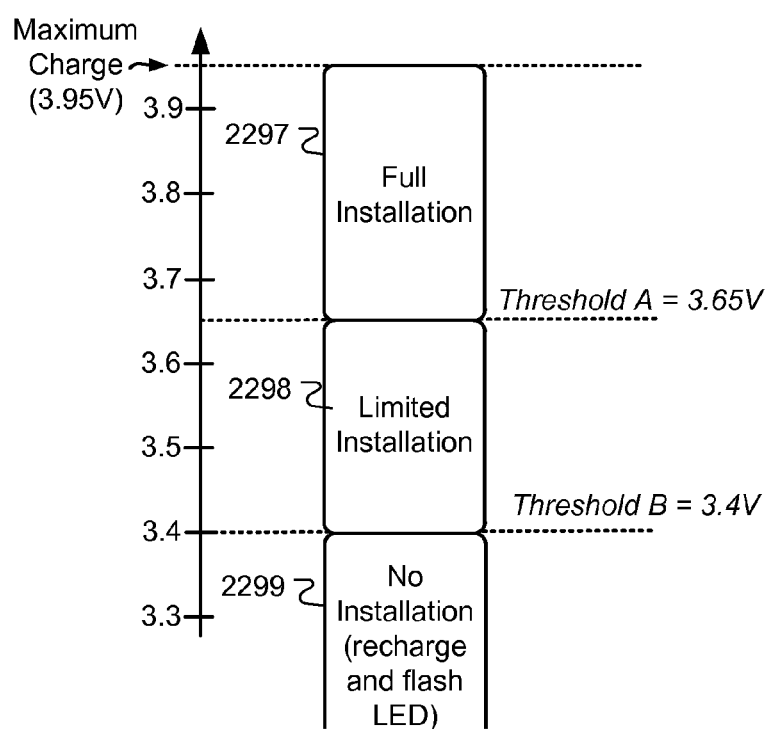
FIG. 22 illustrates aspects of an installation procedure for a thermostat powered by a rechargeable battery that is based on more than one threshold, according to some embodiments.

FIG. 22 illustrates aspects of an installation procedure for a thermostat powered by a rechargeable battery that is based on more than one threshold, according to some embodiments. In this case there are two predetermined battery voltage thresholds used for determining behavior during installation. If the battery voltage is above "Threshold A", then in block 2297 a full installation procedure is carried out. Note that this is expected to the be the case in vast majority of cases based on the rate of battery drainage during storage and the estimated time of storage prior to customer installation. If the battery voltage is below Threshold A, but still above a second, lower threshold—"Threshold B" then a installation can still take place, but some limits of the installation process are observed so as to not cause too much drain on the battery. An example of energy intensive functionality is wireless communications. Thus, according to some embodiments, in block 2298 the installation proceeds without wireless connectivity (e.g. WiFi connectivity). As such some functionality of the thermostat may not be available right away after installation but will be provided as soon as the battery is charged to a sufficient level, such as when it rises above Threshold A. According to some embodiments, a message such as message 2330 shown in FIG. 23C is displayed to the user in the situation of block 2298.

In cases there the battery is initially measured below Threshold B, then no installation can occur until the battery is charged. In this case, block 2299, the thermostat goes into a deep sleep to recharge the battery while the LED indicator 980 is flashed to provide some indication to the user of what is occurring. According to some embodiments, a message such as message 2330 in FIG. 23C is displayed briefly before the unit is shut down for battery recharging. Although in the example of FIG. 22 the thresholds of 3.65V and 3.4V are used, it will be appreciated that these values should be selected based on the particular design of the battery, charging circuitry, the expected installation setting and procedures, as well as the design of the thermostat unit itself.

The subject matter of this patent specification relates to the subject matter of the following commonly assigned applications, each of which is incorporated by reference herein: U.S. Ser. No. 13/038,191 filed Mar. 1, 2011; U.S. Ser. No. 13/033,573 filed Feb. 23, 2011; U.S. Ser. No. 13/656,189 filed Oct. 19, 2012; and U.S. Ser. No. 13/269,501, filed Oct. 7, 2011. The above-referenced patent applications are collectively referenced herein as "the commonly assigned incorporated applications."

Various modifications may be made without departing from the spirit and scope of the invention. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. In a microprocessor-controlled thermostat, a method of facilitating installation thereof, the thermostat for controlling a heating, ventilation, and air conditioning (HVAC) system and being powered at least in part with a rechargeable battery, the method comprising:

measuring a charge level value for the rechargeable battery using a processing system, the rechargeable battery and processing system being housed within the thermostat;

when the measured charge level value is above a first predetermined threshold, using an interactive graphical user interface comprising an electronic display disposed within a housing of the thermostat to interact with a user so as to carry out a full installation procedure of the thermostat so as to control the HVAC system, the installation procedure including a first set of installation steps for setting up a plurality of thermostat features, the processing system being configured to be in operative communication with one or more temperature sensors for determining an ambient air temperature, in operative communication with one or more input devices including said user interface, and in further operative communication with the HVAC system to control the HVAC system based at least in part on a comparison of a measured ambient temperature and a setpoint temperature value;

when the measured charge level value is below the first predetermined threshold, using the electronic display to display a graphical representation sufficient to communicate to the user that installation steps of a procedure for installing the thermostat will be a limited due to a low battery level, and using the interactive graphical user interface to carry out a limited installation procedure including a second set of installation steps for setting up one or more thermostat features, the second set of installation steps being a subset of the first set of installation steps;

using the processing system to modify configuration information of the thermostat based at least in part on the first or second installation procedures; and using the modified configuration information of the thermostat when controlling one or more HVAC system components of the HVAC system by the processing system.

2. A method according to claim 1 wherein the first set of installation steps include one or more steps relating to wireless network communications and the second set of installation steps do not include steps relating to wireless network communications.

3. A method according to claim 1 wherein said measured charge level value is a measured voltage level associated with the battery.

4. A method according to claim 1 further comprising when the measured charge level value is below a second predetermined threshold halting installation of the thermostat, and recharging the rechargeable battery using a power source, wherein the second charge level value is below the first charge level value.

5. A method according to claim 4 wherein when the measured charge level is below the second charge level, presenting a visual indication sufficient to communicate to the user that installation halted due to a low battery level.

6. A method according to claim 5 wherein after the rechargeable battery has been sufficiently recharged, resuming the installation of the thermostat.

7. A method according to claim 1 further comprising:

automatically detecting whether a common wire is connected to the thermostat using a wire insertion detection module disposed within the thermostat;

automatically extracting electrical power from a common wire when a connection to a common wire is detected by the wire insertion detection module;

automatically extracting electrical power from a a call relay wire when a connection to a common wire is not detected by the wire insertion detection module, wherein the extracting of electrical power is performed using a power extraction circuit disposed within the housing, and wherein the extracted electrical power is used to charge the rechargeable battery.

8. A method according to claim 1 wherein the rechargeable battery is a lithium ion battery.

9. A thermostat comprising:

a housing;

a rechargeable battery disposed within the housing;

battery monitoring circuitry disposed within the housing configured to measure a charge level for the rechargeable battery;

an interactive graphical user interface comprising an electronic display, the display disposed within the housing; and a processing system disposed within the housing and coupled to the user interface, the processing system being configured to be powered at least in part by the rechargeable battery, in operative communication with the battery monitoring circuitry, in operative communication with one or more temperature sensors for determining an ambient air temperature, in operative communication with one or more input devices including said user interface for receiving input from a user, and in still further operative communication with a heating, ventilation, and air conditioning (HVAC) system to control the HVAC system based at least in part on a comparison of a measured ambient temperature and a setpoint temperature value, wherein the processing system is further configured to:

when the measured charge level value is above a first predetermined threshold use the electronic display to interact with a user so as to carry out a full installation procedure of the thermostat so as to control the HVAC system, the installation procedure including a first set of installation steps for setting up a plurality of thermostat features;

when the measured charge level value is below the first predetermined threshold, use the electronic display to display a graphical representation sufficient to communicate to the user that installation steps of a procedure for installing the thermostat will be a limited due to a low battery level, and use the interactive graphical user interface to carry out a limited installation procedure including a second set of installation steps for setting up one or more thermostat features, the second set of installation steps being a subset of the first set of installation steps;

modify configuration information of the thermostat based at least in part on the first or second installation procedures; and using the modified configuration information of the thermostat when controlling one or more HVAC system components of the HVAC system by the processing system.

10. A thermostat according to claim 9 wherein the first set of installation steps include one or more steps relating to wireless network communications and the second set of installation steps do not include steps relating to wireless network communications.

11. A thermostat according to claim 9 further comprising:
a wire insertion detection module disposed within the thermostat configured to automatically detect when a common wire is connected to the thermostat; and
a power extraction circuit disposed within the housing and configured to extract electrical power from either a call relay wire or a common wire, wherein the power extraction circuit automatically extracts electrical power from a common wire when a connection to a common wire is detected by the wire insertion detection module and automatically extracts electrical power from a call relay wire when a connection to a common wire is not detected by the wire insertion detection, and wherein the extracted electrical power is used to charge the rechargeable battery.

12. A thermostat according to claim 9 wherein said measured charge level value is a measured voltage level associated with the battery.

13. A thermostat according to claim 9 wherein the rechargeable battery is a lithium-ion battery.

14. In a microprocessor-controlled thermostat, a method of facilitating installation thereof, the thermostat for controlling a heating, ventilation, and air conditioning (HVAC) system and being powered at least in part with a rechargeable battery, the method comprising:

measuring a charge level value for the rechargeable battery using a processing system, the rechargeable battery and processing system being housed within the thermostat;

when the measured charge level value is above a first predetermined threshold using an interactive graphical user interface comprising an electronic display disposed within a housing of the thermostat to interact with a user so as to carry out an installation procedure of the thermostat so as to control the HVAC system, the processing system being configured to be in operative communication with one or more temperature sensors for determining an ambient air temperature, in operative communication with one or more input devices including said user interface, and still in further operative communication with the HVAC system to control the HVAC system based at least in part on a comparison of a measured ambient temperature and a setpoint temperature value;

when the measured charge level value is below a first predetermined threshold and above a second predetermined threshold, using the electronic display to display a graphical representation sufficient to communicate to the user that installation steps of a procedure for installing the thermostat will be a limited due to a low battery level, and using the interactive graphical user interface to carry out a limited installation procedure including a second set of installation steps for setting up one or more thermostat features, the second set of installation steps being a subset of the first set of installation steps;

when the measured charge level value is below the second predetermined threshold, halting the installation procedure, recharging the rechargeable battery using a power source, if available, presenting a visual indication sufficient to communicate to the user the rechargeable battery is being recharged, and after the rechargeable battery has been sufficiently recharged, resuming the installation procedure;

using the processing system to modify configuration information of the thermostat based at least in part on the installation procedure; and using the modified configuration information of the thermostat when controlling one or more HVAC system components of the HVAC system by the processing system.

15. A method according to claim 14 further comprising:
automatically detecting whether a common wire is connected to the thermostat using a wire insertion detection module disposed within the thermostat;
automatically extracting electrical power from a common wire when a connection to a common wire is detected by the wire insertion detection module;
automatically extracting electrical power from a a call relay wire when a connection to a common wire is not detected by the wire insertion detection module, wherein the extracting of electrical power is performed using a power extraction circuit disposed within the housing, and wherein the extracted electrical power is used to charge the rechargeable battery.

16. In a microprocessor-controlled thermostat, a method of facilitating installation thereof, the thermostat for controlling a heating, ventilation, and air conditioning (HVAC) system and being powered at least in part with a rechargeable battery, the method comprising:

measuring a charge level value for the rechargeable battery using a processing system, the rechargeable battery and processing system being housed within the thermostat;

when the measured charge level value is above a first predetermined threshold using an interactive graphical user interface comprising an electronic display disposed within a housing of the thermostat to interact with a user so as to carry out a full installation procedure of the thermostat so as to control the HVAC system, the full installation procedure comprising a first set of installation steps for setting up one or more thermostat features, and the processing system being configured to be in operative communication with one or more temperature sensors for determining an ambient air temperature, in operative communication with one or more input devices including said user interface, and still in further operative communication with the HVAC system to control the HVAC system based at least in part on a comparison of a measured ambient temperature and a setpoint temperature value;

when the measured charge level value is below a first predetermined threshold, using the electronic display to display a graphical representation sufficient to communicate to the user that installation steps of a procedure for installing the thermostat will be a limited due to a low battery level, and using the interactive graphical user interface comprising the electronic display to carry out a partial installation procedure that comprises a second set of installation steps for setting up the one or more thermostat features, the second set of installation steps being a subset of the first set of installation steps.

17. A method according to claim 16 wherein said measured charge level value is a measured voltage level associated with the battery.

18. A method according to claim 16 wherein the rechargeable battery is a lithium-ion battery.

* * * * *

UNITED STATES PATENT AND TRADEMARK OFFICE
CERTIFICATE OF CORRECTION

PATENT NO. : 9,268,344 B2
APPLICATION NO. : 13/831177
DATED : February 23, 2016
INVENTOR(S) : Warren et al.

Page 1 of 1

It is certified that error appears in the above-identified patent and that said Letters Patent is hereby corrected as shown below:

In the Claims:

In Column 42, line 15, Claim 2: please delete "include" and insert --includes--.

In Column 42, line 42, Claim 7: please delete "a a" and insert --a--.

In Column 44, line 46, Claim 15: please delete "a a" and insert --a--.

Signed and Sealed this
Twenty-third Day of August, 2016

Michelle K. Lee
*Director of the United States Patent and Trademark Office*